US012709585B2

(12) United States Patent
Demirer et al.

(10) Patent No.: US 12,709,585 B2
(45) Date of Patent: Aug. 18, 2026

(54) IDENTIFICATION OF SOIL BACTERIA-ENRICHING AGENTS AND METHODS OF USE THEREOF

(71) Applicant: California Institute of Technology, Pasadena, CA (US)

(72) Inventors: Gözde Demirer, Altadena, CA (US); Chiara Berruto, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 18/972,482

(22) Filed: Dec. 6, 2024

(65) Prior Publication Data

US 2025/0187998 A1 Jun. 12, 2025

Related U.S. Application Data

(60) Provisional application No. 63/608,049, filed on Dec. 8, 2023.

(51) Int. Cl.
*C05F 17/10* (2020.01)

(52) U.S. Cl.
CPC .................................... *C05F 17/10* (2020.01)

(58) Field of Classification Search
CPC .......... C05F 17/10; A01G 24/10; A01G 24/20
See application file for complete search history.

(56) References Cited

U.S. PATENT DOCUMENTS 5,503,651 A * 4/1996 Kloepper ............... A01N 63/27 435/876
11,713,284 B1 * 8/2023 Lett ........................... C05F 3/00 71/10
2014/0364386 A1 * 12/2014 Choe ....................... A61P 25/00 514/32
2020/0337314 A1 * 10/2020 Wood ....................... C05G 5/23
2021/0161981 A1 * 6/2021 Farmer .......... C12Y 301/03008
2021/0259169 A1 * 8/2021 Valiquette .............. A01G 24/15
2022/0017911 A1 * 1/2022 Temme .................... A01H 3/00
2022/0106238 A1 * 4/2022 Rezaei ................... A01N 63/20
2022/0259114 A1 * 8/2022 Farmer .................... C05G 5/35
2022/0402833 A1 * 12/2022 Bhalla ..................... C05F 17/40
2023/0148607 A1 * 5/2023 Rezaei ..................... C12N 1/04 504/117
2024/0065262 A1 * 2/2024 Robbins ................. A01N 59/16
(Continued)

OTHER PUBLICATIONS

Agorsor, et al., The *Arabidopsis* LHT1 Amino Acid Transporter Contributes to Pseudomonas simiae-Mediated Plant Growth Promotion by Modulating Bacterial Metabolism in the Rhizosphere. Plants 12, 371. 10.3390/plants 12020371. (2023).
(Continued)

*Primary Examiner* — William L Gmoser
(74) *Attorney, Agent, or Firm* — KNOBBE, MARTENS, OLSON & BEAR, LLP

(57) ABSTRACT

Some aspects of the present disclosure relate to methods and devices for identifying soil bacteria-enriching agents that selectively enrich a desired species of bacteria in a soil microbiome. In some embodiments, the soil bacteria-enriching agent comprises a carbon substrate and/or a chemoeffector. Some aspects of the present disclosure relate to methods of enriching a desired species of bacteria in a soil microbiome using one or more soil bacteria-enriching agents.

20 Claims, 17 Drawing Sheets

(56) References Cited

U.S. PATENT DOCUMENTS

| | | | | |
|---|---|---|---|---|
| 2024/0327889 | A1* | 10/2024 | Tets | A61K 47/6815 |
| 2024/0400468 | A1* | 12/2024 | Bhalla | A01N 63/22 |
| 2025/0145544 | A1* | 5/2025 | Strobel | C05F 11/08 |
| 2025/0171729 | A1* | 5/2025 | Sakimoto | A01N 63/20 |

OTHER PUBLICATIONS

Chen, et al., Sustainable Application for Agriculture Using Biochar-Based Slow-Release Fertilizers: A Review. ACS Sustainable Chem. Eng. 11, 1-12. 10.1021/acssuschemeng.2c05691. (2023).
Jacoby, et al., Pinpointing secondary metabolites that shape the composition and function of the plant microbiome. Journal of Experimental Botany 72, 57-69. 10.1093/jxb/eraa424. (2021).
Lundberg, et al., Defining the core *Arabidopsis thaliana* root microbiome. Nature 488, 86-90. 10.1038/nature11237. (2012).
Ortiz-Bobea, et al., Anthropogenic climate change has slowed global agricultural productivity growth. Nat. Clim. Chang. 11, 306-312. 10.1038/s41558-021-01000-1. (2022).
Pathak, et al., Climate Change Trends and Impacts on California Agriculture: A Detailed Review. Agronomy 8, 25. 10.3390/agronomy8030025. (2018).
Raaijmakers, et al., Rewilding plant microbiomes. Science 378, 599-600. 10.1126/science.abn6350. (2022).
Walters, et al., Large-scale replicated field study of maize rhizosphere identifies heritable microbes. Proc. Natl. Acad. Sci. U.S.A. 115, 7368-7373. 10.1073/pnas.1800918115. (2018).
Yan, et al., Genetic modification of flavone biosynthesis in rice enhances biofilm formation of soil diazotrophic bacteria and biological nitrogen fixation. Plant Biotechnology Journal 20, 2135-2148. 10.1111/pbi.13894. (2022).

* cited by examiner

IDENTIFICATION OF SOIL BACTERIA-ENRICHING AGENTS AND METHODS OF USE THEREOF

INCORPORATION BY REFERENCE TO ANY PRIORITY APPLICATIONS

This application claims priority to U.S. Provisional Application No. 63/608,049, filed on Dec. 8, 2023, the content of which is herein expressly incorporated by reference in its entirety.

STATEMENT REGARDING FEDERALLY SPONSORED R&D

This invention was made with government support under Grant No. 2024-67019-42486 awarded by the US Department of Agriculture, National Institute of Food and Agriculture. The government has certain rights in the invention.

FIELD

Aspects of the present disclosure generally relate to methods and devices for identifying one or more soil bacteria-enriching agents that can be used to alter the composition and function of a soil and plant root microbiome. Some aspects of the present disclosure relate to methods of identifying selective growth substrates (i.e. carbon sources) that promote the growth of a desired bacteria in a soil microbiome over others or native microbiome. Some aspects of the present disclosure relate to methods of identifying selective chemoeffectors for a desired bacteria in a soil microbiome.

BACKGROUND

With a growing human population and the consequences of climate change being felt globally, advances in sustainable agriculture are at the forefront of societal needs. It is estimated that the global food demand will increase between 50-70% by 2050. However, fulfilling this demand is being challenged by the effects of anthropogenic climate change which have decreased the global agricultural total factor productivity (TFP) by ~21% since 1961. Historically, approaches to stimulate crop productivity have involved the introduction of large quantities of chemical fertilizers and pesticides to farmlands. These practices result in downstream environmental degradation, contributing to the effects of climate change, and ultimately decreasing crop yields. Accordingly, in order to produce enough food to feed the growing population, there is a need for sustainable solutions that reduce reliance on harmful agrochemicals while increasing farmland productivity.

One approach to stimulating plant growth is through the addition of plant growth-promoting rhizobacteria (PGPR), which can improve the nutrient use efficiency (NUE) of plants, provide protective immunity against pathogens, and produce plant hormones that stimulate growth. Unfortunately, current agriculture practices such as monoculture crop systems, tillage farming, and excessive fertilizer application have distorted and neglected the importance of this microbial community resulting in a decreased diversity of soil microorganisms and dysbiosis of crop microbiomes. Re-optimizing the plant-microbiome relationship of current staple crop cultivars could therefore be a sustainable approach to reduce or remove altogether our dependence on environmentally detrimental agricultural inputs.

Many factors impact the assembly and overall functional role of the plant microbiome. Plant genotype plays a critical role in dictating the composition of the soil microbial community, biasing the composition of the microbiome in specific ways. One of the most significant ways plants modulate microbiome communities is through the secretion of carbon-rich compounds called exudates. Plants can invest anywhere from 10%-40% of the $CO_2$ they fix from the atmosphere into the soil. The exudates released by plant roots represent the nutritional basis by which the microbiome is built. The dependence on a microbe's ability to utilize these secreted compounds for successful colonization creates an opportunity for targeted manipulation of the plant microbiome by manipulating available carbon niches through exogenous application of soil prebiotic molecules.

Some success has recently been shown in the use of soil prebiotics, which when applied exogenously to the soil, stimulate the growth of desired species. Prebiotic application was shown to alter the soil microbial community, enriching for pathogen resistance phenotypes and has been used as a strategy to support the persistence of introduced species. Additionally, recent publications have begun to explore the process of manipulating the chemical composition of root exudates to increase the concentration of compounds identified as having an influence on the growth of beneficial PGPR. This approach has been most successful in the enrichment of diazotrophic N-fixing bacteria by manipulating flavone secretion by the plant host, specifically increasing the exudation of apigenin. Additionally, another study found that inhibiting the LHT1 inward amino acid transporter results in exudates that can enrich for increased colonization by *P. simiae*. Although *P. simiae* is a PGPR, here the increased colonization led to growth inhibition of the plant, highlighting the potential negative impact of different microbial metabolic pathways on the plant host. It will therefore be important to not only focus on enriching the microbiome with the desired PGPR, but also enriching the desired functional outputs of the strains.

SUMMARY

Some aspects disclosed herein relate to methods of engineering a soil microbiome. In some embodiments, a method comprises: a) selecting one or more carbon substrates that are able to enrich a desired bacterial species in a soil microbiome as compared to enrichment of one or more different bacteria in the soil microbiome; b) selecting one or more chemoattractants that are able to attract a desired bacterial species to the soil microbiome as compared to attraction of one or more different bacteria to the soil microbiome; and c) applying the one or more selected carbon substrates and chemoattractants to soil comprising a soil microbiome comprising the desired bacteria.

In some embodiments, application of the one or more of the selected carbon substrates and/or chemoattractants to soil comprising a soil microbiome enriches the concentration of one or more desired bacteria in the soil microbiome as compared to the concentration of the one or more desired bacteria prior to applying the one or more selected carbon substrates and/or chemoattractants to the soil. In some embodiments, applying the selected carbon substrates and/or chemoattractants comprises adding exogenous carbon substrates and/or chemoattractant to the soil comprising the soil microbiome. In some embodiments, the desired bacterial species comprises a plant growth-promoting rhizobacteria (PGPR). In some embodiments, the PGPR comprises one or more of: *Pseudomonas putida, Azotobacter vinelandii, Bacillus subtilis* or *Azospirillum brasilense*, or any combination thereof.

In some embodiments, the chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

In some embodiments, the selected carbon substrate is selected from the group comprising: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid and/or any combination thereof.

In some embodiments, the desired bacteria comprises *Pseudomonas putida* and the selected soil bacteria-enriching agent comprises one or more of: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof.

In some embodiments, the desired bacteria comprises *Azotobacter vinelandii* and the selected soil bacteria-enriching agent comprises one or more of: D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof.

In some embodiments, the desired bacteria comprises *Bacillus subtilis* and the selected soil bacteria-enriching agent comprises one or more of: methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof.

In some embodiments, the desired bacteria comprises *Azospirillum brasilense* and the selected soil bacteria-enriching agent comprises one or more of: propionic acid, D-tartaric acid or D-malic acid and/or any combination thereof, to the soil comprising a soil microbiome.

Some embodiments disclosed herein relate to method of selecting a chemoattractant that is able to enrich the growth of a desired bacterial species in a soil microbiome. In some embodiments, the method comprises: measuring the attraction of the desired bacterial species and at least one different bacterial species to one or more candidate chemoattractants, and selecting a chemoattractant that is able to more strongly attract the desired bacterial species as compared to the at least one different species of tested bacteria. In some embodiments, measuring the attraction of a desired bacterial species to a candidate chemoattractant comprises measuring the chemotactic index (I30) of the desired bacteria to the candidate chemoattractant. In some embodiments, selecting a chemoattractant comprises selecting at least one candidate chemoattractant having an I30 larger than 0.5. In some embodiments, selecting a chemoattractant comprises selecting at least one chemoattractant having an I30 larger than 0.5 toward the desired bacterial species, wherein the selected chemoattractant has an I30 of less than 0.5 towards one or more of the at least one different bacterial species tested.

In some embodiments, the desired bacterial species comprises a plant growth-promoting rhizobacteria (PGPR). In some embodiments, the PGPR comprises one or more of: *Pseudomonas putida, Azotobacter vinelandii, Bacillus subtilis* or *Azospirillum brasilense*, or any combination thereof.

In some embodiments, the candidate chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

In some embodiments, the desired bacteria comprises *Pseudomonas putida* and the selected chemoattractant comprises one or more of: phenylethylamine (PEA), butyric acid, putrescine, benzoate or octopamine, and/or any combination thereof.

In some embodiments, the desired bacteria comprises *Azotobacter vinelandii* and the selected chemoattractant comprises one or more of: erythritol, D-mannitol or a-D-lactose, and/or any combination thereof.

In some embodiments, the desired bacteria comprises *Bacillus subtilis* and the selected chemoattractant comprises one or more of: maltitol, N-acetyl-D-mannosamine, a-methyl-D-galactoside, malate, glutamic acid, glycerol or D-sorbitol and/or any combination thereof.

AV: *Azotobacter vinelandii*, BS: *Bacillus subtilis*, PP: *Pseudomonas putida*, AB: *Azospirillum brasilense*, SC: Synthetic community.

Figures 3A, 3B:
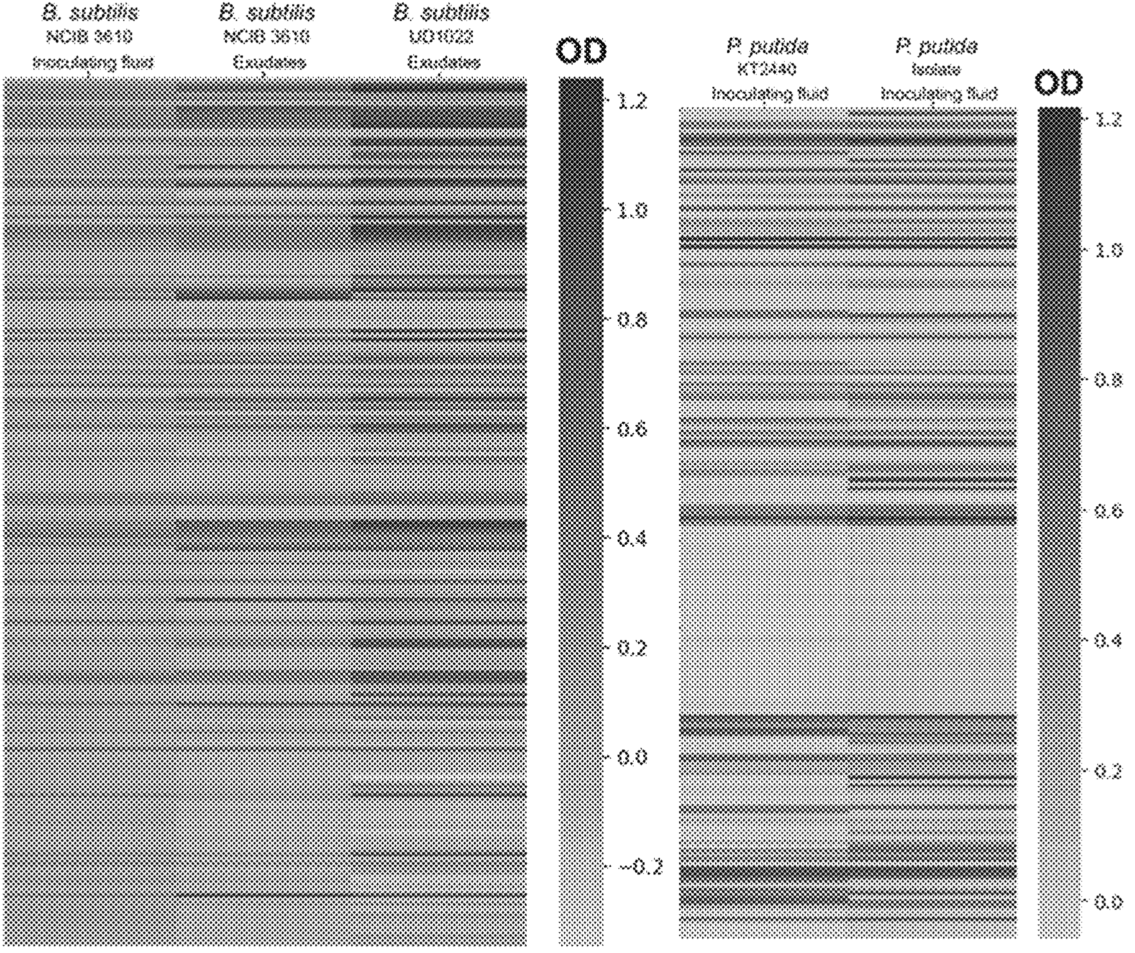

FIG. 3A is a heatmap depicting the maximum $OD_{600}$ of different strains of *B. subtilis* bacteria grown on different carbon sources in inoculating fluid versus plant root exudates according to some embodiments disclosed herein.

FIG. 3B is a heatmap depicting the maximum $OD_{600}$ of different strains of *P. putida* bacteria grown on different carbon sources in inoculating fluid according to some embodiments disclosed herein.

Figure 4A:
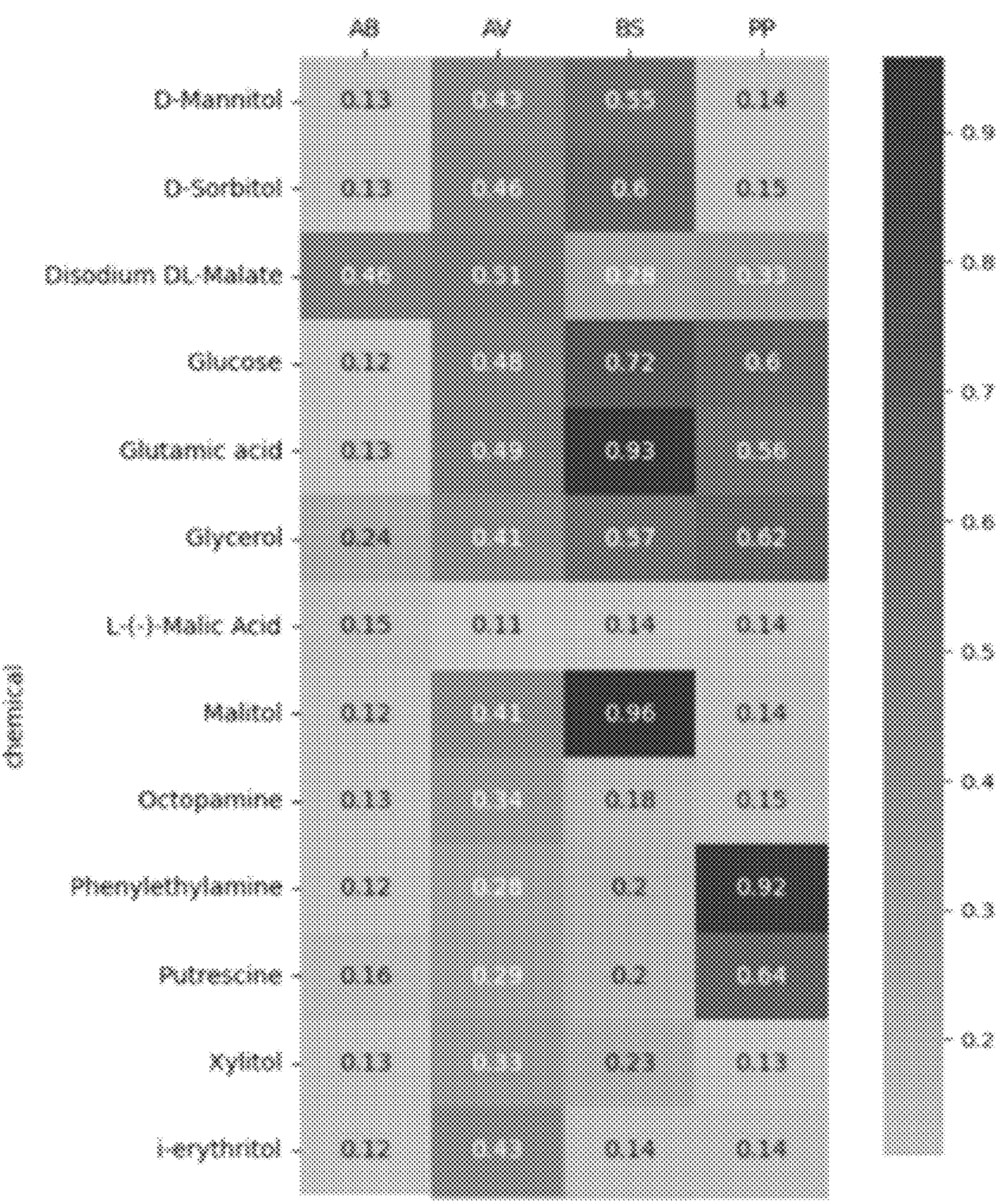

FIG. 4A is a heatmap depicting the maximum $OD_{600}$ of bacteria grown on different soil bacteria-enriching agents provided at 18 mM according to some embodiments disclosed herein. AV: *Azotobacter vinelandii*, BS: *Bacillus subtilis*, PP: *Pseudomonas putida*, AB: *Azospirillum brasilense*.

Figure 4B:
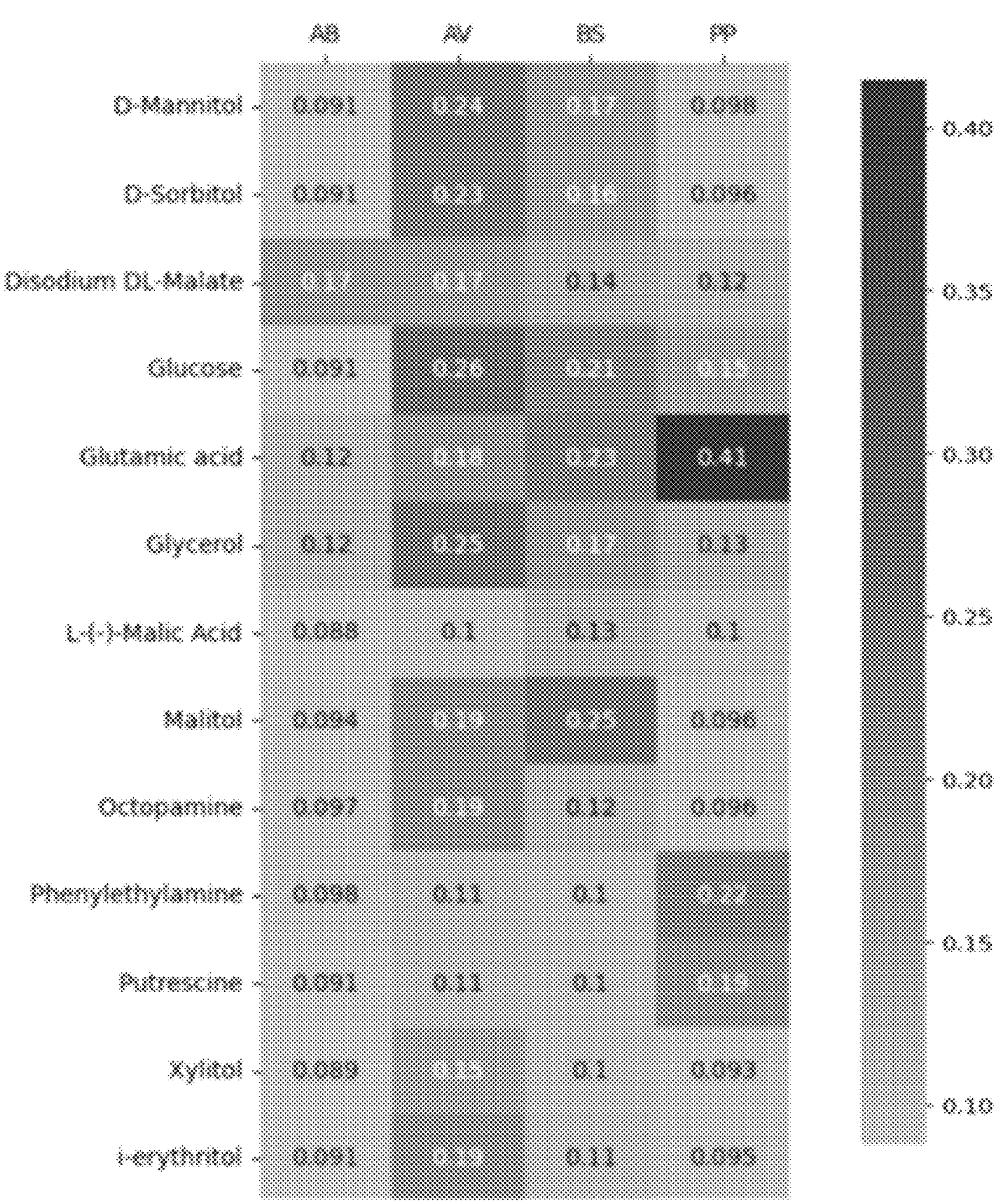

FIG. 4B is a heatmap depicting the maximum $OD_{600}$ of bacteria grown on different soil bacteria-enriching agents provided at 5 mM according to some embodiments disclosed herein. AV: *Azotobacter vinelandii*, BS: *Bacillus subtilis*, PP: *Pseudomonas putida*, AB: *Azospirillum brasilense*.

Figure 5:
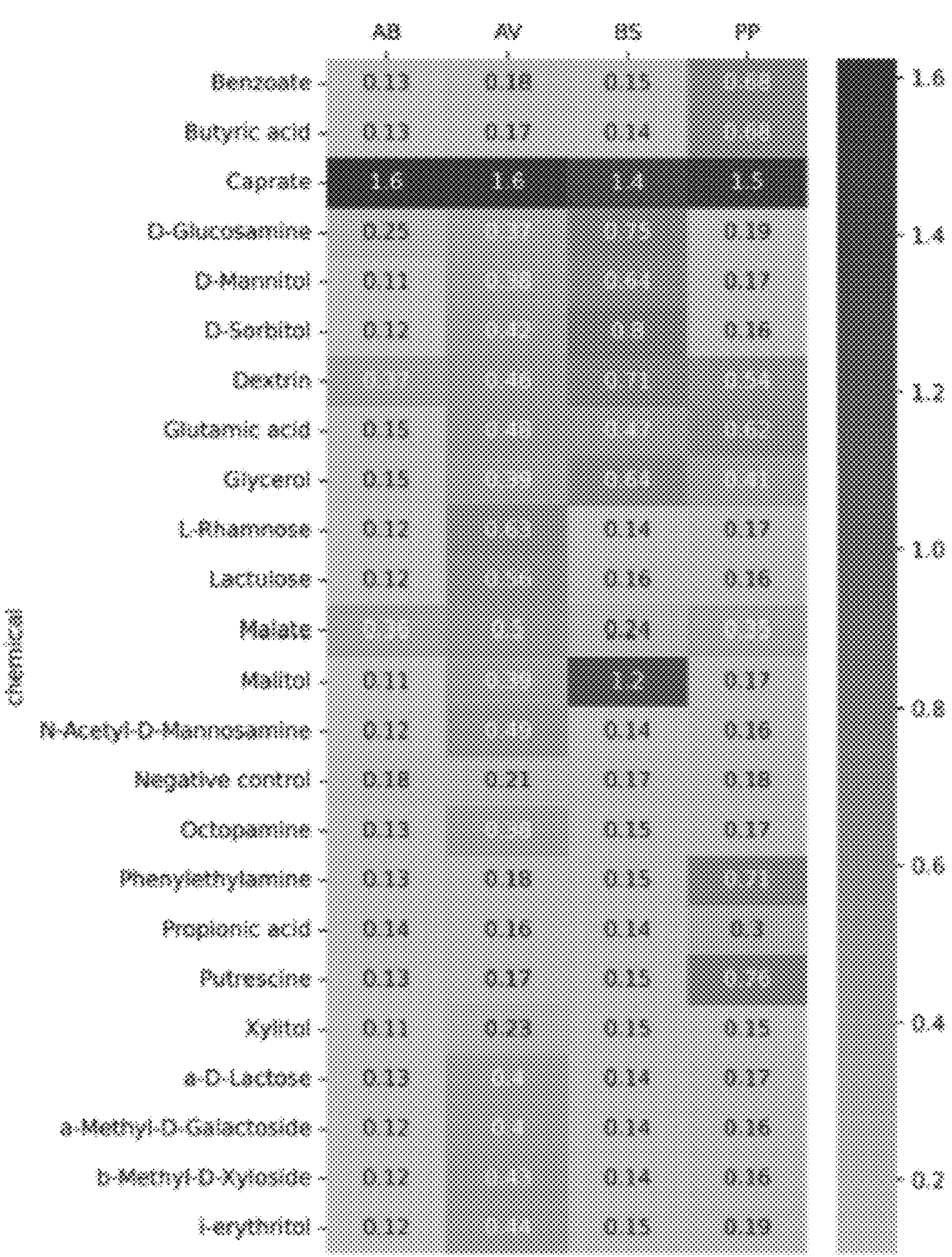

FIG. 5 is a heatmap depicting the maximum $OD_{600}$ of bacteria grown on different soil bacteria-enriching agents provided at 10 mM according to some embodiments disclosed herein. AV: *Azotobacter vinelandii*, BS: *Bacillus subtilis*, PP: *Pseudomonas putida*, AB: *Azospirillum brasilense*.

Figures 6, 7, 8, 9, 10, 11:
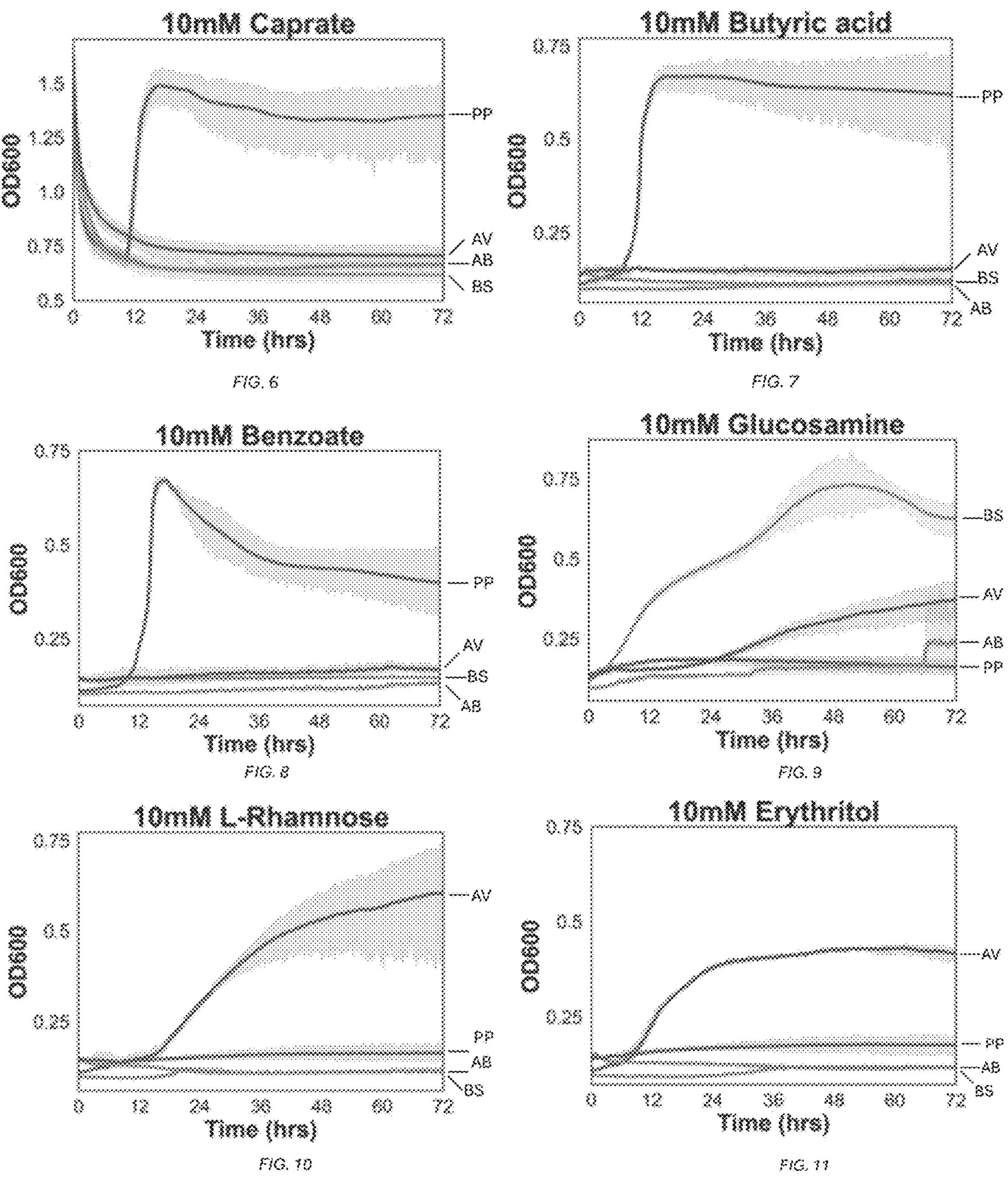

FIG. 6 is a growth curve depicting growth of different bacteria on the same soil bacteria-enriching agent according to some embodiments disclosed herein.

FIG. 7 is a growth curve depicting growth of different bacteria on the same soil bacteria-enriching agent according to some embodiments disclosed herein.

FIG. 8 is a growth curve depicting growth of different bacteria on the same soil bacteria-enriching agent according to some embodiments disclosed herein.

FIG. 9 is a growth curve depicting growth of different bacteria on the same soil bacteria-enriching agent according to some embodiments disclosed herein.

FIG. 10 is a growth curve depicting growth of different bacteria on the same soil bacteria-enriching agent according to some embodiments disclosed herein.

FIG. 11 is a growth curve depicting growth of different bacteria on the same soil bacteria-enriching agent according to some embodiments disclosed herein.

Figures 12, 13, 14, 15:
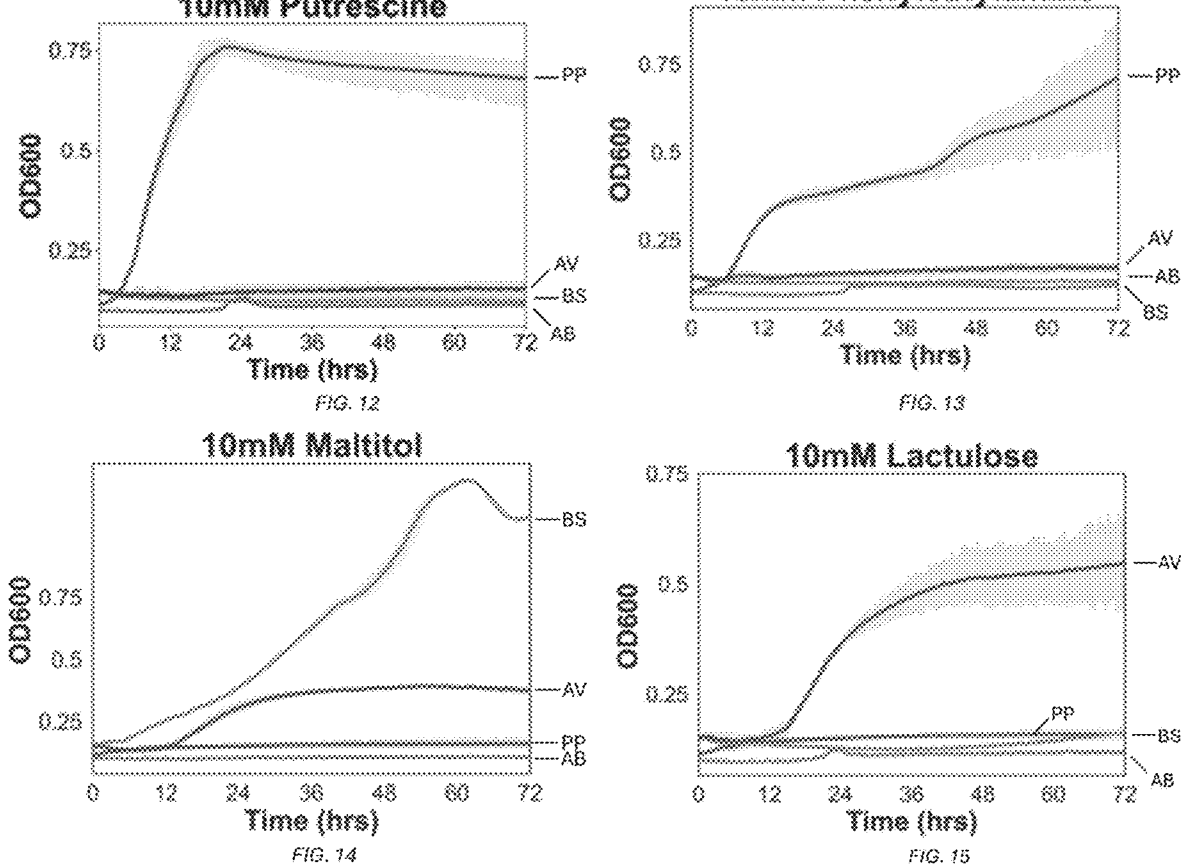

FIG. 12 is a growth curve depicting growth of different bacteria on the same soil bacteria-enriching agent according to some embodiments disclosed herein.

FIG. 13 is a growth curve depicting growth of different bacteria on the same soil bacteria-enriching agent according to some embodiments disclosed herein.

FIG. 14 is a growth curve depicting growth of different bacteria on the same soil bacteria-enriching agent according to some embodiments disclosed herein.

FIG. 15 is a growth curve depicting growth of different bacteria on the same soil bacteria-enriching agents according to some embodiments disclosed herein.

Figures 16, 17:
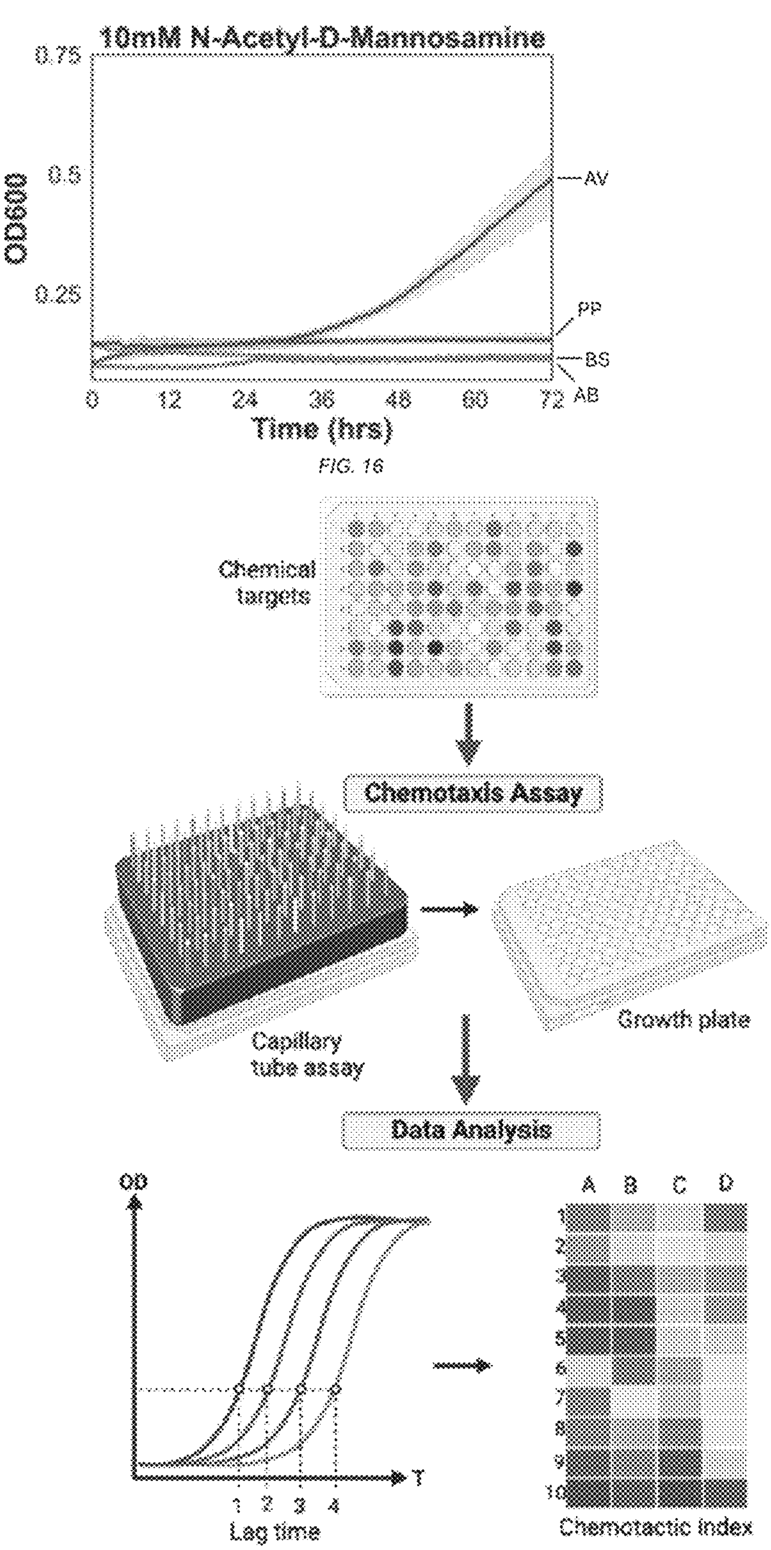

FIG. 16 is a growth curve depicting growth of different bacteria on the same soil bacteria-enriching agents according to some embodiments disclosed herein.

FIG. 17 is a schematic of chemotaxis assay according to some embodiments disclosed herein.

Figures 18, 19:
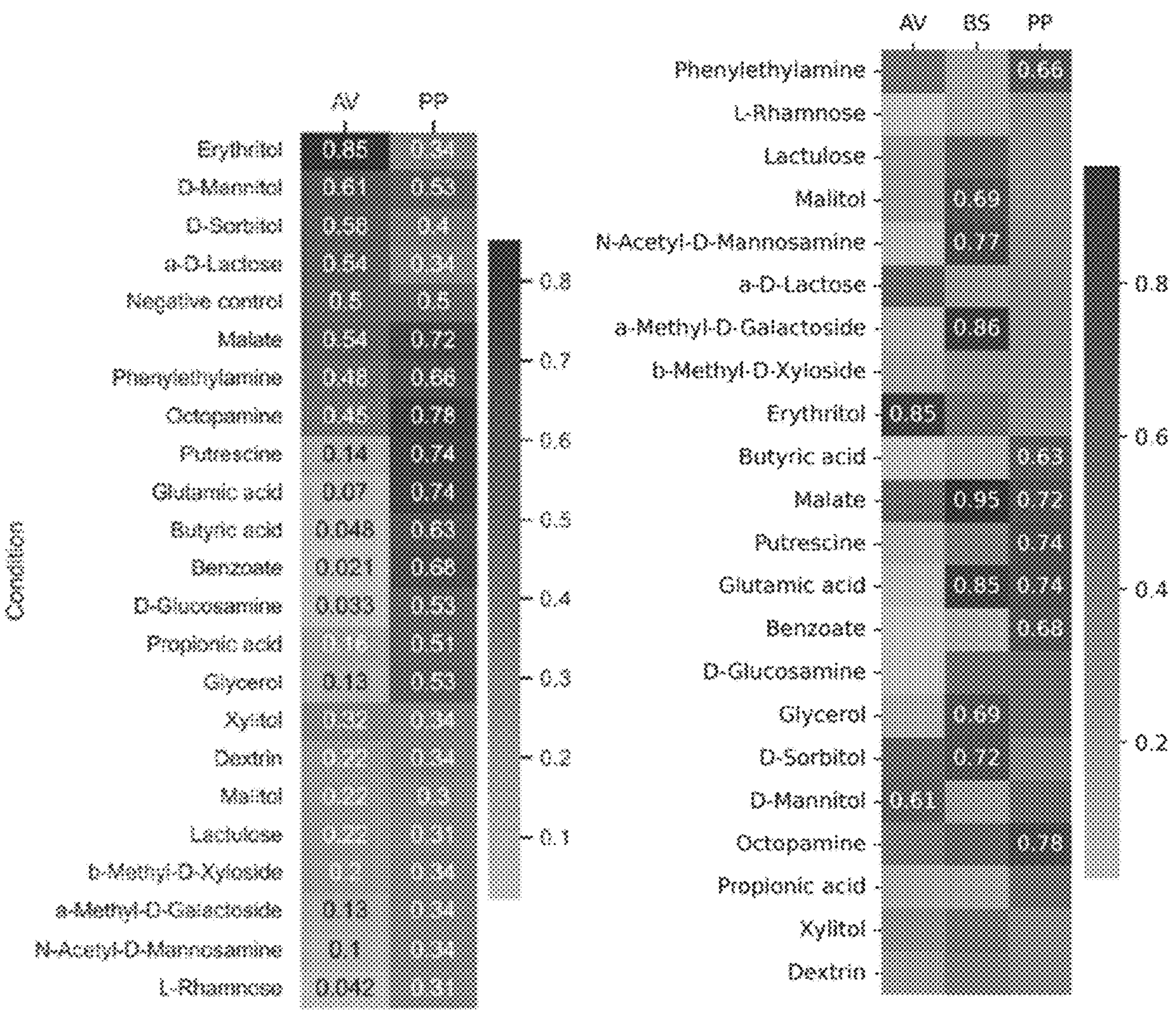

FIG. 18 is a heatmap of the chemotaxis index for bacteria towards different chemoeffectors according to some embodiments disclosed herein. AV: *Azotobacter vinelandii*, PP: *Pseudomonas putida*.

FIG. 19 is a heatmap of the chemotaxis index for bacteria towards different chemoeffectors according to some embodiments disclosed herein. AV: *Azotobacter vinelandii*, BS: *Bacillus subtilis*, PP: *Pseudomonas putida*.

Figure 20:
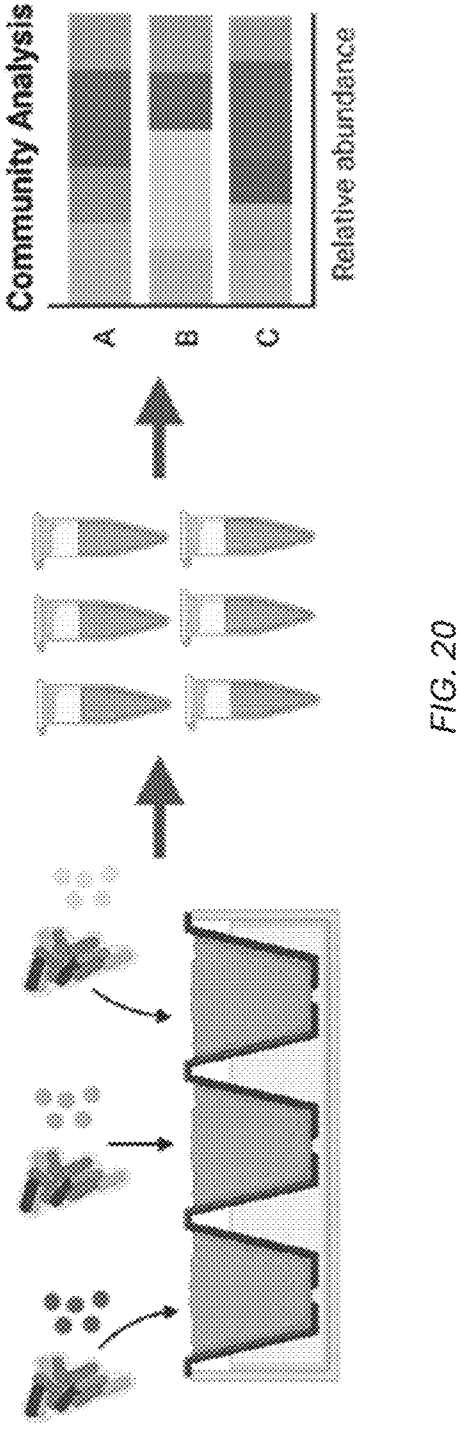

FIG. 20 is a schematic of a soil bacteria-enrichment assay according to some embodiments disclosed herein.

Figures 21, 22, 23, 24:
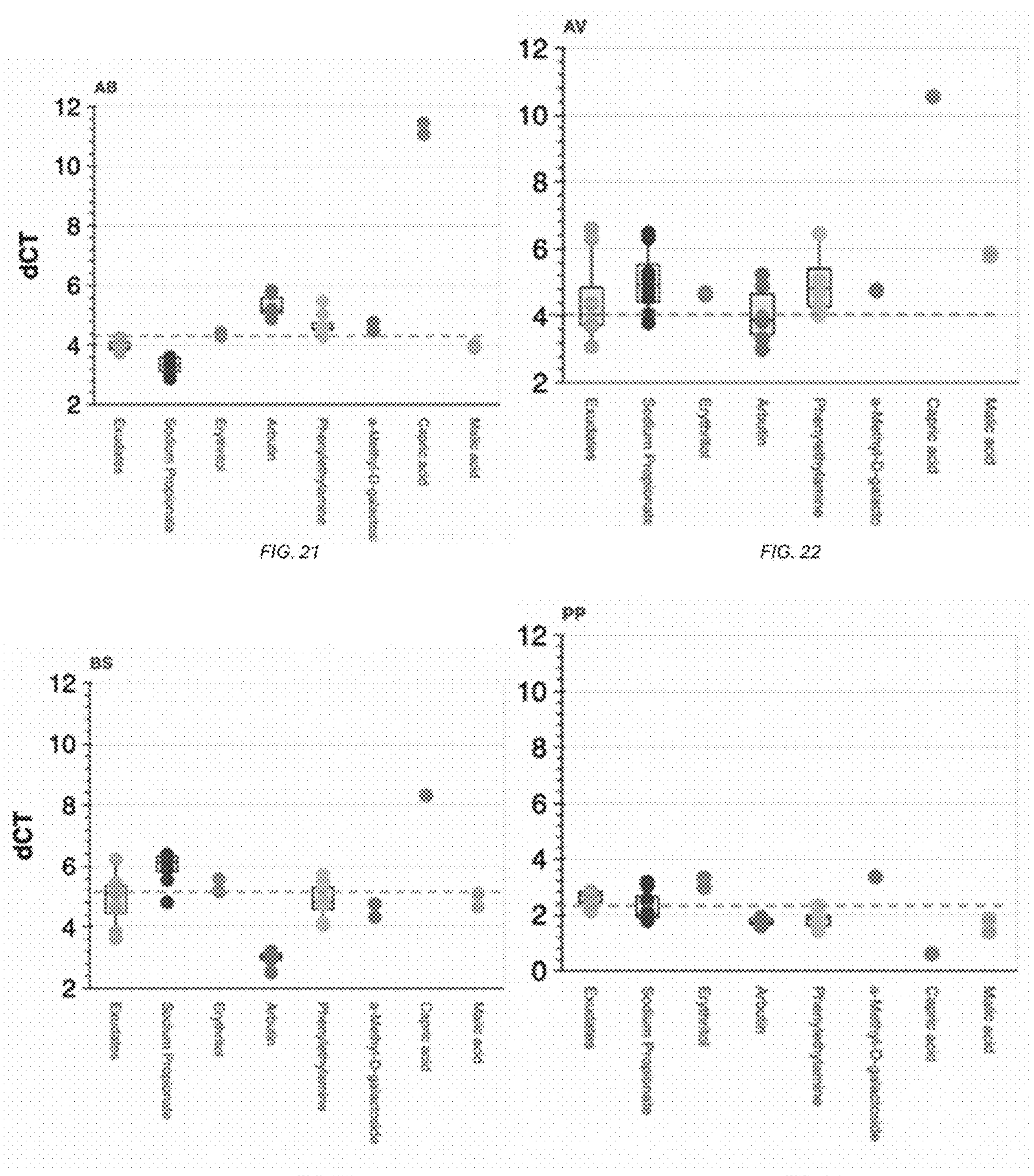

FIG. 21 is a graph depicting competition of bioinoculant AB: *Azospirillum brasilense* in non-sterile agriculture soil with addition of selective soil bacteria-enriching agents according to some embodiments disclosed herein. dCT: difference between cycle number of desired bacteria (using species-specific primers) and all bacteria (using universal primers).

FIG. 22 is a graph depicting competition of bioinoculant AV: *Azotobacter vinelandii* in non-sterile agriculture soil with addition of selective soil bacteria-enriching agents according to some embodiments disclosed herein. dCT: difference between cycle number of desired bacteria (using species-specific primers) and all bacteria (using universal primers).

FIG. 23 is a graph depicting competition of bioinoculant BS: *Bacillus subtilis* in non-sterile agriculture soil with addition of selective soil bacteria-enriching agents according to some embodiments disclosed herein. dCT: difference between cycle number of desired bacteria (using species-specific primers) and all bacteria (using universal primers).

FIG. 24 is a graph depicting competition of bioinoculant PP: *Pseudomonas putida* in non-sterile agriculture soil with addition of selective soil bacteria-enriching agents according to some embodiments disclosed herein. dCT: difference between cycle number of desired bacteria (using species-specific primers) and all bacteria (using universal primers).

Figure 25:
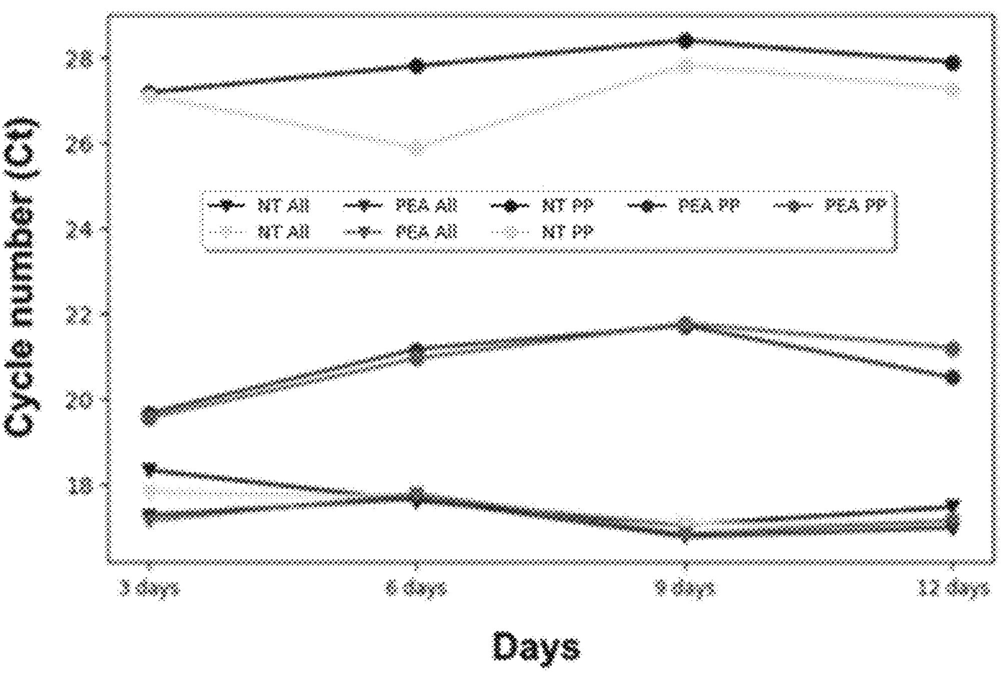

FIG. 25 is a graph depicting persistence of bioinoculant PP: *Pseudomonas putida* in non-sterile agriculture soil with or without the addition of selective soil bacteria-enriching agent phenylethylamine (PEA) over time according to some embodiments disclosed herein. NT: no target added.

Figure 26:
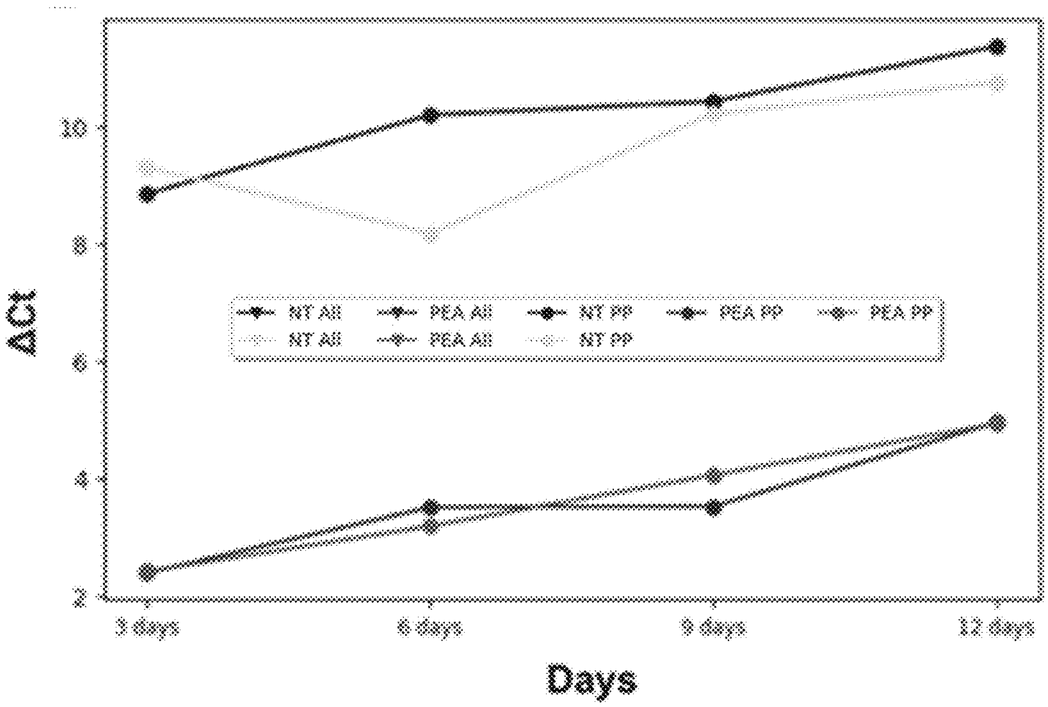

FIG. 26 is a graph depicting persistence of bioinoculant PP: *Pseudomonas putida* in non-sterile agriculture soil with or without the addition of selective soil bacteria-enriching agent phenylethylamine (PEA) over time normalized to cycle number of all bacteria according to some embodiments disclosed herein. NT: no target added. ACT: difference between cycle number of desired bacteria (using species-specific primers) and all bacteria (using universal primers).

Figure 27:
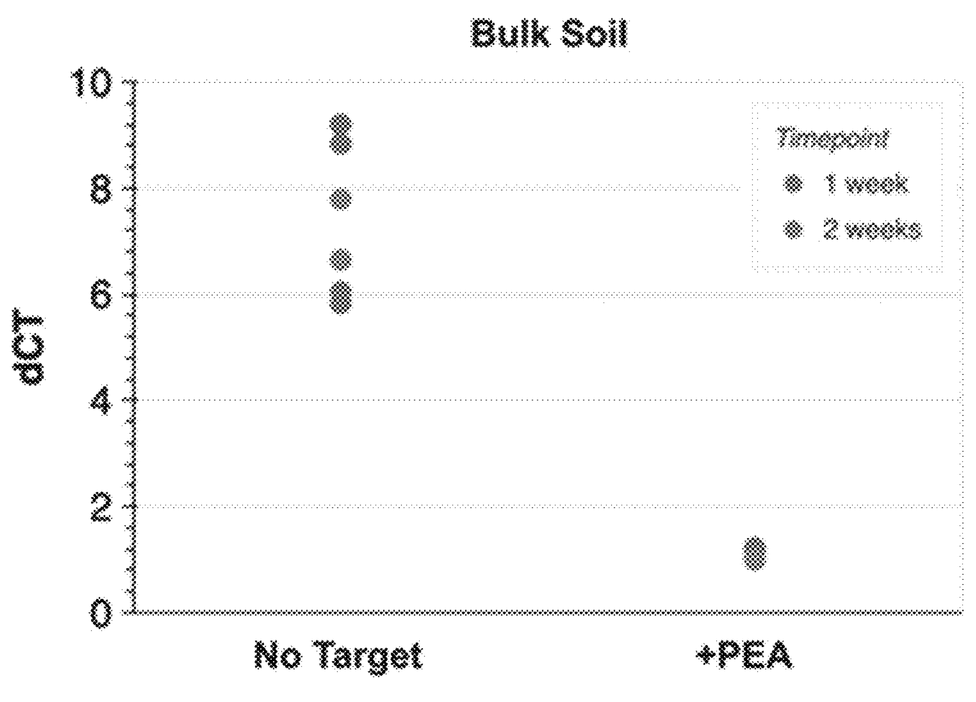

FIG. 27 is a graph depicting bulk soil enrichment of bioinoculant PP: *Pseudomonas putida* in non-sterile agriculture soil with the addition of selective soil bacteria-enriching agent phenylethylamine (PEA) compared to no target added condition when one or more plants are present in the soil over time according to some embodiments disclosed herein.

Figure 28:
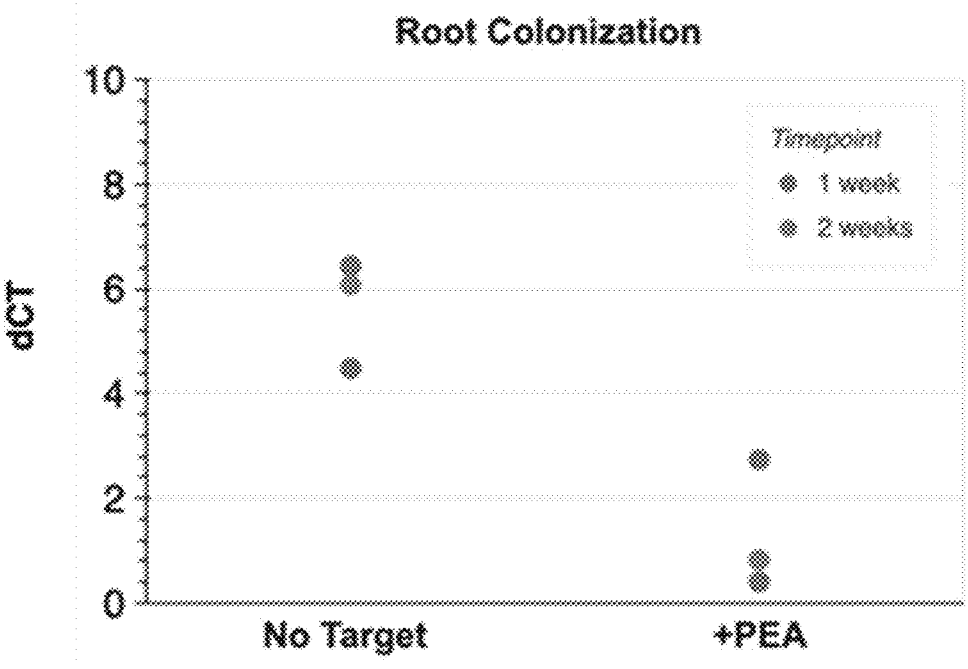

FIG. 28 is a graph depicting root colonization enrichment of bioinoculant PP: *Pseudomonas putida* in non-sterile agriculture soil with the addition of selective soil bacteria-enriching agent phenylethylamine (PEA) compared to no target added condition when one or more plants are present in the soil over time according to some embodiments disclosed herein.

DETAILED DESCRIPTION

Plant growth promoting rhizobacteria (PGPR) is a group of bacteria that can be found in the rhizosphere. As used herein, the term "plant growth promoting bacteria" has its plain and ordinary meaning and may also refer to bacteria that colonize the roots of plants (rhizosphere) that enriches plant growth. Rhizosphere is the soil environment where the plant root is available and is a zone of maximum microbial activity resulting in a confined nutrient pool in which essential macro- and micronutrients are extracted. The microbial population present in the rhizosphere is relatively different from that of its surroundings due to the presence of root exudates that function as a source of nutrients for microbial growth. Accordingly, there is a need for methods and compositions for identifying compounds that influence the growth of beneficial bacteria as well as a need for methods and compositions for manipulating the chemical composition of soil to increase the concentration of the identified agents to uniquely promote the growth of one or more desired species of bacteria within a soil microbiome.

In some embodiments, the one or more species of bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

Carbon Substrate Identification

Some embodiments disclosed herein relate to methods of identifying one or more soil bacteria-enriching agents that can be used alter the composition and function of a soil microbiome. In some embodiments, the method comprises identifying a carbon substrate preference for one or more bacteria. In some embodiments, the method comprises comparing the growth of a single bacteria of interest on two or more carbon substrates and identifying a carbon substrate that uniquely promotes growth of a bacteria as compared to growth of the bacteria in the presence of one or more other carbon substrates. In some embodiments, the method comprises identifying a carbon substrate that uniquely promotes the growth of a single species of bacteria in a soil microbiome that comprises at least one or more additional species of bacteria. In some embodiments, the method comprises comparing the growth of two or more different bacteria of interest in the presence of one or more carbon substrates and identifying a carbon substrate that uniquely promotes growth of one bacteria as compared to growth of the one or more other bacteria in the soil microbiome.

In some embodiments, the method comprises growing one or more liquid cultures of one or more bacteria of interest. In some embodiments, two or more bacteria of interest comprise the same species of bacteria. In some embodiments, two or more bacteria of interest comprise two or more different species of bacteria. In some embodiments, the liquid cultures are started from single colonies. The bacteria are then incubated at a desired temperature for a time sufficient for the bacteria to reach a desired concentration. The bacteria are then diluted to a desired concentration. For example, in some embodiments, following growth of a bacterial culture overnight, the $OD_{600}$ of the cultures is recorded, and the dilution factor necessary to achieve a desired volume of the culture having a desired $OD_{600}$ is calculated. In some embodiments, the dilution factor necessary to achieve a desired volume of the culture having an $OD_{600}$ of 0.05 is calculated. The appropriate volume of the culture is then spun down and supernatant is removed. The removed cells are then washed and resuspended. In some embodiments, the cells are resuspended in a resuspension fluid, for example, but not limited to an inoculation fluid (IF) or plant root exudates. In some embodiments, resuspending the cells in plant exudates results in different results than when the cells are resuspended in IF. In some embodiments, the cells are resuspended in a medium that closely resembles the nutrient availability of the rhizosphere. A single carbon substrate target is added to each culture. In some embodiments, the same concentration of each target carbon substrate is added. In some embodiments, different concentrations of each target carbon substrate are added. The cultures are then incubated, and growth of the bacteria is monitored over a desired amount of time. Methods of measuring the growth of bacteria are known in the art, for example, but not limited to, measuring the optical density (OD) or the number of colony forming units (CFU). Any one or more of these known methods are suitable for use in the methods disclosed herein. For example, in some embodiments, unique growth carbon substrates are identified by determining the maximum $OD_{600}$ achieved by each culture. In some embodiments, this max $OD_{600}$ data may be used to create heatmaps and/or to narrow down carbon substrate targets. For example, in some embodiments, carbon substrate targets are identified as those in which a bacterial strain achieved an $OD_{600}$ of greater than 0.5. In some embodiments, carbon substrate targets are identified as those which promote the growth of one species of bacteria to a max $OD_{600}$ of greater than 0.5, while one or more different species of bacteria, for example, but not limited to, one or more different species of bacteria that may be present in a soil microbiome, achieve a max $OD_{600}$ of less than 0.5 when grown on the same carbon substrate. In some embodiments, carbon substrate targets are identified as those which promote the growth of one or more species of bacteria to a max $OD_{600}$ of greater than 0.5, while one or more other candidate carbon substrates promote growth of the same species of bacteria to a max $OD_{600}$ of less than 0.5. In some embodiments, the difference in growth, for example, max $OD_{600}$, that is used as a cut off is adjusted to identify more or fewer targets. In some embodiments, the methods disclosed herein further comprise performing a chemotaxis assay to determine whether the identified carbon substrate functions as a chemoattractant and/or chemorepellent of one or more bacteria.

In some embodiments, Biolog microbial metabolic phenotyping arrays are used to screen bacterial growth on a large library of carbon substrates. In some embodiments, one or more of Biolog PM1 and PM2, and PM3 microplates, and/or any combination thereof are used along with an inoculating fluid (e.g., PM IF-0a GN/GP Base (1.2×)). In some embodiments, the method comprises growing one or more liquid culture of one or more bacteria of interest. In some embodiments, the liquid cultures are started from single colonies. The bacteria are then grown for a desired time or for a time sufficient for the bacteria to reach a desired concentration. For example, in some embodiments, PP and BS are grown overnight in TSB at 28° C. In some embodiments, AV is grown in Burk's media for 36-48 hours at 28° C. In some embodiments, AB is grown in spirillum media for 36-48 hours at 28° C. The bacteria are then diluted to a desired concentration. For example, in some embodiments, following growth of a bacterial culture overnight, the $OD_{600}$ of the cultures is recorded, and the volume of the culture needed to produce a 12 mL of a bacterial culture having an $OD_{600}$ of 0.05 is calculated. The appropriate volume of the culture is then spun down and supernatant is removed. The remaining cells are then washed and resuspended in IF, plant exudate, or a medium that resembles the nutrient availability of the rhizosphere. In some embodiments, a desired volume of the resuspended cell culture is added to each well of a Biolog plate. The plates are then incubated, and growth of the bacteria is monitored over a desired amount of time. For example, in some embodiments, the plates are placed in a plate reader (e.g., a TECAN), and incubated at 28° C. for 72 hours with continuous orbital shaking, with the $OD_{600}$ of the bacteria being read every 20 minutes. In some embodiments, unique growth carbon substrates are identified by determining the maximum $OD_{600}$ achieved in each well of the Biolog plate. In some embodiments, this max $OD_{600}$ data may be used to create heatmaps and/or to narrow down carbon substrate targets. For example, in some embodiments, carbon substrate targets are identified as those in which a bacterial strain achieved an $OD_{600}$ of greater than 0.5 while the max $OD_{600}$ achieved by the same bacterial strain on other carbon substrates was less than 0.5. In some embodiments, the difference in max $OD_{600}$ that is used as a cut off is adjusted to identify more or fewer targets.

In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), *Azospirillum brasilense* (AB) or any combination thereof.

In some embodiments, one or more carbon substrates are tested. Table 1 discloses a non-exhaustive list of candidate soil bacteria-enriching agents. In some embodiments, the carbon substrate comprises one or more agents in Table 1. In some embodiments, the carbon substrate comprises an agent other than those listed in Table 1.

TABLE 1

| | Soil bacteria-enriching Agent |
|---|---|
| 1 | L-Arabinose |
| 2 | N-Acetyl-D-Glucosamine |
| 3 | D-Saccharic acid |
| 4 | Succinic acid |
| 5 | D-Galactose |
| 6 | L-Aspartic acid |
| 7 | L-Proline |
| 8 | D-Alanine |
| 9 | D-Trehalose |
| 10 | D-Mannose |
| 11 | Dulcitol |
| 12 | D-Serine |
| 13 | D-Sorbitol |
| 14 | Glycerol |
| 15 | L-Fucose |
| 16 | D-Glucuronic acid |
| 17 | D-Gluconic acid |
| 18 | DL-a-Glycerol Phosphate |
| 19 | D-Xylose |
| 20 | L-Lactic acid |
| 21 | Formic acid |
| 22 | D-Mannitol |
| 23 | L-Glutamic acid |
| 24 | D-Glucose-6-Phosphate |
| 25 | D-Galactonic acid-g-Lactone |
| 26 | DL-Malic acid |
| 27 | D-Ribose |
| 28 | Tween 20 |
| 29 | L-Rhamnose |
| 30 | D-Fructose |
| 31 | Acetic acid |
| 32 | a-D-Glucose |
| 33 | Maltose |
| 34 | D-Melibiose |
| 35 | Thymidine |
| 36 | L-Asparagine |
| 37 | D-Aspartic acid |
| 38 | D-Glucosaminic acid |
| 39 | 1,2-Propanediol |
| 40 | Tween 40 |
| 41 | a-Ketoglutaric acid |
| 42 | a-Ketobutyric acid |

TABLE 1-continued

| | Soil bacteria-enriching Agent |
|---|---|
| 43 | a-Methyl-D-Galactoside |
| 44 | a-D-Lactose |
| 45 | Lactulose |
| 46 | Sucrose |
| 47 | Uridine |
| 48 | L-Glutamine |
| 49 | m-Tartaric acid |
| 50 | D-Glucose-1-Phosphate |
| 51 | D-Fructose-6-Phosphate |
| 52 | Tween 80 |
| 53 | a-Hydroxyglutaric acid-g-Lactone |
| 54 | a-Hydroxybutyric acid |
| 55 | b-Methyl-D-Glucoside |
| 56 | Adonitol |
| 57 | Maltotriose |
| 58 | 2'-Deoxyadenosine |
| 59 | Adenosine |
| 60 | Gly-Asp |
| 61 | Citric acid |
| 62 | m-Inositol |
| 63 | D-Threonine |
| 64 | Fumaric acid |
| 65 | Bromosuccinic acid |
| 66 | Propionic acid |
| 67 | Mucic acid |
| 68 | Glycolic acid PM1 |
| 69 | Glyoxylic acid |
| 70 | D-Cellobiose |
| 71 | Inosine |
| 72 | Gly-Glu |
| 73 | Tricarballylic acid |
| 74 | L-Serine |
| 75 | L-Threonine |
| 76 | L-Alanine |
| 77 | Ala-Gly |
| 78 | Acetoacetic acid |
| 79 | N-Acetyl-D-Mannosamine |
| 80 | Mono-Methylsuccinate |
| 81 | Methylpyruvate |
| 82 | D-Malic acid |
| 83 | L-Malic acid |
| 84 | Gly-Pro |
| 85 | p-Hydroxyphenyl Acetic acid |
| 86 | m-Hydroxyphenyl Acetic acid |
| 87 | Tyramine |
| 88 | D-Psicose |
| 89 | L-Lyxose |
| 90 | Glucuronamide |
| 91 | Pyruvic acid |
| 92 | L-Galactonic acid-g-Lactone |
| 93 | D-Galacturonic acid |
| 94 | Phenylethylamine |
| 95 | 2-Aminoethanol |
| 96 | Chondroitin Sulfate C |
| 97 | a-Cyclodextrin |
| 98 | b-Cyclodextrin |
| 99 | g-Cyclodextrin |
| 100 | Dextrin |
| 101 | Gelatin |
| 102 | Glycogen |
| 103 | Inulin |
| 104 | Laminarin |
| 105 | Mannan |
| 106 | Pectin |
| 107 | N-Acetyl-D-Galactosamine |
| 108 | N-Acetyl-Neuraminic acid |
| 109 | b-D-Allose |
| 110 | Amygdalin |
| 111 | D-Arabinose |
| 112 | D-Arabitol |
| 113 | L-Arabitol |
| 114 | Arbutin |
| 115 | 2-Deoxy-D-Ribose |
| 116 | i-Erythritol |
| 117 | D-Fucose |
| 118 | 3-O-b-D-Galactopyranosyl-D-Arabinose |
| 119 | Gentiobiose |
| 120 | L-Glucose |

TABLE 1-continued

| | Soil bacteria-enriching Agent |
|---|---|
| 121 | D-Lactitol |
| 122 | D-Melezitose |
| 123 | Maltitol |
| 124 | a-Methyl-D-Glucoside |
| 125 | b-Methyl-D-Galactoside |
| 126 | 3-Methylglucose |
| 127 | b-Methyl-D-Glucuronic acid |
| 128 | a-Methyl-D-Mannoside |
| 129 | b-Methyl-D-Xyloside |
| 130 | Palatinose |
| 131 | D-Raffinose |
| 132 | Salicin |
| 133 | Sedoheptulosan |
| 134 | L-Sorbose |
| 135 | Stachyose |
| 136 | D-Tagatose |
| 137 | Turanose |
| 138 | Xylitol |
| 139 | N-Acetyl-D-Glucosaminitol |
| 140 | g-Amino-N-Butyric acid |
| 141 | d-Amino Valeric acid |
| 142 | Butyric acid |
| 143 | Capric acid |
| 144 | Caproic acid |
| 145 | Citraconic acid |
| 146 | Citramalic acid |
| 147 | D-Glucosamine |
| 148 | 2-Hydroxybenzoic acid |
| 149 | 4-Hydroxybenzoic acid |
| 150 | b-Hydroxybutyric acid |
| 151 | Glycolic acid PM2 |
| 152 | a-Keto-Valeric acid |
| 153 | Itaconic acid |
| 154 | 5-Keto-D-Gluconic acid |
| 155 | D-Lactic acid Methyl Ester |
| 156 | Malonic acid |
| 157 | Melibionic acid |
| 158 | Oxalic acid |
| 159 | Oxalomalic acid |
| 160 | Quinic acid |
| 161 | D-Ribono-1,4-Lactone |
| 162 | Sebacic acid |
| 163 | Sorbic acid |
| 164 | Succinamic acid |
| 165 | D-Tartaric acid |
| 166 | L-Tartaric acid |
| 167 | Acetamide |
| 168 | L-Alaninamide |
| 169 | N-Acetyl-L-Glutamic acid |
| 170 | L-Arginine |
| 171 | Glycine |
| 172 | L-Histidine |
| 173 | L-Homoserine |
| 174 | Hydroxy-L-Proline |
| 175 | L-Isoleucine |
| 176 | L-Leucine |
| 177 | L-Lysine |
| 178 | L-Methionine |
| 179 | L-Ornithine |
| 180 | L-Phenylalanine |
| 181 | L-Pyroglutamic acid |
| 182 | L-Valine |
| 183 | D,L-Carnitine |
| 184 | sec-Butylamine |
| 185 | D,L-Octopamine |
| 186 | Putrescine |
| 187 | Dihydroxyacetone |
| 188 | 2,3-Butanediol |
| 189 | Benzoate |
| 190 | Malate |
| 191 | Octopamine hydrochloride |

In some embodiments, the carbon substrate comprises one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid, and/or any combination thereof.

In some embodiments, the carbon substrate comprises one or more of phenylethylamine (PEA), capric acid, arbutin, methyl-D-galactoside, propionic acid, sodium propionate or malic acid, and/or any combination thereof.

In some embodiments, target carbon substrates are identified by determining the maximum amount of bacterial growth achieved by each culture. In some embodiments, determining the maximum amount of bacterial growth comprises determining the concentration of bacteria in each culture. In some embodiments, determining the concentration of bacteria in each culture comprises using quantitative PCR (qPCR) with species-specific primers. In some embodiments, determining the concentration of bacteria in each culture comprises determining the max $OD_{600}$ achieved by each culture. In some embodiments, carbon substrate targets are identified as those in which a bacterial strain achieved an $OD_{600}$ of greater than about 0.4 when normalized to the $OD_{600}$ of a negative control well without added agent. In some embodiments, carbon substrate targets are identified as those in which a bacterial strain achieved an $OD_{600}$ of greater than about 0.4, 0.45, 0.5, 0.55, 0.6, 0.65, 0.7, 0.75, 0.8, 0.85, 0.9, 0.95 or 1.0 when normalized to the $OD_{600}$ of a negative control well without added agent. In some embodiments, carbon substrate targets are identified as those in which a bacterial strain achieved an $OD_{600}$ of greater than about 1.0 when normalized to the $OD_{600}$ of a negative control well without added agent.

In some embodiments, the ability of a carbon substrate to uniquely, or selectively, promote growth of one or more desired species of bacteria as compared to one or more different species of bacteria is measured. In some embodiments, unique carbon substrate targets are identified as those which promote the growth of a single species of bacteria to a max $OD_{600}$ of greater than about 0.4, 0.45, 0.5, 0.55, 0.6, 0.65, 0.7, 0.75, 0.8, 0.85, 0.9, 0.95 or 1.0 when normalized to the $OD_{600}$ of a negative control well without added agent, while other, different bacteria grown in the presence of the same carbon substrate achieve a max $OD_{600}$ of less than about 0.2, 0.25, 0.3, 0.35, 0.4. In some embodiments, carbon substrate targets are identified as those in which a carbon substrate promotes growth of a single species of bacteria to a concentration of greater than about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ cells/mL when normalized to the cells/mL of a negative control well without added agent, while other bacteria achieve a concentration of less than about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ cells/mL when grown in the presence of the same carbon substrate.

In some embodiments, the identified carbon substrate increases growth of a desired bacterial species in a soil microbiome by up to about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of the bacterial species when the identified carbon substrate is not present. For example, in some embodiments, the identified carbon substrate increases growth of a desired bacterial species in a soil microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% or more as compared to growth of the bacterial species when the identified carbon substrate is not present. In some embodiments, the identified carbon substrate increases growth of a desired bacterial species in a soil microbiome by about up to about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of the bacterial species when the identified carbon substrate is not present. For example, in some embodiments, the identified carbon substrate increases growth of a desired bacterial species in a soil microbiome by up to between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold or more as compared to growth of the bacterial species when the identified carbon substrate is not present.

Chemotaxis Assay

Some embodiments herein are directed to methods and high-throughput methods for identifying unique bacterial chemoeffectors. Chemoattraction towards root exudates is a major first step to root colonization, because of this, modulating the secretion of chemoeffectors from plant roots represents an additional strategy to manipulate plant-microbe interactions in the rhizosphere. Accordingly, some embodiments disclosed herein relate to a chemotaxis assay for identifying chemoeffector compounds that may be used to alter the composition and function of a soil microbiome. In some embodiments, the chemoeffector comprises a chemoattractant for one or more specific species of bacteria. In some embodiments, the chemoeffector comprises a chemorepellent for one or more specific species of bacteria.

An exemplary chemotaxis assay is illustrated in FIG. 17. In some embodiments, a chemotaxis assay comprises placing a capillary tube holder, filled with one or more capillary tubes on top of a multi-well plate comprising one or more candidate chemoeffectors. In some embodiments, each well of the multi-well plate comprises the same candidate chemoeffector. In some embodiments, two or more wells in the multi-well plate comprise different candidate chemoeffectors. Many varieties of multi-well plates having different numbers of wells are commercially available. Any such multi-well plate is suitable for use in the methods disclosed herein. In some embodiments, the capillary tube holder comprises a number of capillary tubes equal to the number of wells in the multi-well chemoeffector plate. In some embodiments, each capillary tube in the capillary tube holder is aligned with a single well of the multi-well candidate chemoeffector plate. The capillary tube holder is allowed to sit on top of the multi-well candidate chemoeffector plate for a sufficient time for one or more of the capillary tubes to fill to a desired level with a candidate chemoeffector from the multi-well candidate chemoeffector plate. Once the tubes have filled with candidate chemoeffectors, the top of the capillary holder is sealed with a plate sealing film. The capillary tube holder is then washed and transferred to a multi-well plate containing a desired concentration of bacteria. In some embodiments, each well of the multi-well plate comprises the same bacteria. In some embodiments, two or more wells in the multi-well plate comprise different bacteria. The multi-well plate is then incubated for a desired amount of time and under conditions such that bacteria in the multi-well plate will enter the capillary tube if the candidate chemoeffector is chemoattractant. Following incubation, the capillary tube holder is transferred to a new multi-well plate, the seal is removed, and the multi-well plate along with the capillary tube holder is spun in a centrifuge to expel the contents of the capillary tubes, i.e., the candidate chemoeffector and any bacteria that enter the capillary tube during incubation, into the plate. Growth media is added to each well and the multi-well plate is incubated again for a desired amount of time and under conditions sufficient for the bacteria to reach exponential growth phase. In some embodiments, the multi-well plate is incubated with shaking. In some embodiments, the shaking is orbital shaking. The concentration of the cells is then measured at regular time intervals to determine the lag time in growth as a proxy for starting cell concentration. The temperature and time of incubation will depend on the nature of the bacteria. The lag time of the bacteria in each well is used to identify the starting concentration of bacterial cells in each capillary tube. To do this, the time at which the growth curve hits exponential phase (i.e., an $OD_{600}$ of about 0.25) is calculated. The starting cell concentration is then back calculated using a standard curve of cell count. Once initial cell concentration is determined for each well of the multi-well plate, the chemotactic index at 30 minutes (I30) is calculated. In some embodiments, the I30 is calculated using Formula 1:I30=x/(x+y), where x equals the number of cells in a candidate chemoeffector filled capillary tube and y equals the number of cells in control filled capillary tube. In some embodiments, an I30 that is greater than 0.5 indicates that the candidate chemoeffector is chemoattractant. In some embodiments, an I30 that is equal to 0.5 indicates that the candidate chemoeffector is neutral, neither a chemoattractant nor a chemorepellent. In some embodiments, an I30 that is less than 0.5 indicates that the candidate chemoeffector is a chemorepellent.

In some embodiments, the chemotaxis assay comprises filling a 96- or 384-well plate with one or more candidate chemoeffectors to be tested. A capillary tube holder is then filled with capillary tubes and placed on top of the candidate chemoeffector plate. Once the tubes have filled with candidate chemoeffectors (via capillary action), the top of the capillary holder is sealed with a plate sealing film. The capillary tube holder is then dipped in a plate containing sterile PBS to wash and transferred to a plate containing OD 0.1 of one or more species of bacteria. The plate is then incubated for 30-45 minutes to allow the one or more species of bacteria to potentially enter one or more of the capillary tubes. After 30-45 minutes, the capillary tube holder is removed and again dipped into the PBS wash plate. The capillary tube holder is transferred to a new multi-well plate, the seal is removed, and the plate along with the capillary tube holder is spun in a centrifuge at 200 rcf for 1 minute to expel the contents of the capillary tubes, i.e., the candidate chemoeffector and any bacteria in the capillary tube, into the plate. Growth media is then added to each well of the multi-well plate and the plate is transferred to a plate reader. Plates are read in a TECAN at 28° C. with continuous orbital shaking for 24-72 hours depending on the growth rate of the strain. The $OD_{600}$ of each well in the multi-well plate is then read every 20 minutes. The lag time of the bacteria in each well is used to identify the starting concentration of bacterial cells in each capillary tube. To do this, the time at which the growth curve hits exponential phase (i.e., an $OD_{600}$ of about 0.25) is calculated. The starting cell concentration is then back calculated using a standard curve of cell count. Once the initial cell concentration is determined for each well of the multi-well plate, the chemotactic index (I30) is calculated. In some embodiments, the I30 is calculated using Formula 1:I30=x/(x+y), where x equals the number of cells in a candidate chemoeffector filled capillary tube and y equals the number of cells in control filled capillary tube. In some embodiments, an I30 that is greater than 0.5 indicates that the candidate chemoeffector is chemoattractant. In some embodiments, an I30 that is 0.5 indicates that the candidate chemoeffector is neutral, neither a chemoattractant nor a chemorepellent. In some embodiments, an I30 that is less than 0.5 indicates that the candidate chemoeffector is a chemorepellent. In some embodiments, chemoeffector targets are identified as those targets for which one or more species of bacteria have an I30 that is greater than 0.5 towards one or more chemoattractants, while one or more different species of bacteria, for example, but not limited to, one or more different species of bacteria that may be present in a soil microbiome, have an I30 that is less than 0.5 towards the same chemoattractant. In some embodiments, chemoeffector targets are identified as those targets for which one or more species of bacteria have an I30 that is greater than 0.5 towards one or more chemoattractants, while the same one or more species of bacteria, for example, but not limited to, one or more different species of bacteria that may be present in a soil microbiome, have an I30 that is less than 0.5 towards one or more different chemoattractants.

In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

In some embodiments, one or more chemoeffectors are tested and/or identified. Table 1 discloses a non-exhaustive list of candidate soil bacteria-enriching agents. In some embodiments, the chemoeffector comprises one or more agents in Table 1. In some embodiments, the chemoeffector comprises one or more agents other than those listed in Table 1.

In some embodiments, the chemoeffector comprises one or more of phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

Capillary Tube Holder

Some embodiments disclosed herein are directed to apparatuses for performing a high-throughput chemotaxis assay and methods of use thereof. In some embodiments, the apparatus comprises a capillary tube holder configured to hold two or more capillary tubes. An exemplary embodiment is illustrated in FIG. 17. In some embodiments, the capillary tube holder is configured to hold 2, 3, 4, 5, 6, 7, 8, 9, 10, 15, 20, 25, 30, 35, 40, 45, 50, 55, 60, 65, 70, 75, 80, 85, 90, 95, 96, 100, 125, 150, 175, 200, 225, 250, 275, 300, 325, 350, 375 or 384, or more capillary tubes, or a number of capillary tubes that is in a range that is defined by any two of the preceding values. For example in some embodiments, the capillary tube holder is configured to hold between 1-384, 1-300, 1-200, 1-100, 1-96, 1-75, 1-50, 1-25, 1-12, 1-10, 1-8, 1-6, 6-384, 6-300, 6-200, 6-100, 6-96, 6-75, 6-50, 6-25, 6-12, 6-10, 6-8, 8-384, 8-300, 8-200, 8-100, 8-96, 8-75, 8-50, 8-25, 8-12, 12-384, 12-300, 12-200, 12-100, 12-96, 12-75, 12-50, 12-25, 25-384, 25-300, 25-200, 25-100, 25-96, 25-75, 75-384, 75-300, 75-200, 75-100, 75-96, 96-384, 96-300, 96-200, 96-100, 100-384, 100-300, 100-200, 200-384, 200-300 or 300-384 capillary tubes. In some embodiments, the capillary tube holder is configured to sit atop a multi-well plate. In some embodiments, the multiwell plate is a 6-well, 8-well, 12-well, 96-well, or 384-well plate. In some embodiments, the capillary tube holder is configured to sit atop a 96-well plate. In some embodiments, the capillary tube holder is configured to sit atop a 384-well plate. In some embodiments, the capillary tube holder is configured to hold 1, 2, 3, 4, 5, 6, 7, 8, 9 or 10 or more capillary tubes per well in a 6-well, 8-well, 12-well, 96-well, or 384-well plate; or is configured to hold a number of capillary tubes per well in a 6-well, 8-well, 12-well, 96-well, or 384-well plate that is in a range defined by any two of the preceding values. For examples, in some embodiments, the capillary tube holder is configured to hold between 1-10, 1-7, 1-5, 1-3, 1-2, 2-10, 2-7, 2-5, 2-3, 3-10, 3-7, 3-5, 5-10, 5-7 or 7-10 capillary tubes per well in a 6-well, 8-well, 12-well, 96-well, or 384-well plate.

In some embodiments, the capillary tube holder is configured to hold capillary tubes having a capacity of about 0.1 μL, 0.2 μL, 0.3 μL, 0.4 μL, 0.5 μL, 0.6 μL, 0.7 μL, 0.8 μL, 0.9 μL, 1 μL, 2 μL, 3 μL, 4 μL, 5 μL, 6 μL, 7 μL, 8 μL, 9 μL, 10 μL, 20 μL, 25 μL, 30 μL, 40 μL, 50 μL, 60 μL, 70 μL, 75 μL, 80 μL, 90 μL, or 100 μL or more, or a capacity that is in a range that is defined by any two of the preceding values. For example, in some embodiments, the capillary tube holder is designed to hold capillary tubes having a capacity of between about 0.1-100 μL, 0.1-75 μL, 0.1-50 μL, 0.1-25 μL, 0.1-10 μL, 0.1-5 μL, 0.1-1 μL, 0.1-0.9 μL, 0.1-0.7 μL, 0.1-0.5 μL, 0.1-0.3 μL, 0.3-1 μL, 0.3-0.7 μL, 0.3-0.5 μL, 0.5-1 μL, 0.5-0.7 L, 0.7-1 μL, 1-100 μL, 1-75 μL, 1-50 μL, 1-25 μL, 1-10 μL, 10-100 μL, 10-75 μL, 10-50 μL, 10-25 μL, 25-100 μL, 25-75 μL, 25-50 μL, 50-100 μL, 50-75 μL or 75-100 μL. In some embodiments, the capillary tube holder is configured to hold capillary tubes having a capacity of about 3-4 μL. In some embodiments, the capillary tube holder has holes that fit 4 μl Microcaps® Disposable Micropipettes, Drummond (Catalog No. 53440-067). In some embodiments, the capillary tube holes are configured to be tight enough to hold the capillary tubes during centrifugation but still allow the capillary tubes to be removed and replaced manually. In some embodiments, the height of the capillary tube holder is configured such that the capillaries are submerged in the solution within the multi-well plate while being level with the top of the holder. In some embodiments, the top of the capillary tubes being level with the top of the capillary tube holder allows for sealing the top of the capillaries with a plate sealing film or another suitable multi-well plate sealer. In some embodiments, the capillary tube holder is 3D-printed. In some embodiments, the capillary tube holder is molded.

Combination Assay

Some embodiments herein relate to methods of identifying one or more soil bacteria-enriching agents that are useful in altering the composition and function of a soil microbiome. In some embodiments, the methods comprise identifying one or more soil bacteria-enriching agents that attracts and/or promotes the growth of a desired bacteria in a soil microbiome. In some embodiments the methods comprise identifying one or more soil bacteria-enriching agents that attracts and/or promotes the growth of a desired bacteria in a soil microbiome as compared to one or more other bacteria in the microbiome. In some embodiments, the method comprises identifying one or more soil bacteria-enriching agents that attracts and/or promotes the growth of a desired bacterial species within a soil microbiome. In some embodiments, the methods comprise comparing the growth of a single bacteria of interest on two or more soil bacteria-enriching carbon substrates and identifying a carbon substrate that promotes growth of the bacteria of interest as compared to growth of the bacteria in the presence of one or more other carbon substrates. In some embodiments, the method further comprises identifying one or more soil bacteria-enriching agents that acts as a chemoattractant towards a desired species of bacteria in a soil microbiome. In some embodiments, the method further comprises identifying one or more soil bacteria-enriching agents that uniquely acts as a chemoattractant towards a single species of bacteria in a soil microbiome that comprises at least one or more additional species of bacteria. In some embodiments, the growth-promoting carbon substrate and the chemoattractant are the same. In some embodiments, the growth-promoting carbon substrate and the chemoattractant are different.

In some embodiments, the method comprises growing one or more liquid cultures of a bacteria of interest. In some embodiments, the liquid cultures may be started from single colonies. The bacteria are then incubated at a desired temperature for a time sufficient for the bacteria to reach a desired concentration. The bacteria are then diluted to a desired concentration. For example, in some embodiments, following growth of a bacterial culture overnight, the $OD_{600}$ of the cultures is recorded, and the dilution factor necessary to achieve a desired volume of the culture having a desired $OD_{600}$ is calculated. In some embodiments, the dilution factor necessary to achieve a desired volume of the culture having an $OD_{600}$ of 0.05 is calculated. The appropriate volume of the culture is then spun down and supernatant is removed. The removed cells are then washed and resuspended. In some embodiments, the cells are resuspended in IF. In some embodiments, the cells are suspended in plant root exudates. In some embodiments, resuspending the cells in plant root exudates results in different results then when the cells are resuspended in IF. In some embodiments, the cells are resuspended in a medium that closely resembles the nutrient availability of the rhizosphere. A single carbon substrate target is added to each culture. In some embodiments, the same concentration of each target carbon substrate is added. In some embodiments, different concentrations of each target carbon substrate are added. The cultures are then incubated, and growth of the bacteria is monitored over a desired amount of time. Methods of measuring the growth of bacteria are known in the art, for example, but not limited to, measuring the optical density (OD) or the number of colony forming units (CFU). Any one or more of these known methods are suitable for use in the methods disclosed herein. For example, in some embodiments, unique growth carbon substrates are identified by determining the maximum $OD_{600}$ achieved by each culture. In some embodiments, this max $OD_{600}$ data may be used to create heatmaps and/or to narrow down carbon substrate targets. For example, in some embodiments, carbon substrate targets are identified as those in which a bacterial strain achieved an $OD_{600}$ of greater than 0.5. In some embodiments, carbon substrate targets are identified as those which promote the growth of one bacteria to a max $OD_{600}$ of greater than 0.5, while other bacteria in the soil microbiome achieve a max $OD_{600}$ of less than 0.5. In some embodiments, the difference in growth, for example, max $OD_{600}$, that is used as a cut off is adjusted to identify more or fewer targets.

In some embodiments one or more compounds are tested for their ability to serve as chemoattractants for the desired bacteria. In some embodiments, the identified carbon substrate targets are analyzed for their ability to act as a chemoattractant for a desired bacteria. In some embodiments, only the identified carbon substrate targets are tested for their ability to act as a chemoattractant for a desired bacteria. In some embodiments, one or more other compounds are tested.

In some embodiments, the chemotaxis assay comprises placing a capillary tube holder, filled with one or more capillary tubes on top of a multi-well plate comprising one or more chemoeffectors. In some embodiments, each well of the multi-well plate comprises the same chemoeffector. In some embodiments, two or more wells in the multi-well plate comprise different chemoeffectors. Many varieties of multi-well plates having different numbers of wells are commercially available. Any such multi-well plate is suitable for use in the methods disclosed herein. In some embodiments, the capillary tube holder comprises a number of capillary tubes equal to the number of wells in the multi-well attractant plate. In some embodiments, each capillary tube in the capillary tube holder is aligned with a single well of the multi-well attractant plate. The capillary tube holder is allowed to sit on top of the multi-well attractant plate for a sufficient time for one or more of the capillary tubes to fill to a desired level with a chemoeffector from the multi-well attractant plate. Once the tubes have filled with attractants, the top of the capillary holder is sealed with a plate sealing film. The capillary tube holder is then washed and transferred to a multi-well plate containing a desired concentration of bacteria. In some embodiments, each well of the multi-well plate comprises the same bacteria. In some embodiments, two or more wells in the multi-well plate comprises different bacteria. The multi-well plate is then incubated. Following incubation, the capillary tube holder is transferred to a new multi-well plate, the seal is removed, and the multi-well plate along with the capillary tube holder is spun in a centrifuge to expel the contents of the capillary tubes into the plate. Growth media is added to each well and the multi-well plate is incubated again. In some embodiments, the multi-well plate is incubated with shaking. In some embodiments, the shaking is orbital shaking. The concentration of the cells is then measured at regular time intervals to determine the growth rate of the bacteria. The temperature and time of incubation will depend on the nature of the bacteria. The lag time of the bacteria in each well is used to identify the starting concentration of bacterial cells in each capillary tube. To do this, the time at which the growth curve hits exponential phase (i.e., an $OD_{600}$ of about 0.25) is calculated. The starting cell concentration is then back calculated using a standard curve of cell count. Once initial cell concentration is determined for each well of the multi-well plate, the chemotactic index (I30) is calculated. In some embodiments, the I30 is calculated using Formula 1:$I30=x/(x+y)$, where x equals the number of cells in a chemoeffector filled capillary tube and y equals the number of cells in control filled capillary tube. In some embodiments, an I30 that is greater than 0.5 indicates that the chemoeffector is chemoattractant. In some embodiments, an I30 that is equal to 0.5 indicates that the chemoeffector is neutral, neither a chemoattractant nor a chemorepellent. In some embodiments, an I30 that is less than 0.5 indicates that the chemoeffector is a chemorepellent.

In some embodiments, the methods disclosed herein further comprise analyzing the ability of the identified growth-promoting carbon substrate and/or the chemoeffector to alter the composition and function of a soil microbiome.

In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

In some embodiments, one or more soil bacteria-enriching agents are tested and/or identified. Table 1 discloses a non-exhaustive list of candidate soil bacteria-enriching agents. In some embodiments, the carbon substrate and/or chemoeffector comprises one or more agents in Table 1. In some embodiments, the soil bacteria-enriching agent comprises a chemoeffector, for example a chemoattractant, in Table 1. In some embodiments, the soil bacteria-enriching agent comprises both a carbon substrate and a chemoeffector. In some embodiments, both the carbon substrate and chemoeffector are soil bacteria-enriching agents in Table 1. In some embodiments, the soil comprises one or more soil bacteria-enriching agents, i.e., a carbon substrate and/or chemoeffector, other than those listed in Table 1.

In some embodiments, the one or more soil bacteria-enriching agents comprise one or more of L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof.

Soil Bacteria-Enrichment Assay

Some embodiments disclosed herein relate to methods for testing the ability of soil bacteria-enriching agents to effectively manipulate a soil microbial community. In some embodiments, the methods comprise determining the ability of the candidate selective carbon substrates to influence microbial competition. In some embodiments, this involves adding two or more bacteria of interest to non-sterile agriculture soil which contains a native microbial community. In some embodiments, the two or more bacteria are added to the non-sterile soil at an equal starting density. A candidate carbon substrate is then added to the soil and the soil with bacteria and candidate carbon substrate are incubated for an amount of time and under conditions sufficient to allow growth of the bacteria. Growth of the bacteria is then measured at one or more time points during incubation. Methods of determining the size of a bacterial population are known in the art. All such methods are suitable for use in the methods disclosed herein. One or more soil bacteria-enriching agents that uniquely promote growth or attraction of a desired species of bacteria as compared to other bacteria in the soil microbiome are then identified.

Some embodiments herein are directed to a method of assessing whether a candidate soil bacteria-enriching agent acts as a chemoattractant, i.e., it promotes the attraction of a desired bacteria to a soil microbiome as compared to one or more other bacteria in the soil microbiome. FIG. 20 is a schematic of a soil bacteria-enrichment assay according to some embodiments disclosed herein. In some embodiments, the assay comprises adding plant root exudate, a candidate soil bacteria-enriching agent, and a bacterial population to soil. The treated soil is then incubated for an amount of time and under conditions sufficient to allow growth of the bacteria, with samples being taken at 2 or more distinct timepoints. The amount of each species of bacteria is then determined.

In some embodiments, the competition assay comprises adding one or more bacteria of interest to non-sterile agriculture soil at an equal starting OD and incubating the soil with plant root exudate and a desired concentration of candidate soil-bacteria enriching agent. In some embodiments, the non-sterile agriculture soil further comprises one or more plants. Methods of obtaining plant root exudate are known in the art. All such methods are suitable for use in the methods disclosed herein. For example, in some embodiments, plant root exudate is obtained by surface sterilizing *Arabidopsis thaliana* seeds, sowing the seeds on an agar plate and growing the seeds for 7 days. In some embodiments, after 7 days, the seedlings are transferred to a multi-well plate for exudate collection. In some embodiments, exudate collection comprises adding MS media to each well of the multi-well well plate along with about 50, 7-day old, *Arabidopsis* seedlings. The seedlings are then incubated with shaking in growth chamber for about 24 hours. After 24 hours, the exudates are collected, pooled, and filter sterilized. In some embodiments, the treated non-sterile agriculture soil is incubated with plant root exudate and a desired concentration of soil bacteria-enriching agent for about 3 days. After 3 days, DNA is extracted from soil and the concentration of the bacteria in the soil is measured. For example, in some embodiments, qPCR analysis is conducted using a universal bacteria primer "ALL" and species-specific primers. The threshold cycle (Ct) value for the universal primer is then subtracted from each of the species-specific primers to get the dCt or ΔCt.

In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

In some embodiments, one or more soil bacteria-enriching agents are tested and/or identified. Table 1 discloses a non-exhaustive list of candidate soil bacteria-enriching agents. In some embodiments, the chemoattractant comprises one or more agents in Table 1. In some embodiments, the soil bacteria-enriching agent comprises a chemoeffector, for example a chemoattractant, in Table 1. In some embodiments, the soil comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1.

In some embodiments, the treated soil is incubated for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days or more, or for an amount of time that is in a range that is defined by any two of the preceding values. For example, in some embodiments, the treated soil is incubated for between about 1-31, 1-30, 1-29, 1-28, 1-21, 1-14, 1-7, 1-3, 3-31, 3-30, 3-29, 3-38, 3-31, 3-14, 3-7, 7-31, 7-30, 7-29, 7-28, 7-21, 7-14, 14-31, 14-30, 14-29, 14-28, 14-21, 21-31, 21-30, 21-29, 21-28, 28-31, 29-30, 28-29, 29-31, 29-30, or 31-31 days. In some embodiments, the treated soil is incubated for greater than 30 days.

Some embodiments herein are directed to a method of assessing whether a given soil bacteria-enriching agent enriches a specific species of bacteria in a soil microbiome comprising at least one additional bacterial species when one or more plants are being supported by the soil. In some embodiments, the method comprises adding a known concentration of one or more species of bacteria to soil along with a soil bacteria-enriching agent. In some embodiments, the bacteria comprise *Pseudomonas putida* (PP), *Azotobacter vinelandii* (AV), *Bacillus subtilis* (BS), and/or *Azospirillum brasilense* (AB). In some embodiments, soil moisture at the start of the experiment is adjusted a desired level for growth of the plant. One or more plants are then planted in the treated soil and allowed to grow for about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days or more, or for an amount of time that is in a range that is defined by any two of the preceding values. For example, in some embodiments, the plants are allowed to grow for between about 1-31, 1-30, 1-29, 1-28, 1-21, 1-14, 1-7, 1-3, 3-31, 3-30, 3-29, 3-38, 3-31, 3-14, 3-7, 7-31, 7-30, 7-29, 7-28, 7-21, 7-14, 14-31, 14-30, 14-29, 14-28, 14-21, 21-31, 21-30, 21-29, 21-28, 28-31, 29-30, 28-29, 29-31, 29-30, or 31-31 days. Soil and plant root samples are then collected at one or more timepoints during growth. The quantity of one or more species of bacteria in the soil and/or the plant roots is then determined and one or more soil bacteria-enriching agents that uniquely promote the growth and attraction of a desired bacterial species as compared to one or more other bacteria in the soil microbiome are identified.

Soil Microbiome Engineering

Some aspects of the present disclosure relate to methods of engineering a soil microbiome to alter the abundance of one or more bacterial species of interest in the soil microbiome. In some embodiments, the methods comprise identifying one or more soil bacteria-enriching agents that able to uniquely attract and/or stimulate the growth of a specific bacterial species in a soil microbiome as compared to one or more other species of bacteria in the microbiome; and increasing the concentration of one or more of the identified soil bacteria-enriching agent in soil comprising a soil microbiome. In some embodiments, the identified soil bacteria-enriching agent supports both the attraction of a specific bacterial species to the soil microbiome and supports the growth of the bacterium once in the soil microbiome. In some embodiments, different soil bacteria-enriching agents are identified as supporting attraction of a specific bacterial species to the soil microbiome and growth of the bacteria once in the soil microbiome. In some embodiments, increasing the concentration of the identified soil bacteria-enriching agent increases the concentration of one or more species of bacteria in the soil microbiome, i.e., enriches the bacteria in the soil microbiome, as compared to the concentration of the bacterial species in the soil microbiome prior to increasing the concentration of the identified soil bacteria-enriching agent. In some embodiments, the engineered soil microbiome is in, or is added to, soil that supports or is capable of supporting the growth of one or more plants. In some embodiments, the one or more plants comprise one or more species of plant. In some embodiments, the one or more plants comprise one or more plants of a single plant species.

In some embodiments, the methods disclosed herein relate to methods of enriching one or more bacterial species in a soil microbiome. In some embodiments, the enriched species of bacteria is beneficial to one or more plants that are supported or capable of being supported by soil comprising the engineered soil microbiome. In some embodiments, enriching the soil microbiome for one or more specific bacterial species improves the nutrient use efficiency (NUE) of one or more plants supported or capable of being supported by soil comprising the soil microbiome. In some embodiments, enriching the soil microbiome for one or more specific bacterial species provides protective immunity against pathogens. In some embodiments, the enriched bacteria produces and or excretes one or more compounds, for example, but not limited to, plant hormones, which stimulate growth of plants supported or capable of being supported by soil comprising the soil microbiome.

In some embodiments, the methods disclosed herein relate to methods of decreasing the abundance of one or more bacterial species in a soil microbiome. In some embodiments, the methods disclosed herein relate to methods of decreasing the abundance of one or more pathogenic bacteria in a soil microbiome. In some embodiments, the method comprises identifying one or more soil bacteria-enriching agents that prevent or inhibit attraction of a specific bacteria to a soil microbiome and/or prevent or inhibit growth of the specific bacteria once in the soil microbiome. In some embodiments, the concentration of one or more of the identified soil bacteria-enriching agents in soil comprising the microbiome is then increased. In some embodiments, increasing the concentration of the identified soil bacteria-enriching agent in the soil comprises adding exogenous soil bacteria-enriching agent to soil comprising a microbiome. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching is applied to the soil surrounding one or more seeds, plants, fields, lawns, crops, or forests. In some embodiments, the agent is delivered directly to the root system of one or more plants, fields, lawns, crops, or forests. In some embodiments, the composition comprising the one or more soil bacteria-enhancing agents is delivered in a manner such that the soil bacteria-enriching agent is able to interact with the root system and/or the soil surrounding the root system of one or more plants, fields, lawns, crops, or forests.

In some embodiments, enriching the soil microbiome for one or more specific bacterial species improves the nutrient use efficiency (NUE) of one or more plants supported or capable of being supported by soil comprising the soil microbiome. In some embodiments, the nutrient is nitrogen, potassium and/or phosphorous. In some embodiments, enriching the soil microbiome for one or more specific bacterial species improves the NUE of one or more plants supported or capable of being supported by soil comprising the soil microbiome by about 1%, 2%, 3%, 4%, 5%, 6%, 7%, 8%, 9%, 10%, 15%, 20%, 25%, 30%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000% or more, or by a percentage that is in a range that is defined by any two of the preceding values, as compared to the NUE of one or more plants supported or capable of being supported by soil comprising a soil microbiome that has not been enriched for one or more bacterial species. For example, in some embodiments, enriching the soil microbiome for one or more specific bacterial species improves the NUE of one or more plants supported or capable of being supported by soil comprising the soil microbiome by between about 10-1000%, 10-750%, 10-500%, 10%-250%, 10-100%, 10-75%, 10-50%, 10-25%, 25-1000%, 25-750%, 25-500%, 25-250%, 25-100%, 25-75%, 25-50%, 50-1000%, 50-750%, 50-500%, 50-250%, 50-100%, 100-1000%, 100-750%, 100-500%, 100-250%, 250-1000%, 250-750%, 250-500%, 500-1000%, 500-750%, or 750-1000% as compared the NUE of supported or capable of being supported by soil comprising a soil microbiome that has not been enriched for one or more bacterial species.

In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

In some embodiments, one or more soil bacteria-enriching agents are tested and/or identified. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the soil bacteria-enriching agent comprises both a carbon substrate and a chemoeffector. In some embodiments, both the carbon substrate and chemoeffector are soil bacteria-enriching agents in Table 1. In some embodiments, the soil bacteria-enriching agent comprises a soil bacteria-enriching agent, i.e., a carbon substrate and/or chemoeffector, other than those listed in Table 1.

Some embodiments herein relate to methods for enriching a *Pseudomonas putida* (PP) population in a soil microbiome as compared to one or more different bacteria in the microbiome. In some embodiments, the method comprises identifying one or more soil bacteria-enriching agents that uniquely attract PP to the soil microbiome and/or promote the growth of PP once in the soil microbiome. The concentration of one or more of the identified soil bacteria-enriching agents in soil comprising the microbiome is increased, thereby enriching the PP population in the microbiome as compared to the size of the PP population prior to increasing the concentration of soil bacteria-enriching agent in the soil. In some embodiments, increasing the concentration of the identified soil bacteria-enriching agent in the soil comprises adding exogenous soil bacteria-enriching agent to soil comprising a microbiome. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching is applied to the soil surrounding one or more seeds, plants, fields, lawns, crops, or forests. In some embodiments, the agent is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof.

In some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in soil comprising a microbiome uniquely promotes growth of PP in the soil microbiome. In some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in soil comprising a microbiome uniquely promotes growth of PP in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in soil comprising a microbiome uniquely promotes growth of PP in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in soil comprising a microbiome uniquely promotes increased growth of PP in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of PP when the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not increased and/or as compared to growth of one or more other bacteria in the microbiome. For example, in some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in soil comprising a microbiome uniquely promotes increased growth of PP in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of PP when the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not increased and/or as compared to growth of one or more other bacteria in the microbiome. In some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in soil comprising a soil microbiome increases growth of PP in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of PP when the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not increased. For example, in some embodiments, increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, promotes increased growth of PP in soil comprising a microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of PP when the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not increased and/or as compared to growth of one or more other bacteria in the microbiome.

Some embodiments herein relate to methods for enriching a *Azotobacter vinelandii* (AV) population in a soil microbiome as compared to one or more different bacteria in the microbiome. In some embodiments, the method comprises identifying one or more soil bacteria-enriching agents that uniquely attract AV to the soil microbiome and/or promote the growth of AV once in the soil microbiome. The concentration of one or more of the identified soil bacteria-enriching agents in soil comprising the microbiome is increased, thereby enriching the AV population in the microbiome as compared to the size of the AV population prior to increasing the concentration of soil bacteria-enriching agents in the soil. In some embodiments, increasing the concentration of the identified soil bacteria-enriching agent in the soil comprises adding exogenous soil bacteria-enriching agent to soil comprising a microbiome. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching is applied to the soil surrounding one or more seeds, plants, fields, lawns, crops, or forests. In some embodiments, the agent is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the carbon substrate comprises one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof.

In some embodiments, increasing the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in soil comprising a microbiome uniquely promotes growth of AV in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, increasing the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in soil comprising a microbiome promotes growth of AV in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, increasing the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in soil comprising a microbiome uniquely promotes increased growth of AV in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of AV when the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not increased and/or as compared to growth of one or more other bacteria in the microbiome. For example, in some embodiments, increasing the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in soil comprising a microbiome uniquely promotes increased growth of AV in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of AV when the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not increased and/or as compared to growth of one or more other bacteria in the microbiome. In some embodiments, increasing the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in soil comprising a microbiome increases growth of AV in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of AV when the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not increased. For example, in some embodiments, increasing the concentration of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in soil comprising a microbiome promotes increased growth of AV in soil comprising a microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of AV when the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not increased and/or as compared to growth of one or more other bacteria in the microbiome.

Some embodiments herein relate to methods for enriching a *Bacillus subtilis* (BS) population in a soil microbiome as compared to one or more different bacteria in the microbiome. In some embodiments, the method comprises identifying one or more soil bacteria-enriching agents that uniquely attract BS to the soil microbiome and/or promote the growth of BS once in the soil microbiome. The concentration of one or more of the soil bacteria-enriching agents in soil comprising the microbiome is increased, thereby enriching the BS population in the microbiome as compared to the size of the BS population prior to increasing the concentration of soil bacteria-enriching agent in the soil. In some embodiments, increasing the concentration of the identified soil bacteria-enriching agent in the soil comprises adding exogenous soil bacteria-enriching agents to soil comprising a microbiome. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching is applied to the soil surrounding one or more plants, fields, lawns, crops, or forests. In some embodiments, the agent is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof.

In some embodiments, increasing the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in soil comprising a microbiome uniquely promotes growth of BS in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, increasing the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in soil comprising a soil microbiome promotes growth of BS in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, increasing the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in soil comprising a microbiome promotes increased growth of BS in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of BS when the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not increased and/or as compared to growth of one or more other bacteria in the microbiome. For example, in some embodiments, increasing the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in soil comprising a microbiome promotes increased growth of BS in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of BS when the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not increased and/or as compared to growth of one or more other bacteria in the microbiome. In some embodiments, increasing the concentration of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in soil comprising a microbiome promotes increased growth of BS in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of BS when the concentration of one or more of methyl-D-galactoside, N-acetyl-D-glucosamine, D-trehalose, D-xylose, maltotriose, D-cellobiose, a-cyclodextrin, b-gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not increased and/or as compared to growth of one or more other bacteria in the microbiome. For example, in some embodiments, increasing the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in soil comprising a microbiome promotes increased growth of BS in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of BS when the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not increased and/or as compared to growth of one or more other bacteria in the microbiome.

Some embodiments herein relate to methods for enriching a *Azospirillum brasilense* (AB) population in a soil microbiome as compared to one or more different bacteria in the microbiome. In some embodiments, the method comprises identifying one or more soil bacteria-enriching agents that uniquely attract AB to the soil microbiome and/or promote the growth of AB once in the soil microbiome. The concentration of one or more of the soil bacteria-enriching agents in soil comprising the microbiome is increased, thereby enriching the AB population in the microbiome as compared to the size of the AB population prior to increasing the concentration of soil bacteria-enriching agent in the soil. In some embodiments, increasing the concentration of the identified soil bacteria-enriching agent in the soil comprises adding exogenous soil bacteria-enriching agents to soil comprising a microbiome. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching is applied to the soil surrounding one or more plants, fields, lawns, crops, or forests. In some embodiments, the agent is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of propionic acid, D-tartaric acid or D-malic acid and/or any combination thereof.

In some embodiments, increasing the concentration of one or more of propionic acid, D-tartaric acid or D-malic acid and/or any combination thereof, in soil comprising a microbiome uniquely promotes growth of AB in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, increasing the concentration of one or more of propionic acid, D-tartaric acid or D-malic acid and/or any combination thereof in soil comprising a soil microbiome promotes growth of AB in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, increasing the concentration of one or more of propionic acid, D-tartaric acid or D-malic acid and/or any combination thereof, in soil comprising a microbiome promotes increased growth of AB in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of AB when the concentration of one or more of propionic acid, D-tartaric acid or D-malic acid and/or any combination thereof is not increased and/or as compared to growth of one or more other bacteria in the microbiome. For example, in some embodiments, increasing the concentration of one or more of propionic acid, D-tartaric acid or D-malic acid and/or any combination thereof, in soil comprising a microbiome promotes increased growth of AB in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-

4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of AB when the concentration of one or more of propionic acid, D-tartaric acid or D-malic acid and/or any combination thereof is not increased and/or as compared to growth of one or more other bacteria in the microbiome. In some embodiments, increasing the concentration of one or more of propionic acid, D-tartaric acid or D-malic acid and/or any combination thereof, in soil comprising a microbiome promotes increased growth of AB in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of AB when the concentration of one or more of propionic acid, D-tartaric acid or D-malic acid and/or any combination thereof is not increased and/or as compared to growth of one or more other bacteria in the microbiome. For example, in some embodiments, increasing the concentration of one or more of propionic acid, D-tartaric acid or D-malic acid and/or any combination thereof, in soil comprising a microbiome promotes increased growth of AB in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of AB when the concentration of one or more of propionic acid, D-tartaric acid or D-malic acid and/or any combination thereof is not increased and/or as compared to growth of one or more other bacteria in the microbiome.

Compositions/Kits

Some embodiments herein relate to soil and other compositions of matter comprising a bacterial microbiome that is enriched or capable of enriching a bacterial species in the microbiome. In some embodiments, the soil is agricultural soil. In some embodiments, the soil comprises a native or unenriched microbiome. In some embodiments, the microbiome comprises one or more species of bacteria that are capable of being enriched by one or more soil bacteria-enriching agents identified through the methods disclosed herein. In some embodiments, the soil comprises one or more soil bacteria-enriching agents that are capable of attracting a desired bacteria to the microbiome and/or are capable of promoting increased growth of a desired bacteria in the soil microbiome. In some embodiments, the soil comprises one or more plants capable of secreting one or more soil bacteria-enriching agents into the soil. In some embodiments, the soil is packaged for commercial sale and/or use.

In some embodiments, the one or more soil bacteria-enriching agents are exogenously added to the soil. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching agent is applied to the soil surrounding one or more plants, fields, lawns, crops, or forests. In some embodiments, the agent is delivered directly to the root system of one or more plants, fields, lawns, crops, or forests. In some embodiments, a composition comprising one or more soil bacteria-enriching agents is delivered in a manner such that the soil bacteria-enriching agent is able to interact with the root system and/or the soil surrounding the root system of one or more plants, fields, lawns, crops, or forests.

In some embodiments, the composition comprises and/or is capable of enriching the growth of one or more of *Pseudomonas, Azospirillum, Azotobacter, Bacillus* or any combination thereof. In some embodiments, the composition comprises one or more of *Pseudomonas putida* (PP), *Azotobacter vinelandii* (AV), *Bacillus subtilis* (BS), and *Azospirillum brasilense* (AB) or any combination thereof.

In some embodiments, the composition supports growth of a desired bacteria in the microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, the composition supports growth of a desired bacteria in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, the composition promotes increased growth of a desired bacteria in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of the bacteria in soil that does not comprise the one or more soil bacteria-enriching agents and/or as compared to one or more other bacteria in the soil microbiome. For example, in some embodiments, the composition promotes increased growth of a desired bacteria in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 1000-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of the bacteria in soil that does not comprise the one or more soil bacteria-enriching agents and/or as compared to one or more other bacteria in the soil microbiome. In some embodiments, the composition promotes increased growth of a desired bacteria in a microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of the bacteria in soil that does not comprise the one or more soil bacteria-enriching agents and/or as compared to one or more other bacteria in the soil microbiome. For example, in some embodiments, the composition promotes increased growth of a desired bacteria in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of the bacteria in soil that does not comprise the one or more soil bacteria-enriching agents and/or as compared to one or more other bacteria in the soil microbiome.

In some embodiments a composition is provided comprising a soil bacteria-enriching agent. In some embodiments, the soil bacteria-enriching agent comprises a carbon substrate in Table 1. In some embodiments, the soil bacteria-enriching agent comprises a chemoeffector, for example a chemoattractant, in Table 1. In some embodiments, the soil comprises both a carbon substrate and a chemoeffector. In some embodiments, both the carbon substrate and chemoeffector are soil bacteria-enriching agents in Table 1. In some embodiments, composition comprises a soil bacteria-enriching agent, i.e., a carbon substrate and/or chemoeffector, other than those listed in Table 1.

In some embodiments, the soil bacteria-enriching agent comprises one or more of L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof.

Some embodiments herein relate to compositions for enriching a *Pseudomonas putida* (PP) population in a soil microbiome as compared to one or more different bacteria in the microbiome. In some embodiments, the composition comprises one or more soil bacteria-enriching agents that uniquely attract PP to the soil microbiome and/or promotes the growth of PP once in the soil microbiome. In some embodiments, application of the one or more soil bacteria-enriching agents increases the PP population in the microbiome as compared to the size of the PP population prior to applying the soil bacteria-enriching agent to the soil. In some embodiments, applying the composition to the soil comprises adding an exogenous composition comprising the one or more soil bacteria-enriching agents to soil comprising a microbiome. Methods of exogenously applying compositions to soil and/or plants are well known in the art. Any such method is suitable for use with the methods disclosed herein. For example, in some embodiments, the composition comprising the soil bacteria-enriching agent is sprayed, poured, dripped, dabbed, or wiped onto one or more seeds, plants, fields, lawns, crops, or forests. In some embodiments, the composition comprising the soil bacteria-enriching agent is comprised in a solution, powder, or other deliverable form along with one or more other compounds. In some embodiments, the composition comprising the soil bacteria-enriching agent is applied to the soil surrounding one or more plants, fields, lawns, crops, or forests. In some embodiments, the composition comprising the one or more soil bacteria-enriching agents is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof.

In some embodiments, the composition comprises one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof. In some embodiments, application of a composition comprising L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome uniquely promotes growth of PP in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, application of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome promotes growth of PP in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, application of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome uniquely promotes increased growth of PP in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of PP when the composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not applied and/or as compared to growth of one or more other bacteria in the microbiome. For example, in some embodiments, application of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome uniquely promotes increased growth of PP in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of PP when the composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not applied and/or as compared to growth of one or more other bacteria in the microbiome. In some embodiments, application of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome increases growth of PP in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of PP when the composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not applied and/or as compared to one or more other bacteria in the microbiome. For example, in some embodiments, application of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome, promotes increased growth of PP in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of PP when the composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not applied and/or as compared to one or more other bacteria in the microbiome.

Some embodiments herein relate to compositions for enriching a *Azotobacter vinelandii* (AV) population in a soil microbiome as compared to one or more different bacteria in the microbiome. In some embodiments, the composition comprises one or more soil bacteria-enriching agents that uniquely attract AV to the soil microbiome and/or promotes the growth of AV once in the soil microbiome. In some embodiments, application of the one or more soil bacteria-enriching agents increases the AV population in the microbiome as compared to the size of the AV population prior to applying the soil bacteria-enriching agent to the soil. In some embodiments, applying the soil bacteria-enriching agent in the soil comprises adding an exogenous composition comprising the one or more soil bacteria-enriching agents to soil comprising a microbiome. Methods of exogenously applying compositions to soil and/or plants are well known in the art. Any such method is suitable for use with the methods disclosed herein. For example, in some embodiments, the composition comprising the soil bacteria-enriching agent is sprayed, poured, dripped, dabbed, or wiped onto one or more seeds, plants, fields, lawns, crops, or forests. In some embodiments, the composition comprising the soil bacteria-enriching agent is comprised in a solution, powder, or other deliverable form along with one or more other compounds. In some embodiments, the composition comprising the soil bacteria-enriching agent is applied to the soil surrounding one or more plants, fields, lawns, crops, or forests. In some embodiments, the composition comprising the one or more soil bacteria-enriching agents is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof.

Some embodiments disclosed herein relate to compositions comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof. In some embodiments, application of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome uniquely promotes growth of AV in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ cells/gram of soil or more, or by an amount that is in a range defined by any two of the preceding values. For example, in some embodiments, application of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome promotes growth of AV in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, application of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome uniquely promotes increased growth of AV in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of AV when the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not applied and/or as compared to growth of one or more other bacteria in the microbiome. For example, in some embodiments, application of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome uniquely promotes increased growth of AV in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of AV when the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not applied and/or as compared to growth of one or more other bacteria in the microbiome. In some embodiments, application of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome increases growth of AV in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of AV when the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not applied and/or as compared to one or more other bacteria in the microbiome. For example, in some embodiments, application of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome, promotes increased growth of AV in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of AV when the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not applied and/or as compared to one or more other bacteria in the microbiome.

Some embodiments herein relate to compositions for enriching a *Bacillus subtilis* (BS) population in a soil microbiome as compared to one or more different bacteria in the microbiome. In some embodiments, the composition comprises one or more soil bacteria-enriching agents that uniquely attract BS to the soil microbiome and/or promotes the growth of BS once in the soil microbiome. In some embodiments, application of the one or more soil bacteria-enriching agents increases the BS population in the microbiome as compared to the size of the BS population prior to applying the soil bacteria-enriching agent to the soil. In some embodiments, applying the soil bacteria-enriching agent in the soil comprises adding an exogenous composition comprising the one or more soil bacteria-enriching agents to soil comprising a microbiome. Methods of exogenously applying compositions to soil and/or plants are well known in the art. Any such method is suitable for use with the methods disclosed herein. For example, in some embodiments, the composition comprising the soil bacteria-enriching agent is sprayed, poured, dripped, dabbed, or wiped onto one or more seeds, plants, fields, lawns, crops, or forests. In some embodiments, the composition comprising the soil bacteria-enriching agent is comprised in a solution, powder, or other deliverable form along with one or more other compounds. In some embodiments, the composition comprising the soil bacteria-enriching agent is applied to the soil surrounding one or more plants, fields, lawns, crops, or forests. In some embodiments, the composition comprising the one or more soil bacteria-enriching agents is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof.

Some aspects of the present disclosure relate to compositions comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof. In some embodiments, application of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a microbiome uniquely promotes growth of BS in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, application of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a microbiome promotes growth of BS in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, application of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a microbiome uniquely promotes increased growth of BS in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of BS when the composition one or more of comprising methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not applied and/or as compared to growth of one or more other bacteria in the microbiome. For example, in some embodiments, application of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a microbiome uniquely promotes increased growth of BS in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of BS when the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not applied and/or as compared to growth of one or more other bacteria in the microbiome. In some embodiments, application of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol or glucosamine and/or any combination thereof, to soil comprising a microbiome increases growth of BS in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of BS when the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not applied and/or as compared to one or more other bacteria in the microbiome. For example, in some embodiments, application of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a microbiome, promotes increased growth of BS in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of BS when the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not applied and/or as compared to one or more other bacteria in the microbiome.

Some embodiments herein relate to compositions for enriching a *Azospirillum brasilense* (AB) population in a soil microbiome as compared to one or more different bacteria in the microbiome. In some embodiments, the composition comprises one or more soil bacteria-enriching agents that uniquely attract AB to the soil microbiome and/or promotes the growth of AB once in the soil microbiome. In some embodiments, application of the one or more soil bacteria-enriching agents increases the AB population in the microbiome as compared to the size of the AB population prior to applying the soil bacteria-enriching agent to the soil. In some embodiments, applying the composition to the soil comprises adding an exogenous composition comprising the one or more soil bacteria-enriching agents to soil comprising a microbiome. Methods of exogenously applying compositions to soil and/or plants are well known in the art. Any such method is suitable for use with the methods disclosed herein. For example, in some embodiments, the composition comprising the soil bacteria-enriching agent is sprayed, poured, dripped, dabbed, or wiped onto one or more seeds, plants, fields, lawns, crops, or forests. In some embodiments, the composition comprising the soil bacteria-enriching agent is comprised in a solution, powder, or other deliverable form along with one or more other compounds. In some embodiments, the composition comprising the soil bacteria-enriching agent is applied to the soil surrounding one or more plants, fields, lawns, crops, or forests. In some embodiments, the composition comprising the one or more soil bacteria-enriching agents is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests. In some embodiments, the soil bacteria-enriching agent comprises one or more of propionic acid, D-tartaric acid or D-malic acid and/or any combination thereof.

In some embodiments, the composition comprises one or more of propionic acid, D-tartaric acid or D-malic acid and/or any combination thereof. In some embodiments, application of a composition comprising one or more of propionic acid, D-tartaric acid or D-malic acid and/or any combination thereof, to soil comprising a microbiome uniquely promotes growth of AB in the soil microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, application of a composition comprising one or more of propionic acid, D-tartaric acid or D-malic acid and/or any combination thereof, to soil comprising a microbiome promotes growth of AB in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, application of a composition comprising one or more of propionic acid, D-tartaric acid or D-malic acid and/or any combination thereof, to soil comprising a microbiome uniquely promotes increased growth of AB in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of AB when the composition comprising one or more of propionic acid, D-tartaric acid or D-malic acid and/or any combination thereof, is not applied and/or as compared to growth of one or more other bacteria in the microbiome. For example, in some embodiments, application of a composition comprising one or more of propionic acid, D-tartaric acid or D-malic acid and/or any combination thereof, to soil comprising a microbiome uniquely promotes increased growth of AB in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of AB when the composition comprising one or more of propionic acid, D-tartaric acid or D-malic acid and/or any combination thereof, is not applied and/or as compared to growth of one or more other bacteria in the microbiome. In some embodiments, application of a composition comprising one or more of propionic acid, D-tartaric acid or D-malic acid and/or any combination thereof, to soil comprising a microbiome increases growth of AB in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of AB when the composition comprising one or more of propionic acid, D-tartaric acid or D-malic acid and/or any combination thereof, is not applied and/or as compared to one or more other bacteria in the microbiome. For example, in some embodiments, application of a composition comprising one or more of propionic acid, D-tartaric acid or D-malic acid and/or any combination thereof, to soil comprising a microbiome, promotes increased growth of AB in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of AB when the composition comprising one or more of propionic acid, D-tartaric acid or D-malic acid and/or any combination thereof, is not applied and/or as compared to one or more other bacteria in the microbiome.

Some embodiments disclosed herein relate to kits comprising a soil bacteria-enriching agent. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the soil comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1. In some embodiments, the soil bacteria-enriching agent comprises one or more of capric acid, putrescine, butyric acid, phenylethylamine, benzoate, lactulose, L-rhamnose, N-acetyl-D-mannosamine, erythritol, maltitol, glucosamine and/or any combination thereof. In some embodiments, the kit further comprises soil. In some embodiments, the soil is agricultural soil. In some embodiments, the soil is sterilized soil. In some embodiments, the soil comprises a native microbiome. In some embodiments, the kit further comprises one or more bacteria. In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

In some embodiments, the soil bacteria-enriching agent comprises one or more of L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof.

Some embodiments disclosed herein relate to kits for enriching *Pseudomonas putida* (PP) in a soil microbiome. In some embodiments, the kit comprises a soil bacteria-enriching agent. In some embodiments, the kit comprises PP and one or more soil bacteria-enriching agents. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the soil comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1. In some embodiments, the soil bacteria-enriching agent comprises one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof. In some embodiments, the kit further means for exogenously applying the soil bacteria-enriching agent. Means of applying compositions to soil and/or plants are well known in the art. Any such method is suitable for use with the methods disclosed herein. For example, in some embodiments, the kit comprises means for spraying, pouring, dripping, dabbing, or wiping the soil bacteria-enriching agent onto one or more plants, fields, lawns, crops, or forests. In some embodiments, the kit comprises means for directly delivering the soil bacteria-enriching agent to the root system of one or more plants, fields, lawns, crops, or forests. In some embodiments, the kit comprises means for delivering the soil bacteria-enriching agent to soil in a manner such that the soil bacteria-enriching agent is able to interact with the root system and/or the soil surrounding the root system of one or more plants, fields, lawns, crops, or forests.

Some embodiments disclosed herein relate to kits for enriching a *Azotobacter vinelandii* (AV) population in a soil microbiome. In some embodiments, the kit comprises a soil bacteria-enriching agent. In some embodiments, the kit comprises AV and one or more soil bacteria-enriching agents. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the soil bacteria-enriching agent comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1. In some embodiments, the soil bacteria-enriching agent comprises one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof. In some embodiments, the kit further comprises means for exogenously applying the soil bacteria-enriching agent. Means of applying compositions to soil and/or plants are well known in the art. Any such method is suitable for use with the methods disclosed herein. For example, in some embodiments, the kit comprises means for spraying, pouring, dripping, dabbing, or wiping the soil bacteria-enriching agent onto one or more seeds, plants, fields, lawns, crops, or forests. In some embodiments, the kit comprises means for directly delivering the soil bacteria-enriching agent to the root system of one or more plants, fields, lawns, crops, or forests. In some embodiments, the kit comprises means for delivering the soil bacteria-enriching agent to soil in a manner such that the soil bacteria-enriching agent is able to interact with the root system and/or the soil surrounding the root system of one or more plants, fields, lawns, crops, or forests.

Some embodiments disclosed herein relate to kits for enriching a *Bacillus subtilis* (BS) population in a soil microbiome. In some embodiments, the kit comprises a soil bacteria-enriching agent. In some embodiments, the kit comprises BS and one or more soil bacteria-enriching agents. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the soil bacteria-enriching agent comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1. In some embodiments, the soil bacteria-enriching agent comprises one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof. In some embodiments, the kit further comprises means for exogenously applying the soil bacteria-enriching agent. Means of applying compositions to soil and/or plants are well known in the art. Any such method is suitable for use with the methods disclosed herein. For example, in some embodiments, the kit comprises means for spraying, pouring, dripping, dabbing, or wiping the soil bacteria-enriching agent onto one or more seeds, plants, fields, lawns, crops, or forests. In some embodiments, the kit comprises means for directly delivering the soil bacteria-enriching agent to the root system of one or more plants, fields, lawns, crops, or forests. In some embodiments, the kit comprises means for delivering the soil bacteria-enriching agent to soil in a manner such that the soil bacteria-enriching agent is able to interact with the root system and/or the soil surrounding the root system of one or more plants, fields, lawns, crops, or forests.

Some embodiments disclosed herein relate to kits for enriching a *Azospirillum brasilense* (AB) population in a soil microbiome. In some embodiments, the kit comprises a soil bacteria-enriching agent. In some embodiments, the kit comprises AB and one or more soil bacteria-enriching agents. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the soil comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1. In some embodiments, the soil bacteria-enriching agent comprises propionic acid, D-tartaric acid or D-malic acid and/or any combination thereof. In some embodiments, the kit further comprises means for exogenously applying the soil bacteria-enriching agent. Means of applying compositions to soil and/or plants are well known in the art. Any such method is suitable for use with the methods disclosed herein. For example, in some embodiments, the kit comprises means for spraying, pouring, dripping, dabbing, or wiping the soil bacteria-enriching agent onto one or more plants, fields, lawns, crops, or forests. In some embodiments, the kit comprises means for directly delivering the soil bacteria-enriching agent to the root system of one or more plants, fields, lawns, crops, or forests. In some embodiments, the kit comprises means for delivering the soil bacteria-enriching agent to soil in a manner such that the soil bacteria-enriching agent is able to interact with the root system and/or the soil surrounding the root system of one or more plants, fields, lawns, crops, or forests.

Use of Soil Bacteria-Enriching Agents to Engineer a Soil Microbiome

Some embodiments disclosed herein relate to methods of using a soil bacteria-enriching agent to attract and/or promote the growth of a desired bacteria in a soil microbiome. In some embodiments, the method comprises increasing the concentration of one or more soil bacteria-enriching agents in soil comprising the microbiome. In some embodiments, the one or more soil bacteria-enriching agents are exogenously added to the soil. Methods of exogenously adding agents to soil and/or plants are well known in the art. Any such method is suitable for use with the methods disclosed herein. For example, in some embodiments, the soil bacteria-enriching agent is sprayed, poured, dripped, dabbed, or wiped onto one or more seeds, plants, fields, lawns, crops, or forests. In some embodiments, the soil bacteria-enriching agent is comprised in a solution, powder, or other deliverable form along with one or more other compounds. In some embodiments, the soil bacteria-enriching is applied to the soil surrounding one or more plants, fields, lawns, crops, or forests. In some embodiments, the agent is delivered directly to the root system of one or more plants, fields, lawns, crops, or forests. In some embodiments, the composition comprising the one or more soil bacteria-enriching agents is delivered in a manner such that the soil bacteria-enriching agent is able to interact with the root system and/or the soil surrounding the root system of one or more plants, fields, lawns, crops, or forests.

In some embodiments, the concentration of one or more soil bacteria-enriching agents is increased in soil comprising a soil microbiome. Table 1 discloses a non-exhaustive list of candidate soil bacteria-enriching agents. In some embodiments, the soil bacteria-enriching agent comprises an agent in Table 1. In some embodiments, the soil bacteria-enriching agent comprises a chemoeffector, for example a chemoattractant, in Table 1. In some embodiments, the chemoeffector comprises one or more of phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof. In some embodiments, the soil bacteria-enriching agent comprises a carbon substrate. In some embodiments, the carbon substrate comprises one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid and/or any combination thereof. In some embodiments, the soil comprises both a carbon substrate and a chemoeffector. In some embodiments, both the carbon substrate and chemoeffector are soil bacteria-enriching agents in Table 1. In some embodiments, the soil comprises a soil bacteria-enriching agent, i.e., a carbon substrate and/or chemoeffector, other than those listed in Table 1. In some embodiments, the carbon substrate and/or the chemoeffector comprise one or more of L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof.

In some embodiments, increasing the concentration of one or more of one or more of soil bacteria-enriching agents, for example, but not limited to, one or more of the soil bacteria-enriching agents that are listed in Table 1, in soil comprising a soil microbiome uniquely promotes growth of a desired bacteria in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ or more cells/gram of soil.

In some embodiments, increasing the concentration of one or more of one or more of soil bacteria-enriching agents, for example, but not limited to, one or more of the soil bacteria-enriching agents that are listed in Table 1, in soil comprising a soil microbiome uniquely promotes increased growth of a desired bacteria in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% or more, as compared to growth of the bacteria when the soil bacteria-enriching agent is not present and/or as compared to growth of one or more other bacteria in the microbiome. In some embodiments, increasing the concentration of one or more of one soil bacteria-enriching agents, for example, but not limited to, one or more of the soil bacteria-enriching agents that are listed in Table 1, in soil comprising a microbiome promotes increased growth of a desired bacteria in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold, or more, as compared to growth of the bacteria when the concentration of the soil bacteria-enriching agent is not increased and/or as compared to growth of one or more other bacteria in the microbiome.

In some embodiments, the one or more bacteria comprise *Pseudomonas, Azospirillum, Azotobacter, Bacillus* or any combination thereof. In some embodiments, the one or more bacteria comprise plant growth-promoting rhizobacteria (PGPR). In some embodiments, the one or more bacteria of interest comprise *Pseudomonas putida* (PP), *Azotobacter vinelandii* (AV), *Bacillus subtilis* (BS), and *Azospirillum brasilense* (AB) or any combination thereof.

Some embodiments herein relate to methods using one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a *Pseudomonas putida* (PP) population in a soil microbiome as compared to the PP population when one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, are not used and/or as compared to one or more different bacteria in the microbiome. In some embodiments, the use comprises increasing the concentration of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, in or near soil comprising the microbiome. In some embodiments, application of one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, increases the PP population in the microbiome as compared to the size of the PP population prior to applying the one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof. In some embodiments, applying the one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to the soil comprises adding an exogenous composition comprising the one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to soil comprising a microbiome. Methods of exogenously applying compositions to soil and/or plants are well known in the art. Any such method is suitable for use with the methods disclosed herein. For example, in some embodiments, the composition comprising the soil bacteria-enriching agent is sprayed, poured, dripped, dabbed, or wiped onto one or more seeds, plants, fields, lawns, crops, or forests. In some embodiments, the composition comprising the one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is comprised in a solution, powder, or other deliverable form along with one or more other compounds. In some embodiments, the composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is applied to the soil surrounding one or more plants, fields, lawns, crops, or forests. In some embodiments, the composition comprising the one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is delivered directly to the root system of one or more plants, fields, lawns, crops, or forests. In some embodiments, the composition comprising the one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is delivered in a manner such that the soil bacteria-enriching agent is able to interact with the root system and/or the soil surrounding the root system of one or more plants, fields, lawns, crops, or forests.

In some embodiments, use of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a PP population in a soil microbiome uniquely promotes growth of PP in the microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, use of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a PP population in a soil microbiome promotes growth of PP in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, use of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a PP population in a soil microbiome uniquely promotes increased growth of PP in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of PP when a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not used and/or as compared to growth of one or more other bacteria in the microbiome. For example, in some embodiments, use of a composition comprising one or more of LL-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a PP population in a soil microbiome uniquely promotes increased growth of PP in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of PP when a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not used and/or as compared to growth of one or more other bacteria in the microbiome. In some embodiments, use of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a PP population in a soil microbiome increases growth of PP in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of PP when a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not used and/or as compared to one or more other bacteria in the microbiome. For example, in some embodiments, use of a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, to enrich a PP population in a soil microbiome promotes increased growth of PP in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of PP when a composition comprising one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof, is not used and/or as compared to one or more other bacteria in the microbiome.

Some embodiments herein relate to methods using one or more of lactulose, L-rhamnose, N-acetyl-D-mannosamine, erythritol and/or any combination thereof, to enrich a *Azotobacter vinelandii* (AV) population in a soil microbiome as compared to the AV population when one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, are not used and/or as compared to one or more different bacteria in the microbiome. In some embodiments, the use comprises increasing the concentration of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, in or near soil comprising the microbiome. In some embodiments, application of one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, increases the AV population in the microbiome as compared to the size of the AV population prior to applying the one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof. In some embodiments, applying D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to the soil comprises adding an exogenous composition comprising D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a microbiome. Methods of exogenously applying compositions to soil and/or plants are well known in the art. Any such method is suitable for use with the methods disclosed herein. For example, in some embodiments, the composition comprising the soil bacteria-enriching agent is sprayed, poured, dripped, dabbed, or wiped onto one or more plants, fields, lawns, crops, or forests. In some embodiments, the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is comprised in a solution, powder, or other deliverable form along with one or more other compounds. In some embodiments, the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is applied to the soil surrounding one or more plants, fields, lawns, crops, or forests. In some embodiments, the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is delivered directly to the root system of one or more plants, fields, lawns, crops, or forests. In some embodiments, the composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is delivered in a manner such that the soil bacteria-enriching agent is able to interact with the root system and/or the soil surrounding the root system of one or more plants, fields, lawns, crops, or forests.

In some embodiments, use of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to enrich a AV population in a soil microbiome uniquely promotes growth of AV in the microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ cells/gram of soil or more, or by an amount that is in a range defined by any two of the preceding values. For example, in some embodiments, use of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to enrich a AV population in a soil microbiome promotes growth of AV in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, use of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to enrich a AV population in a soil microbiome uniquely promotes increased growth of AV in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of AV when a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not used and/or as compared to growth of one or more other bacteria in the microbiome. For example, in some embodiments, use of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to enrich a AV population in a soil microbiome uniquely promotes increased growth of AV in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% as compared to growth of AV when a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not used and/or as compared to growth of one or more other bacteria in the microbiome. In some embodiments, use of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to enrich a AV population in a soil microbiome increases growth of AV in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of AV when a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not used and/or as compared to one or more other bacteria in the microbiome. For example, in some embodiments, use of a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to enrich a AV population in a soil microbiome promotes increased growth of AV in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of AV when a composition comprising one or more of D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, is not used and/or as compared to one or more other bacteria in the microbiome.

Some embodiments herein relate to methods using one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a *Bacillus subtilis* (BS) population in a soil microbiome as compared to the BS population when one or more of methyl-D-galactoside, N-acetyl-D-glucosamine, D-trehalose, D-xylose, maltotriose, D-cellobiose, a-cyclodextrin, b-gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, are not used and/or as compared to one or more different bacteria in the microbiome. In some embodiments, the use comprises increasing the concentration of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, in or near soil comprising the microbiome. In some embodiments, application of one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, increases the BS population in the microbiome as compared to the size of the BS population prior to applying the one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof. In some embodiments, applying one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to the soil comprises adding an exogenous composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a microbiome. Methods of exogenously applying compositions to soil and/or plants are well known in the art. Any such method is suitable for use with the methods disclosed herein. For example, in some embodiments, the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is sprayed, poured, dripped, dabbed, or wiped onto one or more plants, fields, lawns, crops, or forests. In some embodiments, the composition comprising maltitol, glucosamine and/or any combination thereof, is comprised in a solution, powder, or other deliverable form along with one or more other compounds. In some embodiments, the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is applied to the soil surrounding one or more plants, fields, lawns, crops, or forests. In some embodiments, the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is delivered directly to the root system of one or more plants, fields, lawns, crops, or forests. In some embodiments, the composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is delivered in a manner such that the soil bacteria-enriching agent is able to interact with the root system and/or the soil surrounding the root system of one or more plants, fields, lawns, crops, or forests.

In some embodiments, use of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a BS population in a soil microbiome uniquely promotes growth of BS in the microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ cells/gram of soil or more, or by an amount that is in a range defined by any two of the preceding values. For example, in some embodiments, use of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a BS population in a soil microbiome promotes growth of BS in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, use of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a BS population in a soil microbiome uniquely promotes increased growth of BS in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of BS when a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not used and/or as compared to growth of one or more other bacteria in the microbiome. For example, in some embodiments, use of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a BS population in a soil microbiome uniquely promotes increased growth of BS in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-6400%, 5000-6000% or 6000-7000% or more as compared to growth of BS when a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not used and/or as compared to growth of one or more other bacteria in the microbiome. In some embodiments, use of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a BS population in a soil microbiome increases growth of BS in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of BS when a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not used and/or as compared to one or more other bacteria in the microbiome. For example, in some embodiments, use of a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to enrich a BS population in a soil microbiome promotes increased growth of BS in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of BS when a composition comprising one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, is not used and/or as compared to one or more other bacteria in the microbiome.

Some embodiments herein relate to methods using one or more of propionic acid, D-tartaric acid or D-malic acid and/or any combination thereof, to enrich a *Azospirillum brasilense* (AB) population in a soil microbiome as compared to the AB population when one or more of propionic acid, D-tartaric acid, D-malic acid and/or any combination thereof, are not used and/or as compared to one or more different bacteria in the microbiome. In some embodiments, the use comprises increasing the concentration of one or more of propionic acid, D-tartaric acid, D-malic acid and/or any combination thereof, in or near soil comprising the microbiome. In some embodiments, application of one or more of propionic acid, D-tartaric acid, D-malic acid and/or any combination thereof, increases the AB population in the microbiome as compared to the size of the AB population prior to applying the one or more of propionic acid, D-tartaric acid, D-malic acid and/or any combination thereof. In some embodiments, applying propionic acid, D-tartaric acid, D-malic acid and/or any combination thereof, to the soil comprises adding an exogenous composition comprising propionic acid, D-tartaric acid, D-malic acid and/or any combination thereof, to soil comprising a microbiome. Methods of exogenously applying compositions to soil and/or plants are well known in the art. Any such method is suitable for use with the methods disclosed herein. For example, in some embodiments, the composition comprising propionic acid, D-tartaric acid, D-malic acid and/or any combination thereof, is sprayed, poured, dripped, dabbed, or wiped onto one or more plants, fields, lawns, crops, or forests. In some embodiments, the composition comprising maltitol, glucosamine and/or any combination thereof, is comprised in a solution, powder, or other deliverable form along with one or more other compounds. In some embodiments, the composition comprising one or more of propionic acid, D-tartaric acid or D-malic acid and/or any combination thereof, is applied to the soil surrounding one or more plants, fields, lawns, crops, or forests. In some embodiments, the composition comprising one or more of propionic acid, D-tartaric acid or D-malic acid and/or any combination thereof, is delivered directly to the root system of one or more plants, fields, lawns, crops, or forests. In some embodiments, the composition comprising one or more of propionic acid, D-tartaric acid or D-malic acid is delivered to the soil surrounding the root system of one or more plants, fields, lawns, crops, or forests.

In some embodiments, use of a composition comprising one or more of propionic acid, D-tartaric acid or D-malic acid and/or any combination thereof, to enrich a AB population in a soil microbiome uniquely promotes growth of AB in the microbiome to a concentration of about $1\times10^4$, $2\times10^4$, $3\times10^4$, $4\times10^4$, $5\times10^4$, $6\times10^4$, $7\times10^4$, $8\times10^4$, $9\times10^4$, $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ or more cells/gram of soil, or by an amount that is in a range defined by any two of the preceding values. For example, in some embodiments, use of a composition comprising one or more of propionic acid, D-tartaric acid or D-malic acid and/or any combination thereof, to enrich a AB population in a soil microbiome promotes growth of AB in the microbiome to a concentration of between about $1\times10^4$ and $1\times10^9$, $5\times10^4$ and $1\times10^9$, $1\times10^4$ and $5\times10^8$, $5\times10^4$ and $1\times10^8$, $1\times10^4$ and $5\times10^7$, $5\times10^4$ and $1\times10^7$, $1\times10^5$ and $5\times10^6$, $5\times10^5$ and $1\times10^6$, $1\times10^5$ and $1\times10^9$, $5\times10^5$ and $1\times10^9$, $1\times10^5$ and $5\times10^8$, $5\times10^5$ and $1\times10^8$, $1\times10^5$ and $5\times10^7$, $5\times10^5$ and $1\times10^7$, $1\times10^5$ and $5\times10^6$, $5\times10^5$ and $1\times10^6$, $1\times10^6$ and $1\times10^9$, $5\times10^6$ and $1\times10^9$, $1\times10^7$ and $1\times10^9$, $5\times10^7$ and $1\times10^9$, $5\times10^7$ and $1\times10^8$, $6\times10^7$ and $1\times10^9$, $6\times10^7$ and $1\times10^8$, $7\times10^7$ and $1\times10^9$, $7\times10^7$ and $1\times10^8$, $8\times10^7$ and $1\times10^9$, $8\times10^7$ and $1\times10^8$, $9\times10^7$ and $1\times10^9$, $1\times10^8$ and $1\times10^9$, $2\times10^8$ and $1\times10^9$, $3\times10^8$ and $1\times10^9$, $4\times10^8$ and $1\times10^9$, $5\times10^8$ and $1\times10^9$, $6\times10^8$ and $1\times10^9$, $7\times10^8$ and $1\times10^9$, $8\times10^8$ and $1\times10^9$, and $9\times10^8$ and $1\times10^9$ cells/gram of soil.

In some embodiments, use of a composition comprising one or more of propionic acid, D-tartaric acid or D-malic acid and/or any combination thereof, to enrich a AB population in a soil microbiome uniquely promotes increased growth of AB in the microbiome by about 10%, 15%, 20%, 25%, 30%, 35%, 40%, 50%, 60%, 70%, 75%, 80%, 90%, 91%, 92%, 93%, 94%, 95%, 96%, 97%, 98%, 99%, 100%, 125%, 150%, 200%, 250%, 300%, 400%, 500%, 600%, 700%, 800%, 900%, or 1000, 1500%, 2000%, 2500%, 3000%, 3500%, 4000%, 4500%, 5000%, 5500%, 6000%, 6100%, 6200%, 6300%, 6400%, 6500%, 6600%, 6700%, 6800%, 6900% or 7000% or more, or by a percentage that is in a range that is defined by any two of the preceding values, as compared to growth of AB when a composition comprising one or more of propionic acid, D-tartaric acid or D-malic acid and/or any combination thereof, is not used and/or as compared to growth of one or more other bacteria in the microbiome. For example, in some embodiments, use of a composition comprising one or more of propionic acid, D-tartaric acid or D-malic acid and/or any combination thereof, to enrich a AB population in a soil microbiome uniquely promotes increased growth of AB in the microbiome by between about 10-7000%, 10-65400%, 10-5000%, 10-4000%, 10-3000%, 10-2000%, 10-1000%, 10-750%, 10-500%, 10%-250%, 10-100%, 10-75%, 10-50%, 10-25%, 25-7000%, 25-6400%, 25-6000%, 25-5000%, 25-4000%, 25-3000%, 25-2000%, 25-1000%, 25-750%, 25-500%, 25-250%, 25-100%, 25-75%, 25-50%, 50-7000%, 50-6400%, 50-6000%, 50-5000%, 50-4000%, 50-3000%, 50-2000%, 50-1000%, 50-750%, 50-500%, 50-250%, 50-100%, 100-7000%, 100-6400%, 100-6000%, 100-5000%, 100-4000%, 100-3000%, 100-2000%, 100-7000%, 100-6400%, 100-6000%, 100-5000%, 100-4000%, 100-3000%, 100-2000%, 100-1000%, 100-750%, 100-500%, 100-250%, 250-7000%, 250-6400%, 250-5000%, 250-4000%, 250-3000%, 250-2000%, 250-1000%, 250-750%, 250-500%, 500-7000%, 500-6400%, 500-6000%, 500-5000%, 500-4000%, 500-3000%, 500-2000%, 500-1000%, 500-750%, 750-7000%, 750-6400%, 750-6000%, 750-5000%, 750-4000%, 750-3000%, 750-2000%, 750-1000%, 1000-7000%, 1000-6400%, 1000-6000%, 1000-5000%, 100-4000%, 1000-3000%, 1000-2000%, 200-7000%, 2000-6400%, 2000-6000%, 2000-5000%, 5000-7000%, 5000-

6400%, 5000-6000% or 6000-7000% as compared to growth of AB when a composition comprising one or more of propionic acid, D-tartaric acid of D-malic acid and/or any combination thereof, is not used and/or as compared to growth of one or more other bacteria in the microbiome. In some embodiments, use of a composition comprising one or more of propionic acid, D-tartaric acid or D-malic acid and/or any combination thereof, to enrich a AB population in a soil microbiome increases growth of AB in the microbiome by about 1-fold, 2-fold, 3-fold, 4-fold, 5-fold, 6-fold, 7-fold, 8-fold, 9-fold, 10-fold, 15-fold, 20-fold, 25-fold, 30-fold, 35-fold, 40-fold, 45-fold, 50-fold, 55-fold, 60-fold, 61-fold, 62-fold, 63-fold, 64-fold, 65-fold, 70-fold, 75-fold, 80-fold, 85-fold, 90-fold, 95-fold, or 100-fold or more, or by an amount that is in a range defined by any two of the preceding values, as compared to growth of AB when a composition comprising one or more of propionic acid, D-tartaric acid or D-malic acid and/or any combination thereof, is not used and/or as compared to one or more other bacteria in the microbiome. For example, in some embodiments, use of a composition comprising one or more of propionic acid, D-tartaric acid or D-malic acid and/or any combination thereof, to enrich a AB population in a soil microbiome promotes increased growth of AB in the microbiome by between about 1-fold and 100-fold, 1-fold and 75-fold, 1-fold and 64-fold, 1-fold and 50-fold, 1-fold and 25-fold, 1-fold and 10-fold, 1-fold and 7-fold, 1-fold and 5-fold, 1-fold and 3-fold, 3-fold and 100-fold, 3-fold and 75-fold, 3-fold and 64-fold, 3-fold and 50-fold, 3-fold and 25-fold, 3-fold and 10-fold, 3-fold and 7-fold, 3-fold and 5-fold, 5-fold and 100-fold, 5-fold and 75-fold, 5-fold and 64-fold, 5-fold and 50-fold, 5-fold and 25-fold, 5-fold and 10-fold, 5-fold and 7-fold, 7-fold and 100-fold, 7-fold and 75-fold, 7-fold and 64-fold, 7-fold and 50-fold, 7-fold and 25-fold, 7-fold and 10-fold, 10-fold and 100-fold, 10-fold and 75-fold, 10-fold and 64-fold, 10-fold and 50-fold, 10-fold and 25-fold, 25-fold and 100-fold, 25-fold and 75-fold, 25-fold and 64-fold, 25-fold and 50-fold, 50-fold and 100-fold, 50-fold and 75-fold, 50-fold and 64-fold or 75-fold and 100-fold as compared to growth of AB when a composition comprising one or more of propionic acid, D-tartaric acid or D-malic acid and/or any combination thereof, is not used and/or as compared to one or more other bacteria in the microbiome.

Numbered Arrangements

Some embodiments provided herein are described by way of the following provided numbered arrangements and also provided as possible combinations or overlapping embodiments:

1. A method of engineering a soil microbiome, the method comprising:
   a) selecting one or more carbon substrates that are able to enrich a desired bacterial species in a soil microbiome as compared to enrichment of one or more different bacteria in the soil microbiome;
   b) selecting one or more chemoattractants that are able to attract a desired bacterial species to the soil microbiome as compared to attraction of one or more different bacteria to the soil microbiome; and
   c) applying the one or more selected carbon substrates and chemoattractants to soil comprising a soil microbiome comprising the desired bacteria.
2. The method of arrangement 1, wherein applying the selected carbon substrates and/or chemoattractants comprises adding exogenous carbon substrates and/or chemoattractant to the soil comprising the soil microbiome.
3. The method of arrangement 2, wherein the exogenous carbon substrate is sprayed, poured, dripped, dabbed, or wiped onto soil surrounding, on or near, one or more seeds, plants, fields, lawns, crops, or forests.
4. The method of arrangement 1, wherein application of one or more of the selected carbon substrates and/or chemoattractants to soil comprising the soil microbiome enriches one or more desired bacterial species in the soil microbiome.
5. The method of arrangement 1, wherein the desired bacterial species comprises a plant growth-promoting rhizobacteria (PGPR).
6. The method of arrangement 5, wherein the PGPR comprises one or more of: *Pseudomonas putida, Azotobacter vinelandii, Bacillus subtilis* or *Azospirillum brasilense*, or any combination thereof.
7. The method of arrangement 1, wherein the selected carbon substrate and/or chemoattractant comprises one or more of: L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof.
8. The method of arrangement 1, wherein applying the one or more of the selected carbon substrates and/or chemoattractants comprises adding exogenous amounts of one or more of: L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof, to soil comprising a soil microbiome.
9. The method of arrangement 1, wherein the selected carbon substrate comprises one or more of: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid and/or any combination thereof.

10. The method of arrangement 1, wherein the chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

11. The method of arrangement 1, wherein the selected carbon substrate comprises one or more of: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid and/or any combination thereof; and wherein the identified chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

12. The method of arrangement 1, wherein applying the one or more of the selected carbon substrates and/or chemoattractants in soil comprising a soil microbiome enriches the concentration of one or more desired bacteria in the soil microbiome as compared to the concentration of the one or more desired bacteria prior to applying the one or more selected carbon substrates and/or chemoattractants.

13. The method of arrangement 1, wherein application of the one or more of the selected carbon substrates in the soil comprising the soil microbiome allows the soil to support growth, enrichment, or persistence of one or more desired species of bacteria to a level that the soil could not support prior to applying the one or more selected carbon substrates and/or chemoattractants in the soil.

14. The method of arrangement 1, wherein the soil comprises one or more seeds, plants, fields, lawns, crops, or forests.

15. A method of selecting a carbon substrate that is able to enrich the growth of a desired bacterial species, the method comprising:

measuring the growth of a desired bacterial species in the presence of one or more different carbon substrates, selecting one or more candidate carbon substrates that are able to increase growth of the desired bacterial species as compared to one or more of the different carbon substrates, measuring the growth of the desired bacterial species and at least one different bacterial species in the presence of the one or more selected candidate carbon substrates, and selecting a carbon substrate that is able to enrich the growth of the desired bacterial species as compared to the at least one different bacterial species.

16. The method of arrangement 15, wherein the desired bacterial species comprises a plant growth-promoting rhizobacteria (PGPR).

17. The method of arrangement 16, wherein the PGPR comprises one or more of: *Pseudomonas putida, Azotobacter vinelandii, Bacillus subtilis* or *Azospirillum brasilense*, or any combination thereof.

18. The method of arrangement 15, wherein the candidate carbon substrate is selected from the group comprising: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid and/or any combination thereof.

19. The method of arrangement 15, wherein measuring the growth of a bacterial species comprises measuring the concentration of the bacterial species at one or more timepoints during growth.

20. The method of arrangement 15, further comprising measuring the chemotactic index of one or more of the at least two different bacteria species towards the selected carbon substrate.

21. A method of selecting a chemoattractant that is able to enrich the growth of a desired bacterial species in a soil microbiome, the method comprising:

measuring the attraction of the desired bacterial species and at least one different bacterial species to a candidate chemoattractant, and selecting a chemoattractant that is able to more strongly attract the desired bacterial species as compared to the at least one different species of tested bacteria.

22. The method of arrangement 21, wherein the desired bacterial species comprises a plant growth-promoting rhizobacteria (PGPR).

23. The method of arrangement 22, wherein the PGPR comprises one or more of: *Pseudomonas putida, Azotobacter vinelandii, Bacillus subtilis* or *Azospirillum brasilense*, or any combination thereof.

24. The method of arrangement 21, wherein the candidate chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

25. The method of arrangement 21, wherein measuring the attraction of a desired bacterial species to a candidate chemoattractant comprises measuring the time it takes bacteria attracted to the candidate chemoattractant to reach exponential growth phase.

26. The method of arrangement 21, wherein measuring the attraction of a desired bacterial species to a candidate chemoattractant comprises measuring the chemotactic index (I30) of the desired bacteria to the candidate chemoattractant.

27. The method of arrangement 26, wherein selecting a chemoattractant comprises selecting at least one candidate chemoattractant having an I30 more than 0.5.

28. The method of arrangement 26, wherein selecting a chemoattractant comprises selecting at least one chemoattractant having an I30 of at least 0.5 toward the desired bacterial species, wherein the selected chemoattractant has an I30 of less than 0.5 towards one or more of the at least one different bacterial species tested.

29. A method of enriching at least one bacterial species in a soil microbial community growth, the method comprising:

selecting one or more soil bacteria-enriching agents that are able to attract and/or enrich the growth of a desired bacterial species relative to at least one other bacterial species, and applying the one or more identified soil bacteria-enriching agents to soil comprising a soil microbiome, wherein application of the one or more soil bacteria-enriching agents to the soil comprising the soil microbiome enriches the desired bacterial species in the soil microbiome as compared to at least one different bacterial species in the soil microbiome.

30. The method of arrangement 29, wherein selecting one or more soil bacteria-enriching agents that are able to attract and stimulate the growth of a desired bacterial species comprises:

measuring the growth of at least two different bacterial species in the presence of one or more candidate soil bacteria-enriching agents, selecting a soil bacteria-enriching agent that is able to enrich the growth of the desired bacterial species as compared to the one or more different species of tested bacteria, measuring the chemotactic index of the desired bacterial species and one or more different bacterial species towards one or more candidate soil bacteria-enriching agents, and selecting a soil bacteria-enriching agent that is able to attract a desired bacterial species as compared to the at least one other different species of tested bacteria.

31. The method of arrangement 29, wherein the desired bacterial species comprises a plant growth-promoting rhizobacteria (PGPR).

32. The method of arrangement 31, wherein the PGPR comprises one or more of: *Pseudomonas putida, Azotobacter vinelandii, Bacillus subtilis* or *Azospirillum brasilense*, or any combination thereof.

33. The method of arrangement 29, wherein the selected soil bacteria-enriching agent comprises one or more of: L-asparagine, a-hydroxyglutaric acid-g-lactone, inosine, ala-gly, phenylethylamine, g-amino-N-butyric acid, butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid, D-malic acid, putrescine, benzoate, octopamine, maltitol, malate, glutamic acid, glycerol, or a-D-lactose, and/or any combination thereof.

34. The method of arrangement 29, wherein the selected soil bacteria-enriching agent comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

35. The method of arrangement 29, wherein application of the selected soil bacteria-enriching agent to soil comprising a soil microbiome enriches the concentration of one or more desired bacteria in the soil microbiome as compared to the concentration of the one or more desired bacteria prior to application of the selected soil bacteria-enriching agent.

36. The method of arrangement 29, wherein application of the selected soil bacteria-enriching agent in the soil comprising the soil microbiome allows the soil to support enrichment of a desired species of bacteria to a level that the soil could not support prior to application of the soil bacteria-enriching agent to the soil.

37. The method of arrangement 29, wherein the soil comprising the soil microbiome further comprises one or more seeds, plants, fields, lawns, crops, or forests.

38. A method of selecting a chemoattractant for a beneficial bacteria strain comprising:

providing a holder comprising a plurality of capillary tubes, providing a multiwell plate, wherein each well comprises one or more candidate chemoattractants;

contacting each capillary tube with the candidate chemoattractant in a single well such that capillary tube comprises the candidate chemoattractant from the well, providing a multiwell plate, wherein each well of the multi-well plate comprises one or more strains of beneficial bacteria;

contacting each capillary tube with the bacteria in a single well such that capillary tube comprises the candidate chemoattractant and the bacteria from a single well, incubating the contents of each capillary tubes under conditions sufficient to allow growth of the beneficial bacteria, determining the chemotactic index (I30) of the beneficial bacteria towards the candidate chemoattractant, and selecting a chemoattractant having an I30 more than 0.5 toward the beneficial bacterial species, wherein the candidate chemoattractant has an I30 of less than 0.5 towards one or more of the at least one different bacterial species tested.

39. The method of arrangement 38, wherein the beneficial bacterial species comprises a plant growth-promoting rhizobacteria (PGPR).

40. The method of arrangement 39, wherein the PGPR comprises one or more of: *Pseudomonas putida, Azotobacter vinelandii, Bacillus subtilis* or *Azospirillum brasilense*, or any combination thereof.

41. The method of arrangement 38, wherein the selected chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

42. A method of enriching *Pseudomonas putida* (PP) in a soil microbial community growth, the method comprising:

selecting one or more soil bacteria-enriching agents that are able to attract and/or enrich the growth of PP as compared to one or more different species of bacteria, and applying the one or more identified soil bacteria-enriching agents to soil comprising a soil microbiome, wherein application of the one or more soil bacteria-enriching agents to the soil comprising the soil microbiome enriches the PP in the soil microbiome as compared to at least one different bacterial species in the soil microbiome.

43. The method of arrangement 42, wherein selecting one or more soil bacteria-enriching agents that are able to attract and stimulate the growth of *Pseudomonas putida* (PP) comprises:

measuring the growth of PP and the at least one different bacterial species in the presence of one or more candidate soil bacteria-enriching agents, selecting one or more soil bacteria-enriching agents that is able to enrich the growth of PP as compared to the one or more different species of tested bacteria, measuring the chemotactic index of PP and the one or more different bacterial species towards the one or more candidate soil bacteria-enriching agents, and selecting one or more soil bacteria-enriching agents that are able to attract PP as compared to the at least one other different species of tested bacteria.

44. The method of arrangement 42, wherein the selected soil bacteria-enriching agent comprises one or more of: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof.

45. The method of arrangement 42, wherein the selected soil bacteria-enriching agent comprises one or more of: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, phenylethylamine or benzoate, and/or any combination thereof.

46. The method of arrangement 42, wherein the selected soil bacteria-enriching agent comprises one or more of: phenylethylamine (PEA), butyric acid, putrescine, benzoate or octopamine, and/or any combination thereof.

47. The method of arrangement 42, wherein application of the selected soil bacteria-enriching agent to soil comprising a soil microbiome enriches the concentration of *Pseudomonas putida* (PP) in the soil microbiome as compared to the concentration of the one or more different species of tested bacteria prior to application of the one or more selected carbon substrates and/or chemoattractants to the soil.

48. The method of arrangement 42, wherein applying the selected soil bacteria-enriching agent to the soil comprising the soil microbiome allows the soil to support enrichment of *Pseudomonas putida* (PP) to a level that the soil could not support prior to application of the soil bacteria-enriching agent to the soil.

49. The method of arrangement 42, wherein the soil comprises one or more seeds, plants, fields, lawns, crops, or forests.

50. A method of enriching *Azotobacter vinelandii* (AV) in a soil microbial community growth, the method comprising:

selecting one or more soil bacteria-enriching agents that are able to attract and/or enrich the growth of AV in a soil microbiome, and applying the one or more identified soil bacteria-enriching agents to soil comprising a soil microbiome, wherein application of the one or more soil bacteria-enriching agents to the soil comprising the soil microbiome enriches the AV in the soil microbiome as compared to at least one different bacterial species in the soil microbiome.

51. The method of arrangement 69, wherein selecting one or more soil bacteria-enriching agents that are able to attract and stimulate the growth of *Azotobacter vinelandii* (AV) comprises:

measuring the growth of AV and at least one different bacterial species in the presence of one or more candidate soil bacteria-enriching agents, selecting a soil bacteria-enriching agent that is able to enrich the growth of AV as compared to the one or more different species of tested bacteria, measuring the chemotactic index of AV and the one or more different bacterial species towards one or more candidate soil bacteria-enriching agents, and selecting a soil bacteria-enriching agent that is able to attract AV as compared to the at least one other different species of tested bacteria.

52. The method of arrangement 51, wherein the selected soil bacteria-enriching agent comprises one or more of: D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof.

53. The method of arrangement 51, wherein application of the selected soil bacteria-enriching agent comprises adding exogenous amounts of one or more of: D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof, to soil comprising a soil microbiome.

54. The method of arrangement 51, wherein the selected soil bacteria-enriching agent comprises one or more of: D-galactose, i-erythritol, D-melezitose, xylitol, melibionic acid, a-methyl-D-galactoside, lactulose, L-rhamnose, N-acetyl-D-mannosamine or erythritol and/or any combination thereof.

55. The method of arrangement 51, wherein the selected soil bacteria-enriching agent comprises one or more of: erythritol, D-mannitol or a-D-lactose, and/or any combination thereof.

56. The method of arrangement 51, wherein application of the selected soil bacteria-enriching agent to soil comprising the soil microbiome enriches the concentration of *Azotobacter vinelandii* (AV) in the soil microbiome as compared to the concentration of the one or more different species of bacteria in the soil microbiome prior to application of the one or more identified carbon substrates and/or chemoattractants to the soil.

57. The method of arrangement 51, wherein application of the selected soil bacteria-enriching agent to soil comprising the soil microbiome allows the soil to support enrichment of *Azotobacter vinelandii* (AV) to a level that the soil could not support prior to increasing the concentration of the soil bacteria-enriching agent to the soil.

58. The method of arrangement 51, wherein the soil comprises one or more seeds, plants, fields, lawns, crops, or forests.

59. A method of enriching *Bacillus subtilis* (BS) in a soil microbial community, the method comprising:

selecting one or more soil bacteria-enriching agents that are able to attract and/or enrich the growth of BS in a soil microbiome, and applying of the one or more identified soil bacteria-enriching agents to soil comprising the soil microbiome, wherein application of the one or more soil bacteria-enriching agents to the soil comprising the microbiome enriches the BS in the soil microbial community as compared to at least one different bacterial species in the soil microbiome.

60. The method of arrangement 59, wherein selecting one or more soil bacteria-enriching agents that are able to attract and stimulate the growth of *Bacillus subtilis* (BS) comprises:

measuring the growth of BS and at least one different bacterial species in the presence of a one or more candidate soil bacteria-enriching agents, selecting a soil bacteria-enriching agent that is able to enrich the growth of BS in the *soli* microbiome as compared to the one or more different species of tested bacteria, measuring the chemotactic index of BS and the one or more different bacterial species towards one or more candidate soil bacteria-enriching agents, and selecting a soil bacteria-enriching agent that is able to attract BS to the soil microbiome as compared to the at least one other different species of tested bacteria.

61. The method of arrangement 59, wherein the selected soil bacteria-enriching agent comprises one or more of methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof.

62. The method of arrangement 59, wherein applying the selected soil bacteria-enriching agent comprises adding exogenous amounts of one or more of: methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof, to soil comprising a soil microbiome.

63. The method of arrangement 59, wherein the selected soil bacteria-enriching agent comprises one or more of: methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol or glucosamine and/or any combination thereof.

64. The method of arrangement 59, wherein the selected soil bacteria-enriching agent comprises one or more of: maltitol, N-acetyl-D-mannosamine, a-methyl-D-galactoside, malate, glutamic acid, glycerol or D-sorbitol and/or any combination thereof.

65. The method of arrangement 59, wherein application of the selected soil bacteria-enriching agent to the soil comprising the soil microbiome enriches the concentration of *Bacillus subtilis* (BS) in the soil microbiome as compared to the concentration of the one or more different species of tested bacteria prior to application of the one or more selected soil bacteria-enriching agents.

66. The method of arrangement 59, wherein application of the identified soil bacteria-enriching agent to soil comprising the comprising the soil microbiome allows the soil to support enrichment of *Bacillus subtilis* (BS) to a level that the soil could not support prior to applying the soil bacteria-enriching agent to the soil.

67. The method of arrangement 59, wherein the soil comprises one or more seeds, plants, fields, lawns, crops, or forests.

68. A method of enriching *Azospirillum brasilense* (AB) in a soil microbial community growth, the method comprising:

selecting one or more soil bacteria-enriching agents that are able to attract and/or enrich the growth of AB, and applying the one or more identified soil bacteria-enriching agents to soil comprising a soil microbiome comprising AB, wherein applying the one or more soil bacteria-enriching agents to the soil enriches the AB in the soil microbiome as compared to at least one different bacterial species in the soil microbiome.

69. The method of arrangement 68, wherein selecting one or more soil bacteria-enriching agents that are able to attract and stimulate the growth of *Azospirillum brasilense* (AB) comprises:

measuring the growth of AB and at least one different bacterial species in the presence of one or more candidate soil bacteria-enriching agents, selecting a soil bacteria-enriching agent that is able to enrich the growth of AB as compared to the one or more different species of tested bacteria, measuring the chemotactic index of AB and the one or more different bacterial species towards one or more candidate soil bacteria-enriching agents, and selecting a soil bacteria-enriching agent that is able to attract AB as compared to the at least one other different species of tested bacteria.

70. The method of arrangement 69, wherein the selected soil bacteria-enriching agent comprises one or more of: propionic acid, D-tartaric acid or D-malic acid and/or any combination thereof.

71. The method of arrangement 69, wherein applying the selected soil bacteria-enriching agent to the soil comprising the soil microbiome comprises adding exogenous amounts of one or more of: propionic acid, D-tartaric acid or D-malic acid and/or any combination thereof, to the soil comprising a soil microbiome.

72. The method of arrangement 69, wherein application of the selected soil bacteria-enriching agent to the soil comprising the soil microbiome enriches the concentration of *Azospirillum brasilense* (AB) in the soil microbiome as compared to the concentration of the one or more different species of tested bacteria prior to application of the one or more selected soil bacteria-enriching agents.

73. The method of arrangement 69, wherein application of the identified soil bacteria-enriching agent to the soil comprising the soil microbiome allows the soil to support enrichment of *Azospirillum brasilense* (AB) to a level that the soil could not support prior to applying the soil bacteria-enriching agent in the soil.

74. The method of arrangement 69, wherein the soil comprises one or more seeds, plants, fields, lawns, crops, or forests.

EXAMPLES

Example 1: Metabolic Phenotyping

This non-limiting example relates to testing various soil bacteria-enriching agents listed in Table 1 to identify carbon substrate preferences for bacteria of interest. Liquid cultures of PP, BS, AV, AB as well as for a mixed community (syncom35) were started from single colonies. PP and BS were grown overnight in tryptic soy broth (TSB) at 28° C. AV was grown in Burk's media for 36-48 hrs at 28° C. AB was grown in spirillum media for 36-48 hrs at 28° C. The $OD_{600}$ of each culture was recorded, and the volume needed to achieve 12 mL of a culture having an $OD_{600}$ 0.05 is calculated. The appropriate volume of each culture was spun down and the supernatant was removed. Cells were washed once with 500 μL of inoculation fluid (IF) and then resuspended in 12 mL of IF. 100 μl of each cell culture was then added to each well of a Biolog® Phenotype MicroArrays™ PM1, PM2 and PM3 plate. The plates were then incubated at 28° C. for 72 hours with continuous orbital shaking. $OD_{600}$ readings were then taken every 20 minutes. The maximum $OD_{600}$ achieved in the presence of each carbon source was used as a metric for comparison. This max OD data was used to create heatmaps and to narrow down targets.

Figure 1A:
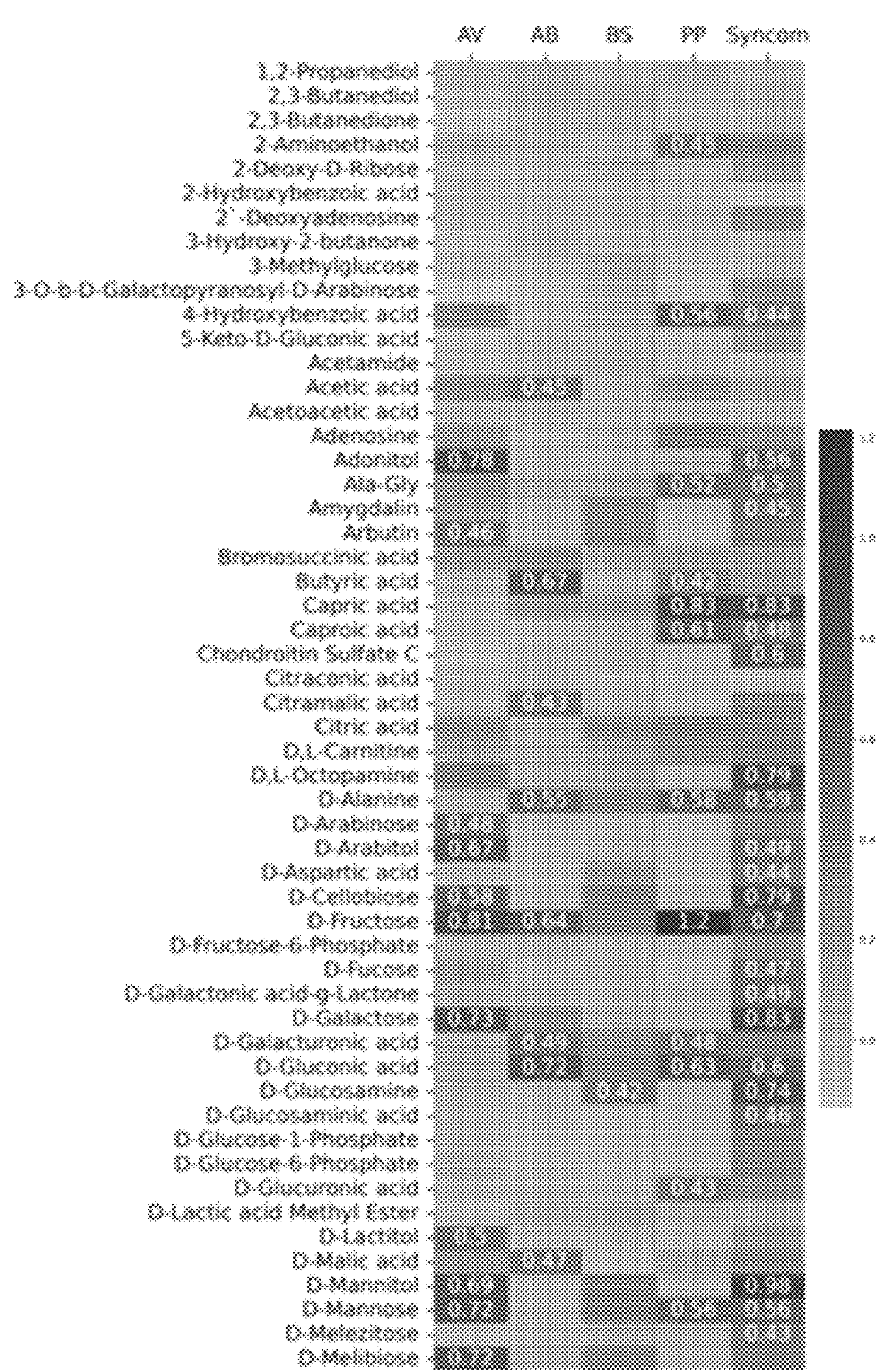
FIG. 1A is a heatmap depicting the maximum $OD_{600}$ of bacteria grown on different carbon sources according to some embodiments disclosed herein. AV: *Azotobacter vinelandii*, BS: *Bacillus subtilis*, PP: *Pseudomonas putida*, AB: *Azospirillum brasilense*, SynCom: Synthetic community.
Figure 1B:
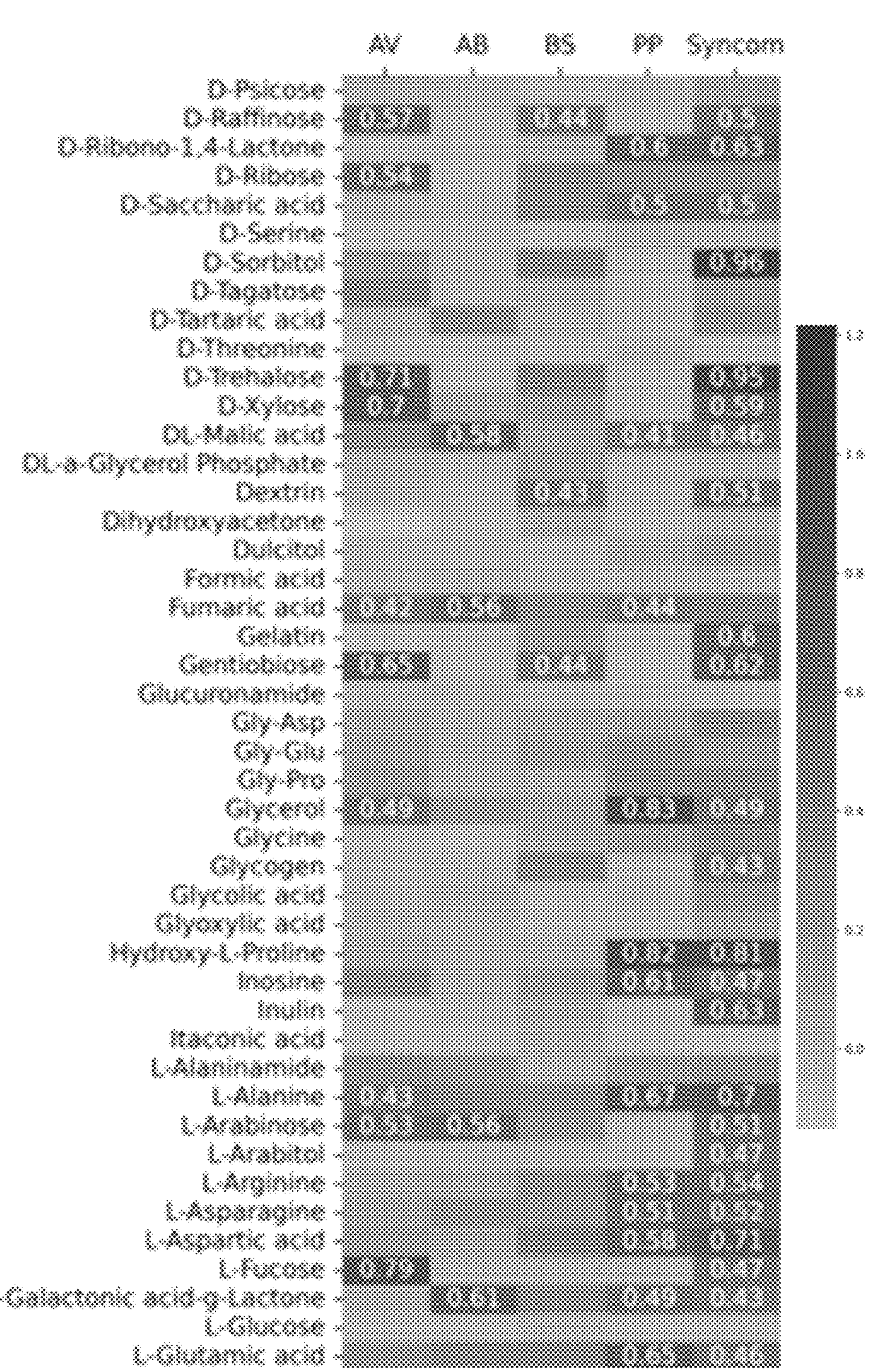
FIG. 1B is a heatmap depicting the maximum $OD_{600}$ of bacteria grown on different carbon sources according to some embodiments disclosed herein. AV: *Azotobacter vinelandii*, BS: *Bacillus subtilis*, PP: *Pseudomonas putida*, AB: *Azospirillum brasilense*, SynCom: Synthetic community.
Figure 1C:
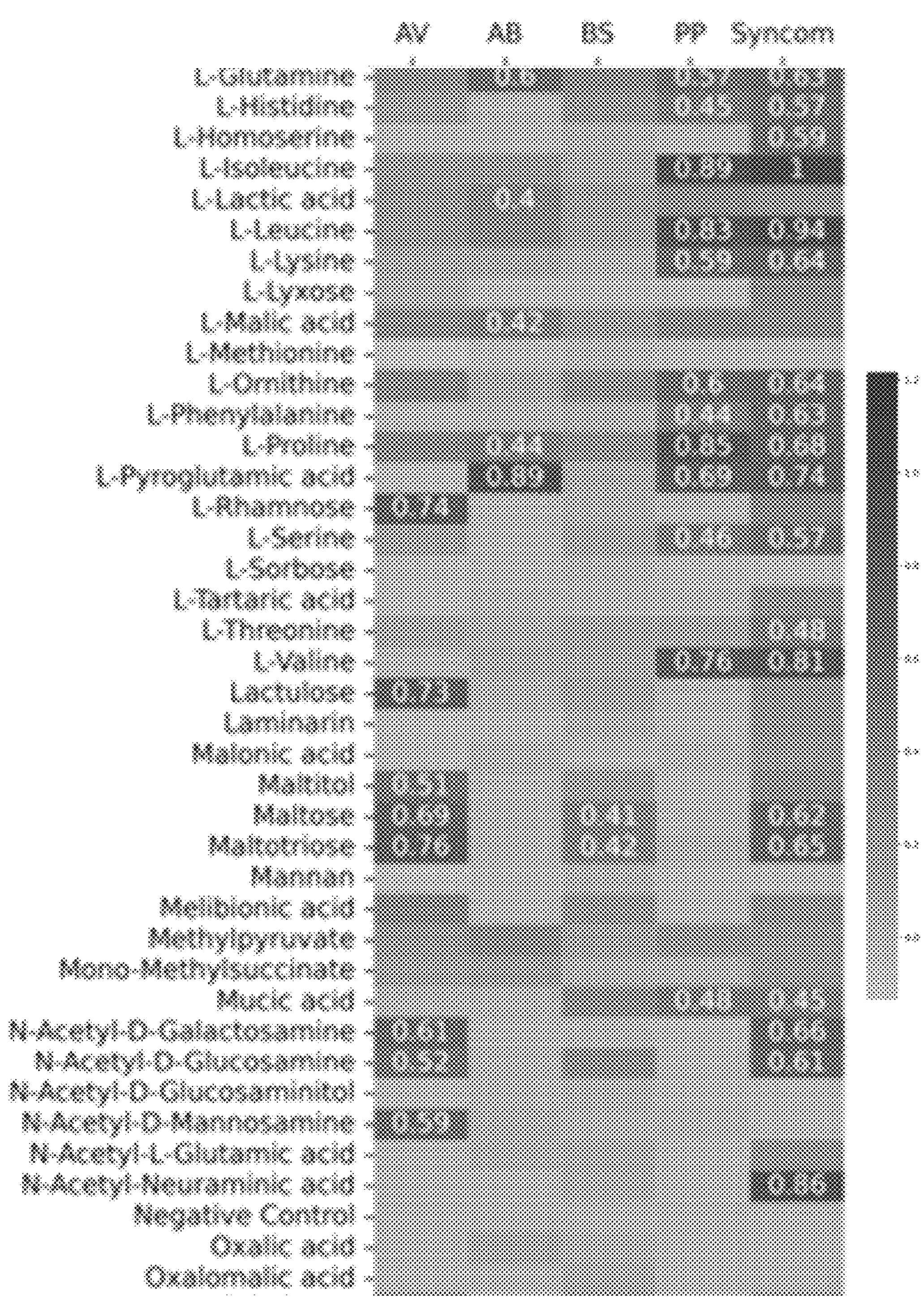
FIG. 1C is a heatmap depicting the maximum $OD_{600}$ of bacteria grown on different carbon sources according to some embodiments disclosed herein. AV: *Azotobacter vinelandii*, BS: *Bacillus subtilis*, PP: *Pseudomonas putida*, AB: *Azospirillum brasilense*, SynCom: Synthetic community.
Figure 1D:
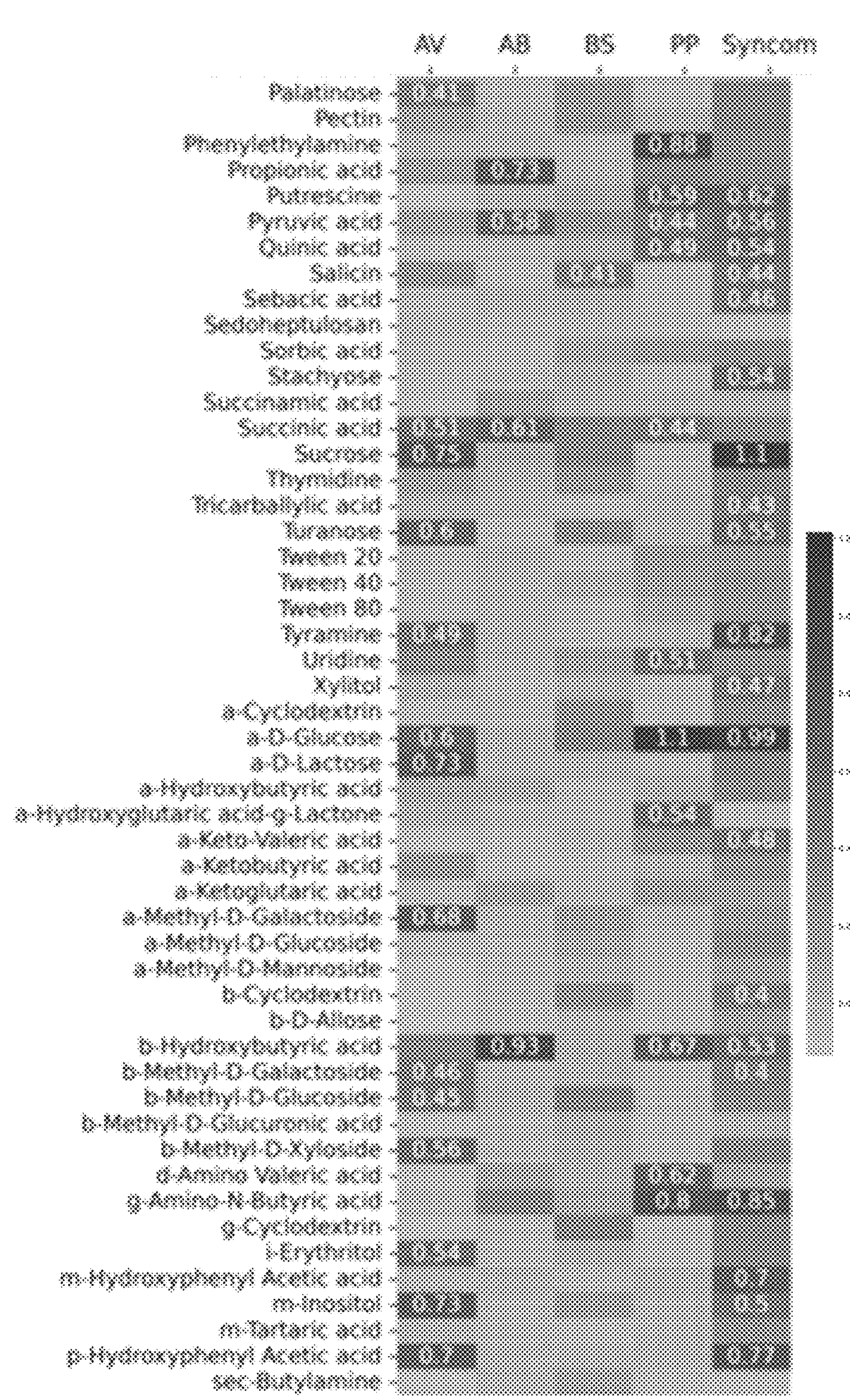
FIG. 1D is a heatmap depicting the maximum $OD_{600}$ of bacteria grown on different carbon sources according to some embodiments disclosed herein. AV: *Azotobacter vinelandii*, BS: *Bacillus subtilis*, PP: *Pseudomonas putida*, AB: *Azospirillum brasilense*, SynCom: Synthetic community.
Figure 2:
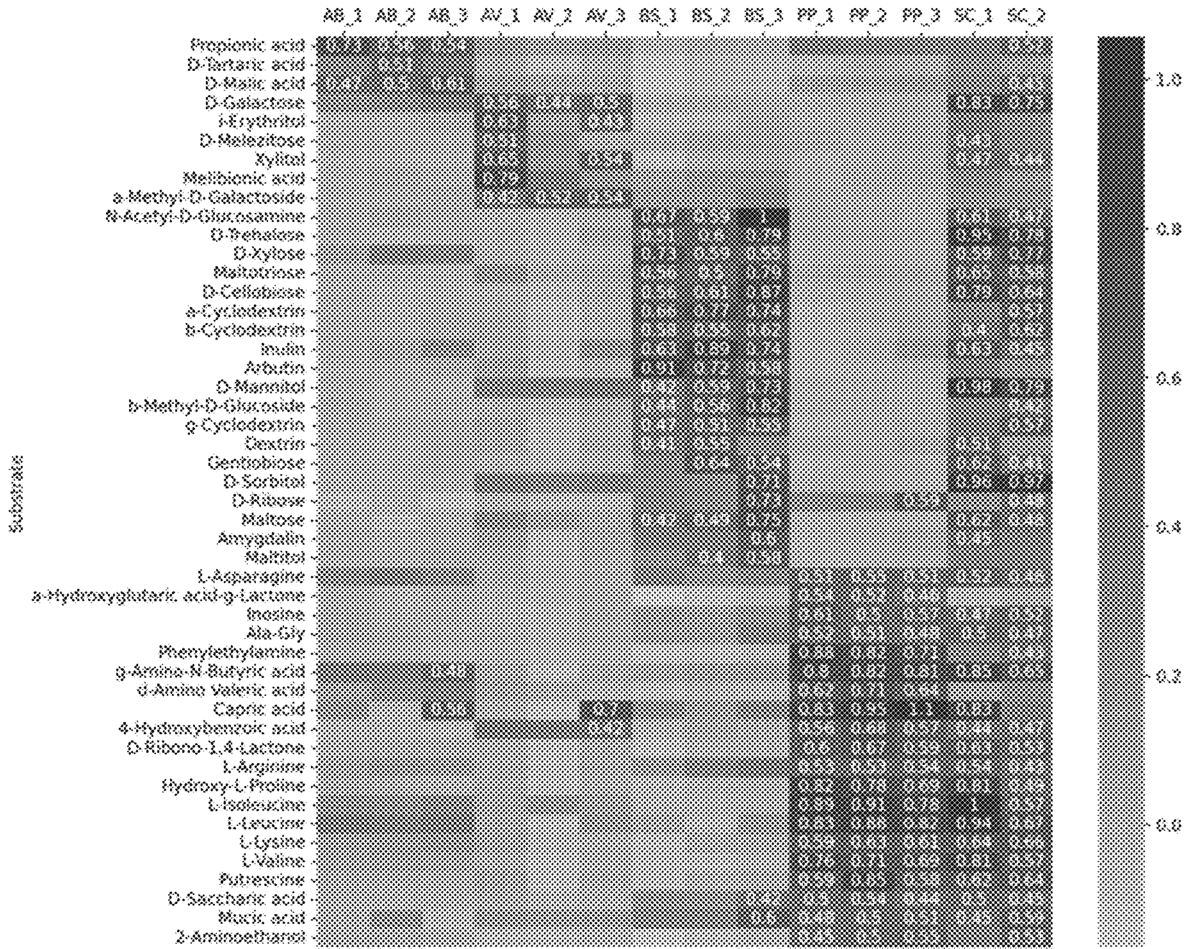
FIG. 2 is a heatmap depicting normalized maximum $OD_{600}$ of bacteria grown on different soil bacteria-enriching agents in triplicates for each bacteria and duplicates for the SynCom according to some embodiments disclosed herein.

FIG. 1-3 are heat maps depicting some embodiments of the maximum or normalized $OD_{600}$ of bacteria grown in different carbon sources. Candidate selective carbon sources were identified by comparing carbon substrate preferences in order to find carbon sources uniquely used by each species. Targets were identified as those in which one strain achieved an OD greater than 0.5 while all the other strains had a max OD less than 0.5. These cut off were adjusted to identify more or less targets. These unique carbon sources represent candidate carbon niches that may be manipulated in soil to increase the abundance of species of interest thereby engineering the soil microbiome. This may be achieved through exogenous application of selective carbon sources to bulk soil or through exudate engineering approaches to have the plant host synthesis and secrete these selective carbon sources.

Example 2-Target Screening

This non-limiting example relates to examining the ability of the targets identified in the initial Biolog metabolic phenotyping to promote bacterial growth in plant exudates. *Arabidopsis thaliana* seeds are surface sterilized using a 50% bleach, 1% tween solution. Seeds were stored at 4° C. for ~2 days before sowing. Seeds were sown on complete Murashige and Skoog (MS)+agar plates and grown for 7 days. When seedlings were 7 days old, they were transferred to a 12 well plate for exudate collection. 3 mL of MS media was added to each well of a 12-well plate along with ~50 7-day old seedlings. The seedlings were incubated with shaking at 40 rpm in growth chamber for 24 hours. After 24 hours, the exudates were collected, pooled, and filter sterilized through a 0.22 μm filter. The exudates were stored at −20° C. until use.

Targeted Growth Curve:

The volume of each target carbon source necessary to achieve the desired concentration of targets in 180 μL was added to each well of a 96-well plate using a multichannel pipette. The $OD_{600}$ of bacterial cultures (as described in Example 1, above) were measured and the volume of each culture needed to achieve desired culture volume having an $OD_{600}$ of 0.1 was calculated. The appropriate volume of each culture was then spun down and the supernatant was removed. The bacteria were washed once with 500 μL of the exudates and then resuspended in the desired volume of exudate. 180 μL of the diluted bacteria in exudates were then added to each well. The plates were then incubated at 28° C. for 72 hours with continuous orbital shaking. $OD_{600}$ readings were then taken every 20 minutes. The maximum $OD_{600}$ achieved in the presence of each carbon source was used as a metric for comparison. This max OD data was used to create heatmaps and to narrow down targets.

FIG. 4-5 are heat maps depicting some embodiments of the maximum $OD_{600}$ of bacteria grown in different carbon sources. FIG. 6 is a growth curve showing growth of PP, BS, AB and AV in 10 mM caprate. FIG. 7 is a growth curve showing growth of PP, BS, AB and AV in 10 mM butyric acid. FIG. 8 is a growth curve showing growth of PP, BS, AB and AV in 10 mM benzoate. FIG. 9 is a growth curve showing growth of PP, BS, AB and AV in 10 mM glucosamine. FIG. 10 is a growth curve showing growth of PP, BS, AB and AV in 10 mM L-rhamnose. FIG. 11 is a growth curve showing growth of PP, BS, AB and AV in 10 mM erythritol. FIG. 12 is a growth curve showing growth of PP, BS, AB and AV in 10 mM putrescine. FIG. 13 is a growth curve showing growth of PP, BS, AB and AV in 10 mM phenylethylamine. FIG. 14 is a growth curve showing growth of PP, BS, AB and AV in 10 mM maltitol. FIG. 15 is a growth curve showing growth of PP, BS, AB and AV in 10 mM lactulose. FIG. 16 is a growth curve showing growth of PP, BS, AB and AV in 10 mM N-acetyl-D-mannosamine.

Screening the ability of target carbon sources to promote bacterial growth in exudates resulted in slightly different results then when the target carbon sources were screened using Biolog plates. This highlights the importance of using exudates as a base fluid as it more closely resembles the nutrient availability of the rhizosphere. Screening at different concentrations allows for an investigation into the potency of different compounds and their ability to support microbial biomass.

Example 3-High-Throughput Chemotaxis Assay

This non-limiting example relates to identification of unique PGPR chemoeffectors using a novel approach to simultaneously screen up to 384 soil bacteria-enriching agents using a 3D printed capillary tube assay. The assay expands on the traditional capillary tube assay but rather than count CFUs which is time intensive and error prone, the present assay uses the lag time, i.e., the time that it takes each well to reach exponential growth phase, to back calculate the starting cell number using a standard curve. FIG. 17 is an illustration showing some embodiments of a high-throughput chemotaxis assay as disclosed herein. The present assay uses capillary tubes to assay chemotaxis but is adapted to work on 96-well or 384-well plates using a custom 3D printed capillary tube holder. This allows for more replicable results and simultaneous screening of many compounds.

Chemotaxis Assay:

96 or 384 well plates were filled with attractants to be tested. The capillary tube holder is filled with capillary tubes and placed on top of a candidate attractant plate. Once the tubes filled with attractants (via capillary action), the top of the capillary holder was sealed with a plate sealing film. The capillary tube holder was then dipped in a plate containing sterile PBS to wash. The holder was then transferred to a plate containing OD 0.1 of bacteria and incubated for 30-45 min. After 30-45 min the capillary tube holder was removed and again dipped into the PBS wash plate. The capillary tube holder was then transferred to a new plate, the seal was removed, and the plate, along with the capillary tube holder, was spun in a centrifuge at a relative centrifugal force of 200 for 1 minute to expel the contents of the capillary tubes into the plate. Growth media was then added to each well and the plate was transferred to a plate reader. The plates were then incubated at 28° C. for 24-72 hours depending on the growth rate of the bacterial strain. The $OD_{600}$ was read every 20 minutes.

Chemotaxis Data Analysis:

The lag time of each well was used to identify the starting concentration of cells in each capillary tube. To do this, the time at which the growth curve hit exponential phase (an $OD_{600}$ of about 0.25) was determined. The bacterial cell concentration was then back calculated using a standard curve of cell count. Once the initial cell concentration was determined for each well, the chemotactic index (I30) was using the following formula:

x=# of cells in attractant filled capillary y=# of cells in control filled capillary $$I30 = x/(x + y)$$

Where:

I30>0.5=attractant

I30=0.5=neutral

I30<0.5=repellent

FIG. 18-19 are heatmaps sowing the chemotactic index for 3 PGPB species (AV: *Azotobacter vinelandii* CA, BS: *Bacillus subtilis* 3610, PP: *Pseudomonas putida* KT2440).

Soil Bacteria-Enrichment Assay:

The ability of the identified compounds to effectively manipulate the soil microbial community was examined using a series of soil bacteria-enrichment experiments. First, the ability of the candidate selective carbon substrates to influence microbial competition was tested using a series of soil competition experiments. 1 g of non-sterile agriculture soil was added to a 2 mL tube along with 300 μL of exudates, 20 mM target carbon substrates and an OD 3.33 of all four species pooled at an equal starting concentration. Tubes were collected after 72 hours and stored in −80° C. before processing. DNA was then extracted and screened using qPCR with probes unique to each strain to determine the abundance of each strain in the mixed community.

FIG. 21-24 are a dot plots showing enrichment of AB, AV, BS and PP in soil containing different soil bacteria-enriching agents. Results showed that the compound sodium propionate can be used to enrich *Azospirillum brasilense* in agricultural soils with a native microbiome. Similarly, arbutin and α-methyl d-galactoside can be used to enrich *Bacillus subtilis* in agricultural soils with a native microbiome. Lastly, phenylethylamine and capric acid can be used to enrich *Pseudomonas putida* in agricultural soils with native microbiome.

FIG. 25-26 are graphs showing persistence of a *P. putida* bioinoculant over time. FIG. 25 shows the raw Ct values for the universal primer (ALL) and *P. putida* (PP) primer. FIG. 26 shows The Ct value for a universal 16S primer was subtracted from the species-specific primer to get the ΔCt, which is shown on the y-axis. Lower ΔCt indicates higher abundance. *P. putida* was introduced into non-sterile soil at an initial density of 105 cfu/g soil in exudate solution +/−20 mM phenylethylamine (PEA) at day 0 and allowed to incubate at 28° C. Two replicates are shown for each condition. Every 3 days, soil was collected, and DNA was extracted to probe the concentration of *P. putida* using 16S primers. Template DNA for qPCR was normalized to ~1 ng/reaction. As can be seen in in FIG. 25-27, *Pseudomonas putida* persists longer in agricultural soil in the presence of phenylethylamine (PEA).

Next, the ability to enrich the bacteria of interest using exogenous application of selective carbon sources was tested in the presence of plants. To do this, one of the four PGPB (AB, AV, BS and PP) was added to soil at a low initial starting density along with the addition of its respective selective carbon sources. The impact of the addition of the different carbon sources was tested both in the bulk soil as well as on the plant roots. Phenotypic measurements of plants were collected. FIG. 27-28 are dot plots showing successful enrichment of a bioinoculant species with the addition of selective carbon source. *P. putida* KT2440 (PP) was added to agriculture soil in a magenta box along with +/−20 mM phenylethylamine in water to achieve an initial population size of $10^5$ cells per gram of soil. Soil moisture at the start of the experiment was adjusted to 100%. Four 1-week old *Arabidopsis thaliana* seedlings were transferred into each magenta box and the box was sealed with micropore tape. After 1 or 2 weeks, soil was collected from the middle of the box and DNA was extracted to probe the population size of PP in bulk soil. Roots were collected, washed, flash frozen, and bead beat before DNA extraction. qPCR was then used to measure the presence of PP in both bulk soil DNA and root DNA. As can be seen in FIG. 27-28, PP was enriched in the bulk soil and plant root when PEA is added. Given that *Pseudomonas putida* solubilizes organic phosphate in soil, its enrichment on plant roots will provide plants with growth benefit especially under nutrient limiting conditions and can enable reduction of needed chemical fertilizers.

What is claimed is:

1. A method of engineering a soil microbiome, the method comprising:

a) selecting one or more carbon substrates that are able to enrich a desired bacterial species in a soil microbiome as compared to enrichment of one or more different bacteria in the soil microbiome;

b) selecting one or more chemoattractants that are able to attract the desired bacterial species to the soil microbiome as compared to attraction of one or more different bacteria to the soil microbiome; and c) applying the one or more selected carbon substrates and chemoattractants to soil comprising a soil microbiome comprising the desired bacteria, wherein application of the one or more of the selected carbon substrates and/or chemoattractants to the soil comprising a soil microbiome enriches the concentration of the desired bacteria in the soil microbiome as compared to the concentration of the one or more desired bacteria prior to applying the one or more selected carbon substrates and/or chemoattractants to the soil.

2. The method of claim 1, wherein applying the selected carbon substrates and/or chemoattractants comprises adding exogenous carbon substrates and/or chemoattractants to the soil comprising the soil microbiome.

3. The method of claim 1, wherein the desired bacterial species comprises a plant growth-promoting rhizobacteria (PGPR).

4. The method of claim 3, wherein the PGPR comprises one or more of: *Pseudomonas putida, Azotobacter vinelandii, Bacillus subtilis* or *Azospirillum brasilense*, or any combination thereof.

5. The method of claim 1, wherein the selected chemoattractant is one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

6. The method of claim 1, wherein the selected carbon substrate is one or more of L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, phenylethylamine, benzoate, methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, r glucosamine, D-galactose, i-erythritol, D-melezitose, xylitol, melibionic acid, a-methyl-D-galactoside, lactulose, L-rhamnose, N-acetyl-D-mannosamine, erythritol, propionic acid, D-tartaric acid or D-malic acid and/or any combination thereof.

7. The method of claim 1, wherein the desired bacteria comprises *Pseudomonas putida* and the selected carbon substrate and/or chemoattractant comprises one or more of: L-asparagine, a-hydroxyglutaric acid-g-lactone, inosine, ala-gly, phenylethylamine, g-amino-N-butyric acid, d-amino valeric acid, capric acid, 4-hydroxybenzoic acid, 4-hydroxybenzoic acid, D-ribono-1,4-lactone, L-arginine, hydroxy-L-proline, L-isoleucine, L-leucine, L-lysine, L-valine, putrescine, D-saccharic acid, mucic acid, 2-aminoethanol, butyric acid, benzoate or octopamine, and/or any combination thereof.

8. The method of claim 1, wherein the desired bacteria comprises *Azotobacter vinelandii* and the carbon substrate and/or chemoattractant comprises one or more of: D-galactose, i-erythritol, D-melezitose, xylitol, melibionic acid, a-methyl-D-galactoside, lactulose, L-rhamnose, N-acetyl-D-mannosamine, D-mannitol or erythritol and/or any combination thereof.

9. The method of claim 1, wherein the desired bacteria comprises *Bacillus subtilis* and the carbon substrate and/or chemoattractant comprises one or more of: methyl-D-galactoside, N-acetyl-D-glucosamine, D-trehalose, D-xylose, maltotriose, D-cellobiose, a-cyclodextrin, b-cyclodextrin, inulin, arbutin, D-mannitol, b-methyl-D-glucoside, g-cyclodextrin, dextrin, gentiobiose, D-sorbitol, D-ribose, maltose, amygdalin, maltitol, N-acetyl-D-mannosamine, a-methyl-D-galactoside, malate, glutamic acid, glycerol or glucosamine and/or any combination thereof.

10. The method of claim 1, wherein the desired bacteria comprises Azospirillum brasilense and the carbon substrate and/or chemoattractant comprises one or more of: propionic acid, D-tartaric acid or D-malic acid and/or any combination thereof, to the soil comprising a soil microbiome.

11. A method of selecting a chemoattractant that is able to enrich the growth of a desired bacterial species in a soil microbiome, the method comprising:

measuring the attraction of the desired bacterial species and at least one different bacterial species to one or more candidate chemoattractants, and selecting a chemoattractant that is able to more strongly attract the desired bacterial species as compared to the at least one different species of bacteria.

12. The method of claim 11, wherein the desired bacterial species comprises a plant growth-promoting rhizobacteria (PGPR).

13. The method of claim 12, wherein the PGPR comprises one or more of: *Pseudomonas putida, Azotobacter vinelandii, Bacillus subtilis* or *Azospirillum brasilense*, or any combination thereof.

14. The method of claim 11, wherein the candidate chemoattractant comprises one or more of: phenylethylamine (PEA), butyric acid, putrescine, benzoate, octopamine, maltitol, N-acetyl-D-mannosamine, a-methyl-D-galactoside, malate, glutamic acid, glycerol, D-sorbitol, erythritol, D-mannitol or a-D-lactose, and/or any combination thereof.

15. The method of claim 11, wherein measuring the attraction of a desired bacterial species to a candidate chemoattractant comprises measuring the chemotactic index (I30) of the desired bacteria to the candidate chemoattractant.

16. The method of claim 15, wherein selecting a chemoattractant comprises selecting at least one candidate chemoattractant having an I30 more than 0.5.

17. The method of claim 11, wherein selecting a chemoattractant comprises selecting at least one chemoattractant having an I30 more than 0.5 toward the desired bacterial species, wherein the selected chemoattractant has an I30 of less than 0.5 towards one or more of the at least one different bacterial species.

18. The method of claim 11, wherein the desired bacteria comprises *Pseudomonas putida* and the selected chemoattractant comprises one or more of: phenylethylamine (PEA), butyric acid, putrescine, benzoate or octopamine, and/or any combination thereof.

19. The method of claim 11, wherein the desired bacteria comprises *Azotobacter vinelandii* and the selected chemoattractant comprises one or more of: erythritol, D-mannitol or a-D-lactose, and/or any combination thereof.

20. The method of claim 11, wherein the desired bacteria comprises *Bacillus subtilis* and the selected chemoattractant comprises one or more of: maltitol, N-acetyl-D-mannosamine, a-methyl-D-galactoside, malate, glutamic acid, glycerol or D-sorbitol and/or any combination thereof.

* * * * *